(12) United States Patent
Couture et al.

(10) Patent No.: US 10,830,911 B2
(45) Date of Patent: Nov. 10, 2020

(54) WAVELENGTH-SHIFTING SHEET-COUPLED SCINTILLATION DETECTORS

(71) Applicant: American Science and Engineering, Inc., Billerica, MA (US)

(72) Inventors: Aaron J. Couture, Reading, MA (US); Jeffrey M. Denker, Woburn, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 16/382,973

(22) Filed: Apr. 12, 2019

(65) Prior Publication Data
US 2019/0391280 A1 Dec. 26, 2019

Related U.S. Application Data

(60) Provisional application No. 62/687,550, filed on Jun. 20, 2018.

(51) Int. Cl.
*G01T 1/20* (2006.01)

(52) U.S. Cl.
CPC .......... *G01T 1/2006* (2013.01); *G01T 1/2002* (2013.01)

(58) Field of Classification Search
CPC .... G01T 1/2002; G01T 1/2006; G01T 1/2023
See application file for complete search history.

(56) References Cited

U.S. PATENT DOCUMENTS

| 4,045,672 A | 8/1977 | Watanabe |
| 4,242,583 A | 12/1980 | Annis |
| 4,259,582 A | 3/1981 | Albert |
| 4,497,062 A | 1/1985 | Mistretta |
| 4,788,436 A | 11/1988 | Koechner |
| 5,281,820 A | 1/1994 | Groh |
| 5,302,817 A | 4/1994 | Yokota |
| 5,420,959 A | 5/1995 | Walker |
| 5,550,380 A | 8/1996 | Sugawara |
| 5,600,144 A | 2/1997 | Worstell |
| 5,629,515 A * | 5/1997 | Maekawa ................. G01T 1/20 250/207 |
| 5,764,683 A | 6/1998 | Swift |

(Continued)

FOREIGN PATENT DOCUMENTS

| EP | 113291 A1 | 7/1984 |
| EP | 0813692 | 12/1997 |

(Continued)

OTHER PUBLICATIONS

International Search Report for PCT/US2019/027252, dated Aug. 2, 2019.

(Continued)

*Primary Examiner* — Chih-Cheng Kao
(74) *Attorney, Agent, or Firm* — Novel IP

(57) ABSTRACT

The present specification describes an X-ray detector that includes at least one scintillator screen for absorbing incident X rays and emitting corresponding light rays, a wavelength shifting sheet (WSS) coupled with the at least one scintillator screen for shifting the emitted light rays, at least one wavelength shifting fiber (WSF) coupled with at least one edge of the WSS for collecting the shifted light rays, and a photodetector for detecting the collected light rays.

22 Claims, 52 Drawing Sheets

(56) References Cited

U.S. PATENT DOCUMENTS

| | | | | |
|---|---|---|---|---|
| 5,784,507 | A | 7/1998 | Holm-Kennedy | |
| 5,910,973 | A | 6/1999 | Grodzins | |
| 5,940,468 | A | 8/1999 | Huang | |
| 5,968,425 | A | 10/1999 | Bross | |
| 6,067,344 | A | 5/2000 | Grodzins | |
| 6,078,052 | A * | 6/2000 | DiFilippo | G01T 1/20 250/367 |
| 6,081,580 | A | 6/2000 | Grodzins | |
| 6,151,381 | A | 11/2000 | Grodzins | |
| 6,192,104 | B1 | 2/2001 | Adams | |
| 6,249,567 | B1 | 6/2001 | Rothschild | |
| 6,252,929 | B1 | 6/2001 | Swift | |
| 6,282,260 | B1 | 8/2001 | Grodzins | |
| 6,292,533 | B1 | 9/2001 | Swift | |
| 6,320,933 | B1 | 11/2001 | Grodzins | |
| 6,333,502 | B1 | 12/2001 | Sumita | |
| 6,424,695 | B1 | 7/2002 | Grodzins | |
| 6,442,233 | B1 | 8/2002 | Grodzins | |
| 6,453,007 | B2 | 9/2002 | Adams | |
| 6,459,761 | B1 | 10/2002 | Grodzins | |
| 6,459,764 | B1 | 10/2002 | Chalmers | |
| 6,542,574 | B2 | 4/2003 | Grodzins | |
| 6,542,580 | B1 | 4/2003 | Carver | |
| 6,546,072 | B1 | 4/2003 | Chalmers | |
| 6,621,888 | B2 | 9/2003 | Grodzins | |
| 6,658,087 | B2 | 12/2003 | Chalmers | |
| 6,859,607 | B2 | 2/2005 | Sugihara | |
| 6,965,662 | B2 | 11/2005 | Eppler | |
| 7,010,094 | B2 | 3/2006 | Grodzins | |
| 7,067,079 | B2 | 6/2006 | Bross | |
| 7,099,434 | B2 | 8/2006 | Adams | |
| 7,115,875 | B1 | 10/2006 | Worstell | |
| RE39,396 | E | 11/2006 | Swift | |
| 7,218,704 | B1 | 5/2007 | Adams | |
| 7,326,933 | B2 | 2/2008 | Katagiri | |
| 7,366,282 | B2 | 4/2008 | Peschmann | |
| 7,400,701 | B1 | 7/2008 | Cason | |
| 7,417,440 | B2 | 8/2008 | Peschmann | |
| 7,505,556 | B2 | 3/2009 | Chalmers | |
| 7,505,562 | B2 | 3/2009 | Dinca | |
| 7,538,325 | B2 | 5/2009 | Mishin | |
| 7,551,715 | B2 | 6/2009 | Rothschild | |
| 7,551,718 | B2 | 6/2009 | Rothschild | |
| 7,555,099 | B2 | 6/2009 | Rothschild | |
| 7,579,845 | B2 | 8/2009 | Peschmann | |
| 7,593,506 | B2 | 9/2009 | Cason | |
| 7,593,510 | B2 | 9/2009 | Rothschild | |
| 7,783,005 | B2 | 8/2010 | Kaval | |
| 7,856,081 | B2 | 12/2010 | Peschmann | |
| 7,864,920 | B2 | 1/2011 | Rothschild | |
| 7,924,979 | B2 | 4/2011 | Rothschild | |
| 7,995,707 | B2 | 8/2011 | Rothschild | |
| 8,054,938 | B2 | 11/2011 | Kaval | |
| 8,138,770 | B2 | 3/2012 | Peschmann | |
| 8,194,822 | B2 | 6/2012 | Rothschild | |
| 8,275,091 | B2 | 9/2012 | Morton | |
| 8,275,092 | B1 | 9/2012 | Zhang | |
| 8,325,871 | B2 | 12/2012 | Grodzins | |
| 8,345,819 | B2 | 1/2013 | Mastronardi | |
| 8,389,942 | B2 | 3/2013 | Morton | |
| 8,428,217 | B2 | 4/2013 | Peschmann | |
| 8,433,036 | B2 | 4/2013 | Morton | |
| 8,439,565 | B2 | 5/2013 | Mastronardi | |
| 8,442,186 | B2 | 5/2013 | Rothschild | |
| 8,457,274 | B2 | 6/2013 | Arodzero | |
| 8,503,605 | B2 | 8/2013 | Morton | |
| 8,503,606 | B2 | 8/2013 | Rothschild | |
| 8,532,823 | B2 | 9/2013 | McElroy | |
| 8,582,720 | B2 | 11/2013 | Morton | |
| 8,668,386 | B2 | 3/2014 | Morton | |
| 8,690,427 | B2 | 4/2014 | Mastronardi | |
| 8,731,137 | B2 | 5/2014 | Arroyo | |
| 8,735,833 | B2 | 5/2014 | Morto | |
| 8,750,452 | B2 | 6/2014 | Kaval | |
| 8,750,454 | B2 | 6/2014 | Gozani | |
| 8,774,357 | B2 | 7/2014 | Morton | |
| 8,824,632 | B2 | 9/2014 | Mastronardi | |
| 8,831,176 | B2 | 9/2014 | Morto | |
| 8,842,808 | B2 | 9/2014 | Rothschild | |
| 8,861,684 | B2 | 10/2014 | Al-Kofahi | |
| 8,884,236 | B2 | 11/2014 | Rothschild | |
| 8,903,045 | B2 | 12/2014 | Schubert | |
| 8,903,046 | B2 | 12/2014 | Morton | |
| 8,908,831 | B2 | 12/2014 | Bendahan | |
| 8,923,481 | B2 | 12/2014 | Schubert | |
| 8,929,509 | B2 | 1/2015 | Morton | |
| 8,971,487 | B2 | 3/2015 | Mastronardi | |
| 8,993,970 | B2 | 3/2015 | Morton | |
| 9,014,339 | B2 | 4/2015 | Grodzins | |
| 9,020,103 | B2 | 4/2015 | Grodzins | |
| 9,042,511 | B2 | 5/2015 | Peschmann | |
| 9,052,271 | B2 | 6/2015 | Grodzins | |
| 9,052,403 | B2 | 6/2015 | Morton | |
| 9,057,679 | B2 | 6/2015 | Morton | |
| 9,069,101 | B2 | 6/2015 | Arroyo, Jr. | |
| 9,099,279 | B2 | 8/2015 | Rommel | |
| 9,117,564 | B2 | 8/2015 | Rommel | |
| 9,121,958 | B2 | 9/2015 | Morton | |
| 9,128,198 | B2 | 9/2015 | Morton | |
| 9,146,201 | B2 | 9/2015 | Schubert | |
| 9,207,195 | B2 | 12/2015 | Gozani | |
| 9,223,050 | B2 | 12/2015 | Kaval | |
| 9,257,208 | B2 | 2/2016 | Rommel | |
| 9,268,058 | B2 | 2/2016 | Peschmann | |
| 9,285,488 | B2 | 3/2016 | Arodzero | |
| 9,291,582 | B2 | 3/2016 | Grodzins | |
| 9,417,060 | B1 | 8/2016 | Schubert | |
| 9,465,135 | B2 | 10/2016 | Morton | |
| 9,466,456 | B2 | 10/2016 | Rommel | |
| 9,535,019 | B1 | 1/2017 | Rothschild | |
| 9,541,510 | B2 | 1/2017 | Arodzero | |
| 9,562,866 | B2 | 2/2017 | Morton | |
| 9,632,205 | B2 | 4/2017 | Morton | |
| 9,658,343 | B2 | 5/2017 | Arodzero | |
| 9,791,590 | B2 | 10/2017 | Morton | |
| 9,823,201 | B2 | 11/2017 | Morton | |
| 9,841,386 | B2 | 12/2017 | Grodzins | |
| 10,209,372 | B2 | 2/2019 | Arodzero | |
| 2002/0082492 | A1 | 6/2002 | Grzeszczuk | |
| 2002/0117625 | A1* | 8/2002 | Pandelisev | G01T 3/06 250/368 |
| 2004/0104347 | A1 | 6/2004 | Bross | |
| 2004/0109653 | A1 | 6/2004 | Kerr | |
| 2004/0140431 | A1 | 7/2004 | Schmand | |
| 2005/0018814 | A1 | 1/2005 | Kerschner | |
| 2005/0078793 | A1 | 4/2005 | Ikeda | |
| 2005/0236577 | A1 | 10/2005 | Katagiri | |
| 2006/0251211 | A1 | 11/2006 | Grodzins | |
| 2007/0029493 | A1 | 2/2007 | Kniss | |
| 2009/0230295 | A1 | 9/2009 | Waring | |
| 2009/0230925 | A1 | 9/2009 | Nathan | |
| 2009/0257555 | A1 | 10/2009 | Chalmers | |
| 2009/0274270 | A1 | 11/2009 | Kotowski | |
| 2010/0072398 | A1 | 3/2010 | Fruehauf | |
| 2010/0108859 | A1 | 5/2010 | Andressen | |
| 2010/0270462 | A1 | 10/2010 | Nelson | |
| 2010/0276602 | A1 | 11/2010 | Clothier | |
| 2011/0079726 | A1 | 4/2011 | Kusner | |
| 2011/0110490 | A1 | 5/2011 | Samant | |
| 2011/0215222 | A1 | 9/2011 | Eminoglu | |
| 2011/0309253 | A1 | 12/2011 | Rothschild | |
| 2011/0309257 | A1 | 12/2011 | Menge | |
| 2012/0033791 | A1 | 2/2012 | Mastronardi | |
| 2012/0061575 | A1 | 3/2012 | Dunleavy | |
| 2012/0104265 | A1 | 5/2012 | Workman | |
| 2012/0148020 | A1 | 6/2012 | Arroyo, Jr. | |
| 2012/0280132 | A1 | 11/2012 | Nakamura | |
| 2013/0208857 | A1* | 8/2013 | Arodzero | H01L 27/14601 378/57 |
| 2014/0105367 | A1 | 4/2014 | Horvarth | |
| 2015/0016794 | A1* | 1/2015 | Mori | G02B 6/125 385/124 |
| 2015/0168589 | A1 | 6/2015 | Morton | |
| 2016/0025888 | A1 | 1/2016 | Peschmann | |

(56) References Cited

U.S. PATENT DOCUMENTS

| | | |
|---|---|---|
| 2016/0025889 A1 | 1/2016 | Morton |
| 2016/0170044 A1 | 6/2016 | Arodzero |
| 2016/0170077 A1 | 6/2016 | Morton |
| 2016/0223706 A1 | 8/2016 | Franco |
| 2017/0045630 A1 | 2/2017 | Simon |
| 2017/0059739 A1 | 3/2017 | Mastronardi |
| 2017/0299526 A1 | 10/2017 | Morton |
| 2017/0299764 A1 | 10/2017 | Morton |
| 2017/0315242 A1 | 11/2017 | Arodzero |
| 2018/0038969 A1 | 2/2018 | McCollough |
| 2018/0128935 A1 | 5/2018 | Morton |
| 2018/0136340 A1 | 5/2018 | Nelson |
| 2018/0252841 A1 | 9/2018 | Grodzins |
| 2018/0286624 A1 | 10/2018 | Rommel |
| 2018/0313770 A1 | 11/2018 | Morton |
| 2018/0328861 A1 | 11/2018 | Grodzins |
| 2019/0293810 A1 | 9/2019 | Couture |
| 2019/0383953 A1 | 12/2019 | Arodzero |
| 2020/0033274 A1 | 1/2020 | Couture |

FOREIGN PATENT DOCUMENTS

| | | |
|---|---|---|
| EP | 0813692 A1 | 12/1997 |
| GB | 2482024 A | 1/2012 |
| JP | 10232284 A | 2/1997 |
| WO | 2005103759 | 11/2005 |
| WO | 2005103759 A1 | 11/2005 |
| WO | 2006111323 | 10/2006 |
| WO | 2006111323 A2 | 10/2006 |
| WO | 2010129926 A1 | 11/2010 |
| WO | 2011163108 | 12/2011 |
| WO | 2011163108 A2 | 12/2011 |
| WO | 2018064434 | 4/2018 |

OTHER PUBLICATIONS

Williams et al.:"PET Detector Using Waveshifting Optical Fibers and Microchannel Plate PMT with Delay Line Readout", IEEE Transactions on Nuclear Science, IEEE Service Center, New York, NY, US, vol. 45, No. 2, Apr. 1, 1998 (Apr. 1, 1998), pp. 195-205, XP011087844, ISSN: 0018-9499, DOI: 10.1109/23.664171.

Beznosko et al., "FNAL-NICADD Extruded Scintillator," FERMILAB-CONF-04-216-E, pp. 1-4 (Sep. 2004).

Case et al., "Wavelength-shifting fiber readout of LaC13 and LaBr3 scintillators," Proc. of SPIE, vol. 5898, UV, X-Ray, and Gamma-Ray Space Instrumentation for Astronomy XIV, pp. 58980K-1-58980K-8 (2005).

Gundiah, "Scintillation properties of $Eu^{2+}$-activated barium fluoroiodide," Lawrence Berkeley National Laboratory, pp. 1-10 (Feb. 2011).

Hutchinson et al., "Optical Readout for Imaging Neutron Scintillation Detectors," Engineering Science and Technology Division, Oak Ridge National Laboratory, Oak Ridge, Tennessee, 6 pages. (Nov. 2002).

Keizer, "The optimal cosmic ray detector for High-Schools," 21 pages (2011).

Maekawa et al., "Thin Beta-ray Detectors using Plastic Scintillator Combined with Wavelength-shifting Fibers for Surface Contamination Monitoring," J. Nucl. Sci. Technol., vol. 35, No. 12, pp. 886-894 (Dec. 1998).

Moiseev et al., "High-efficiency plastic scintillator detector with wavelength-shifting fiber readout for the GLAST Large Area Telescope," Nucl. Instrum. Meth. Phys. Res. A, vol. 583, pp. 372-381 (2007).

Nishikido et al. "X-ray detector made of plastic scintillators and WLS fiber for real-time dose distribution monitoring in interventional radiology," IEEE Nuclear Science Symposium and Medical Imaging Conference Record, (2012).

Pla-Dalmau et al., "Extruded Plastic Scintillator for MINERvA," FERMILAB-CONF-05-506-E, pp. 1298-1300 (2005).

Yoshimura et al., "Plastic scintillator produced by the injection-molding technique," Nucl. Instr. Meth. Phys. Res. A, vol. 406, pp. 435-441 (1998).

Jae Yul Ahn, Authorized officer Korean Intellectual Property Office, International Search Report—Application No. PCT/US2013/024585, dated Jun. 2, 2013, along with Written Opinion of the International Searchi.

Rose, Kathryn, "NuMI Off-Axis Experiment" Datasheet (online). University of Oxford & Rutherford Appleton Laboratory, 2003. <URL: https://slideplayer.com/slide/8765673/>.

Nishikido et al. "X-ray detector made of plastic scintillators and WLS fiber for real-time dose distribution monitoring in interventional radiology," IEEE Nuclear Science Symposium and Medical Imaging Conference Reco, pp. 1272-1274 (2012).

* cited by examiner

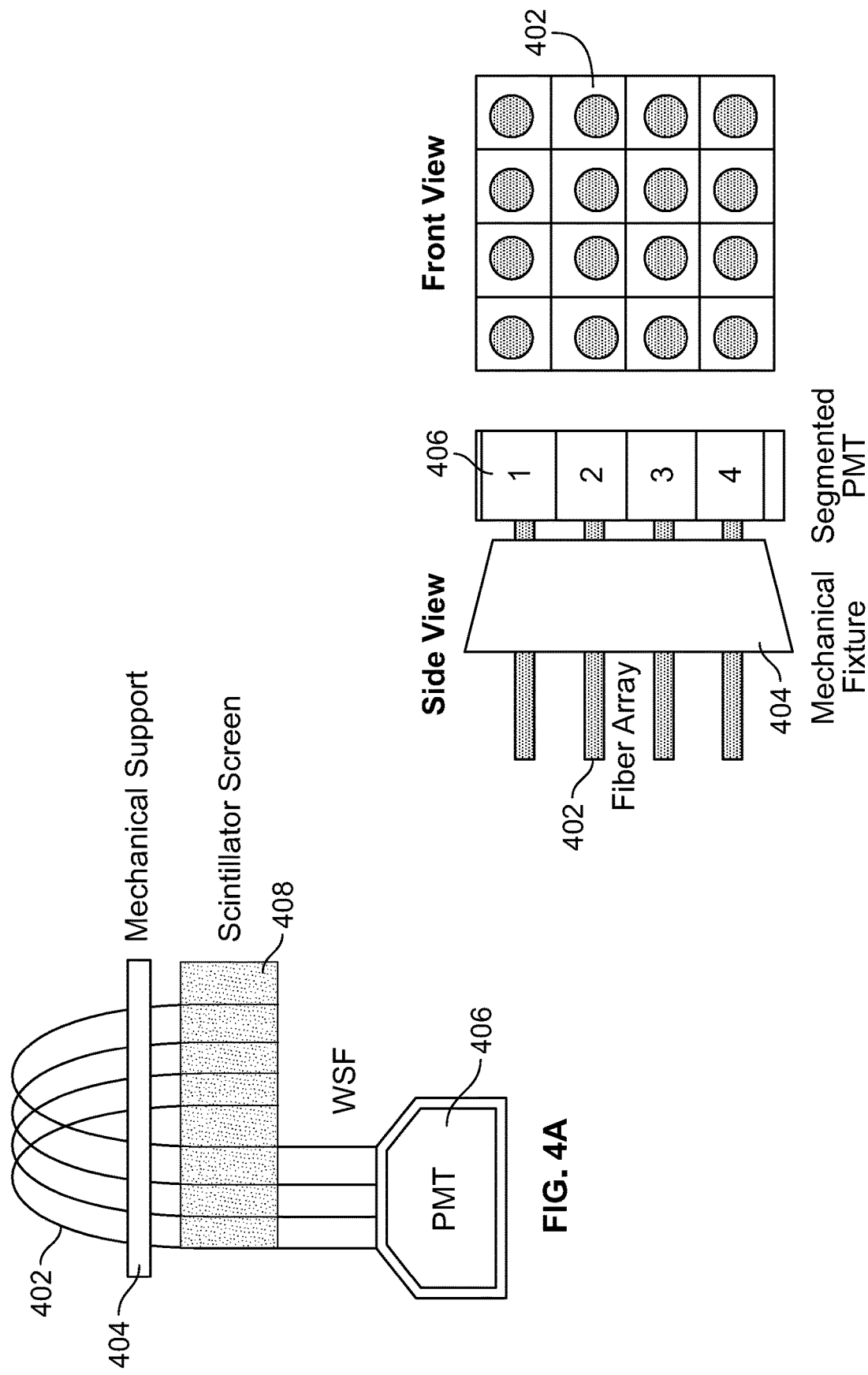

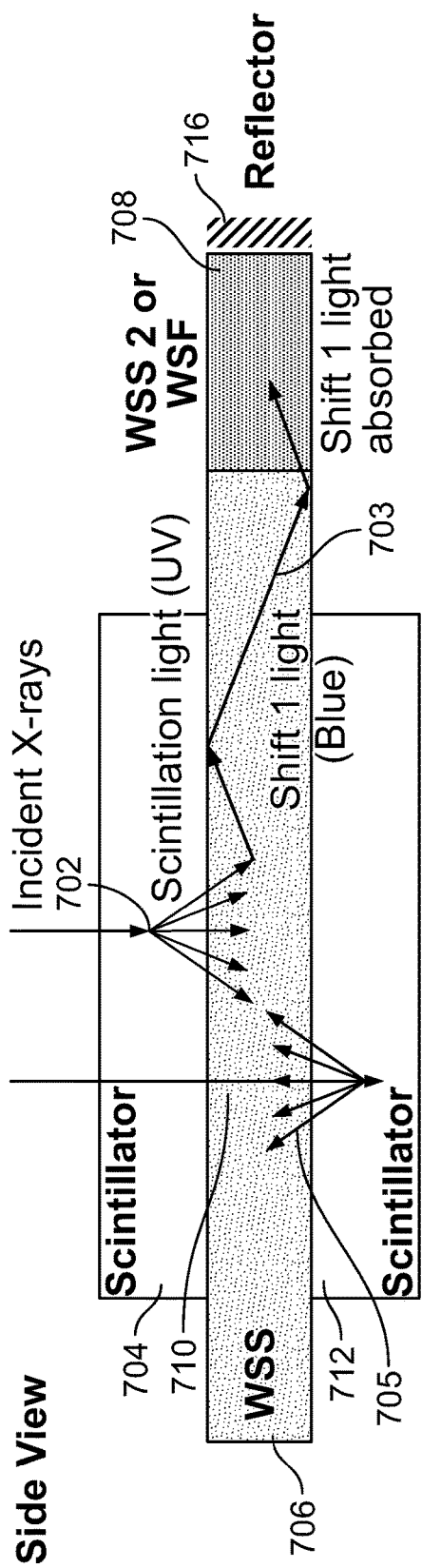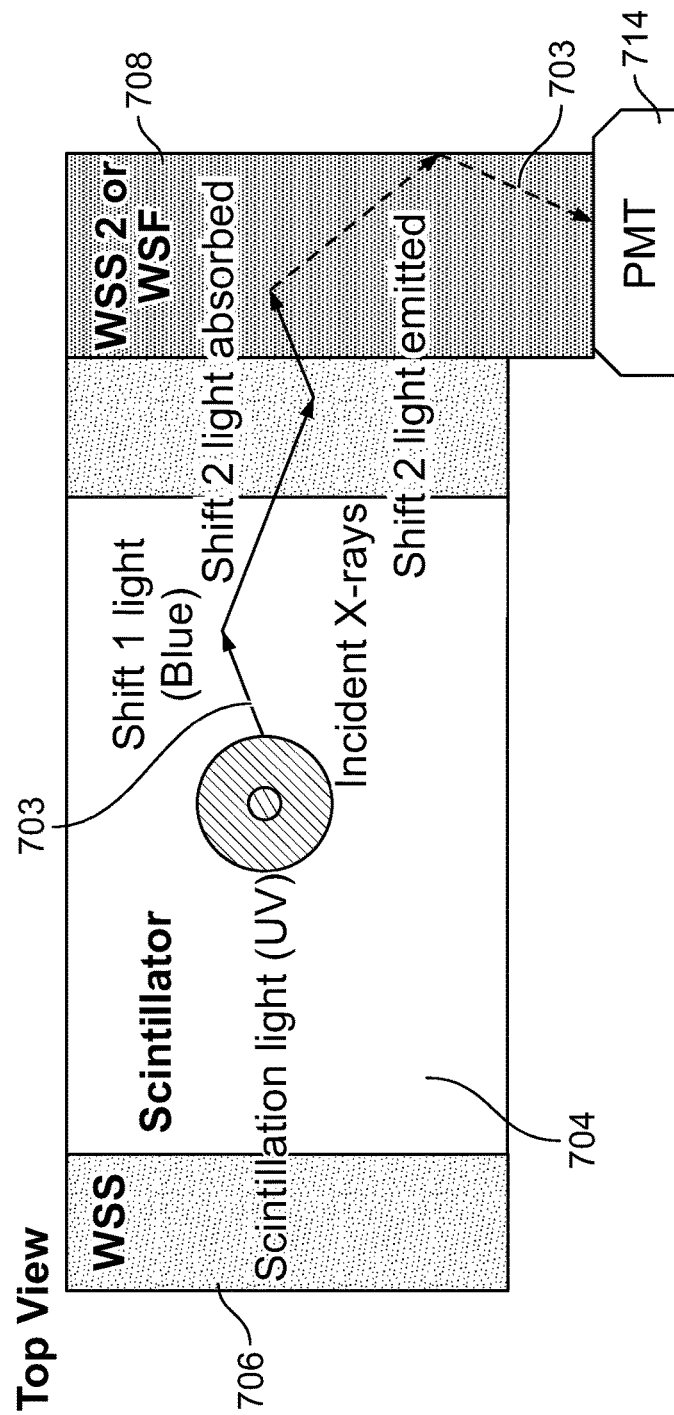
FIG. 7A
FIG. 7B

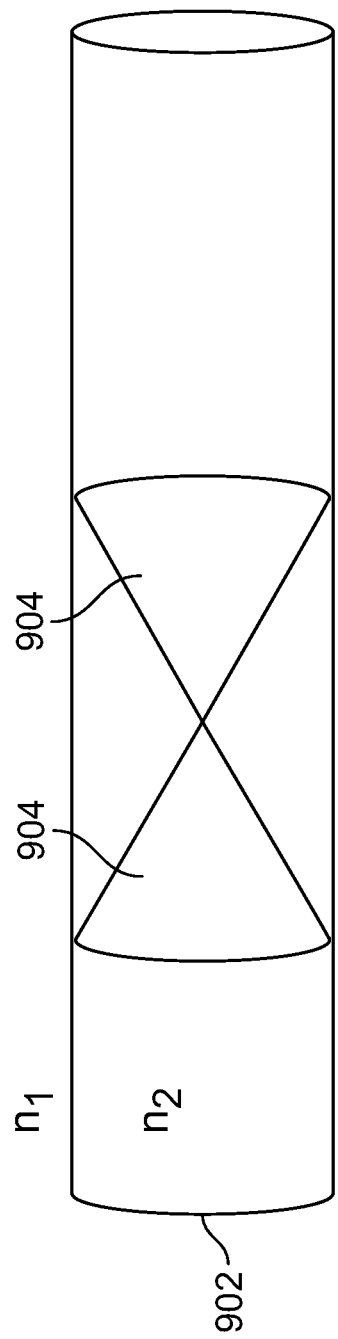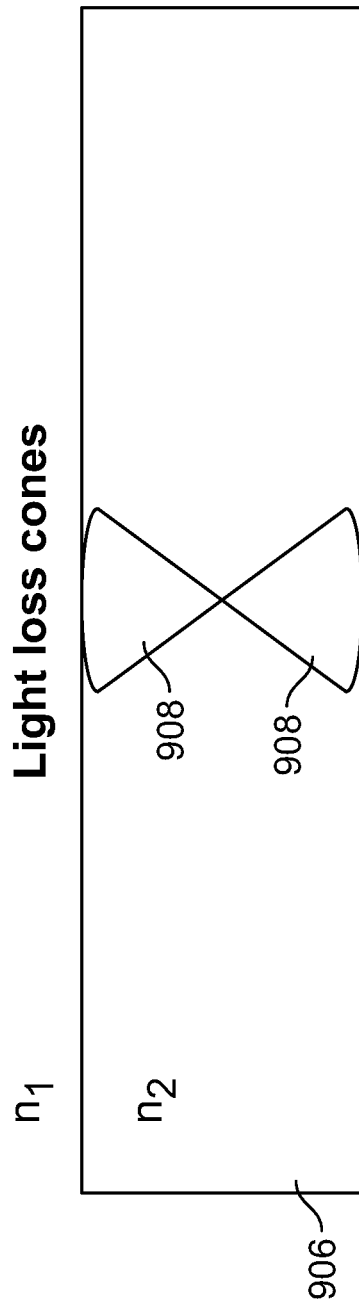

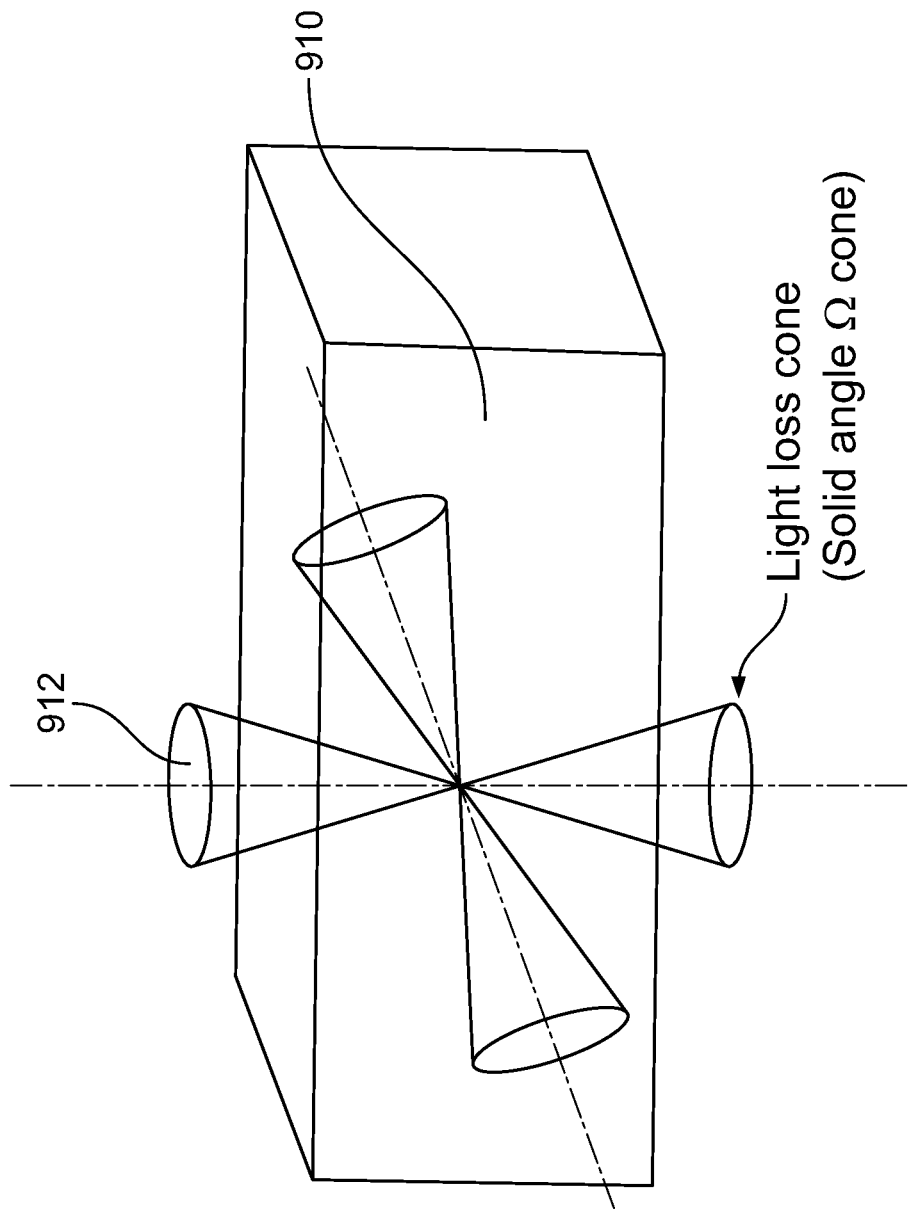

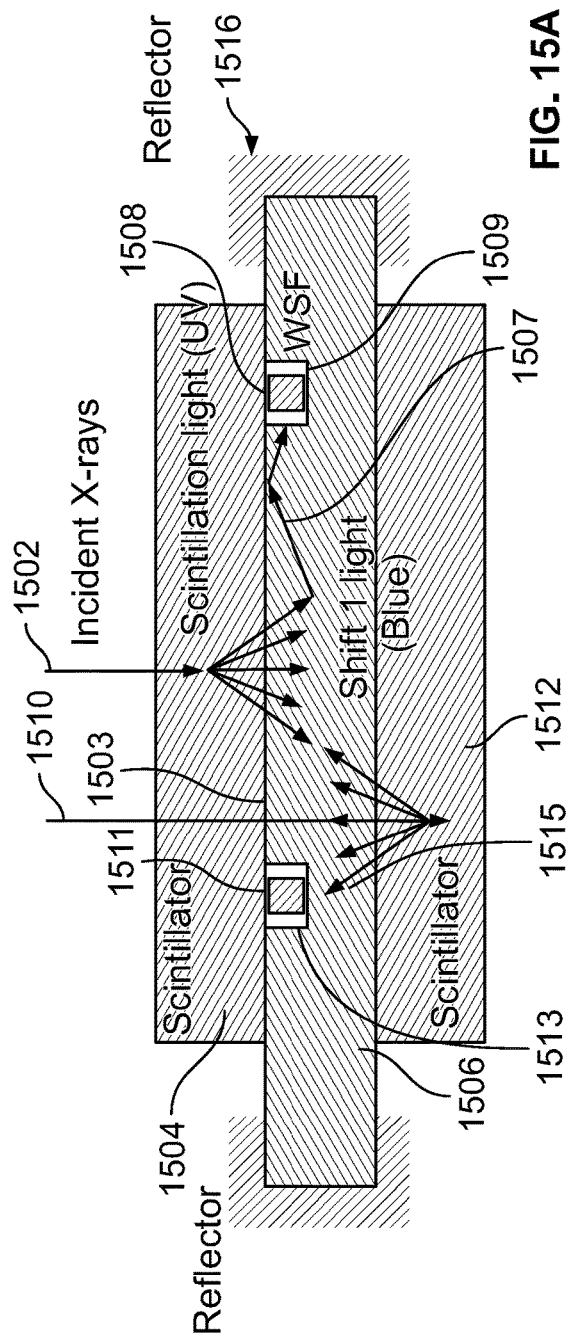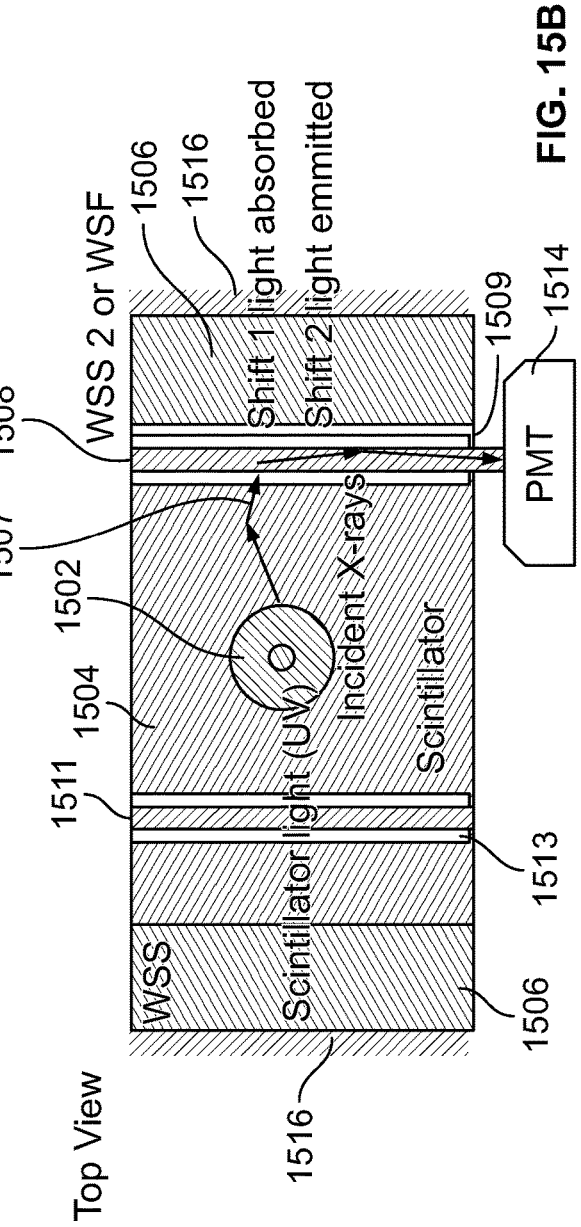
FIG. 15A
FIG. 15B

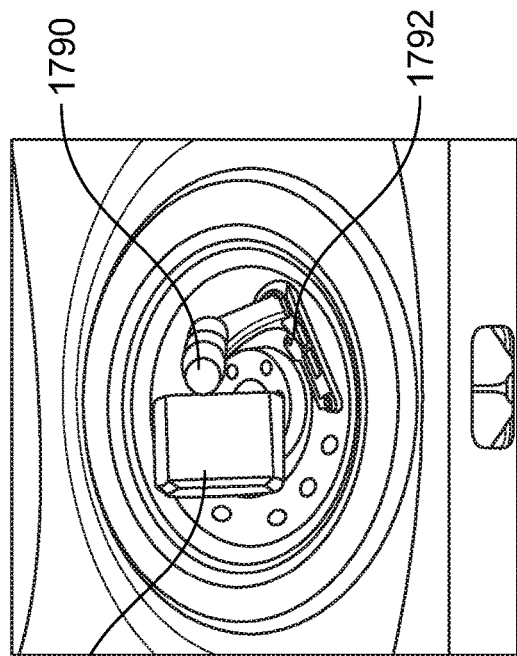
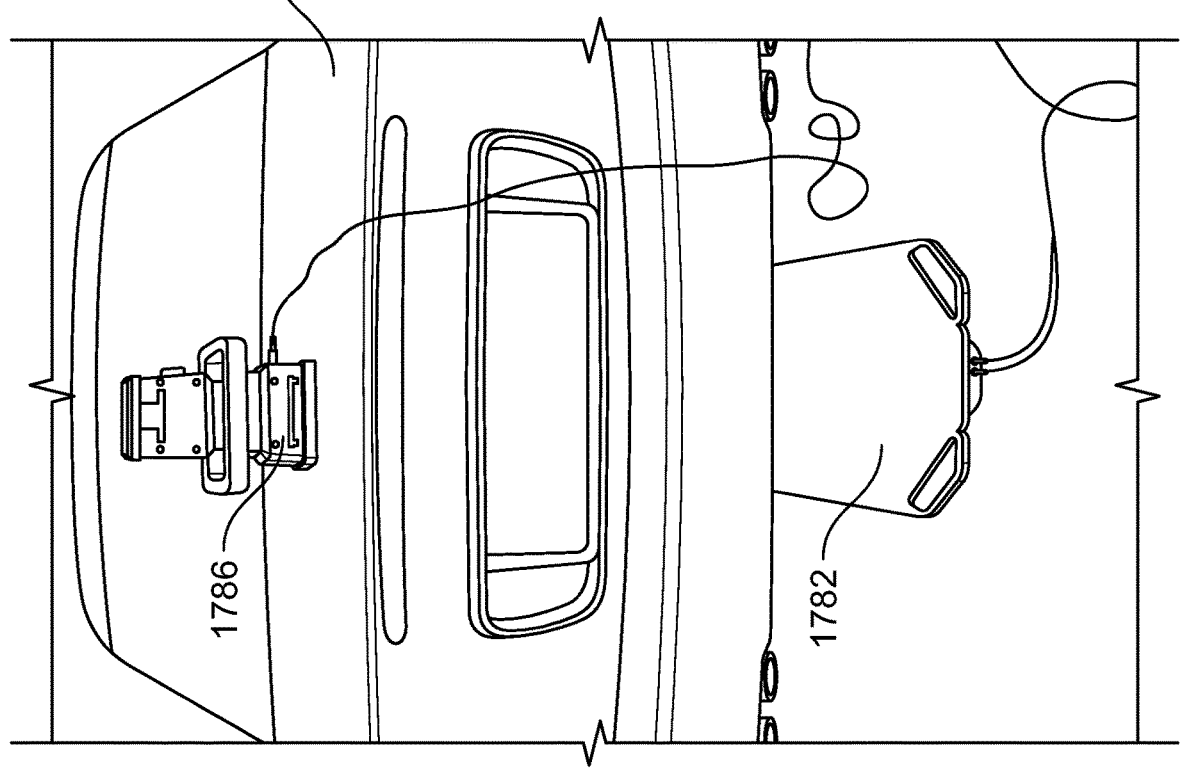

Detector Panel
Under Car

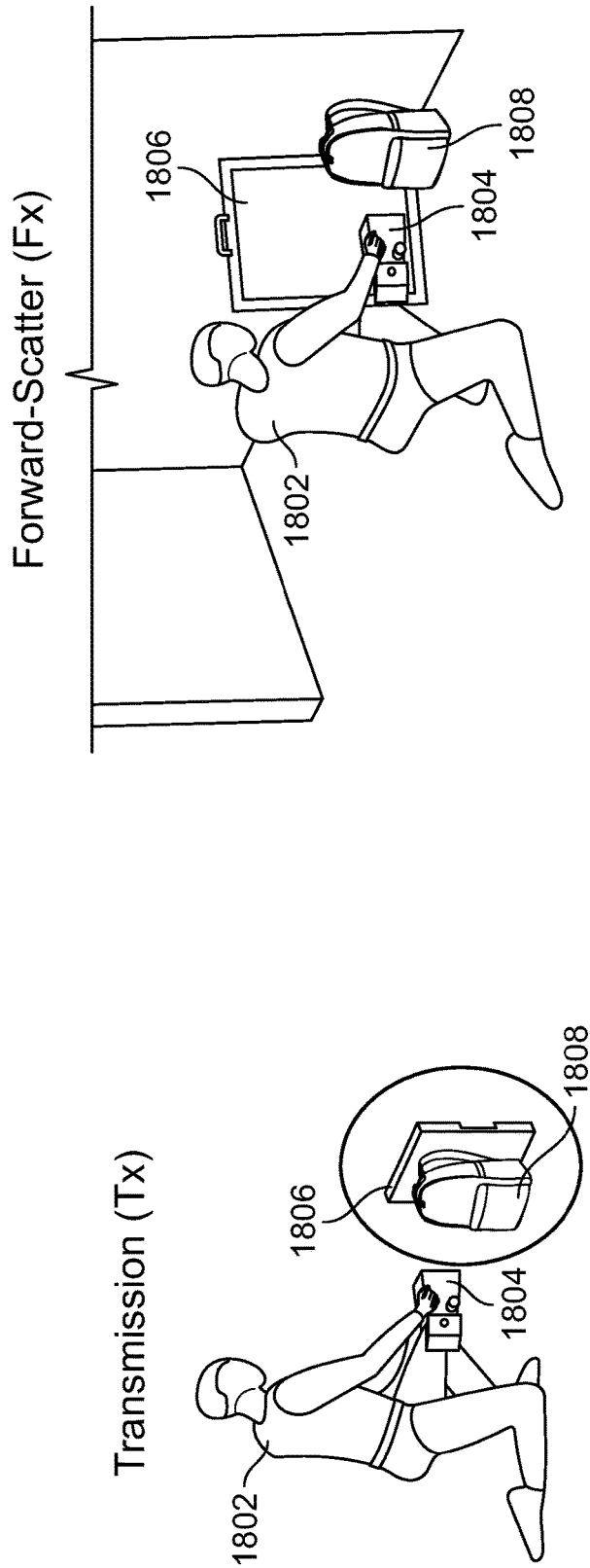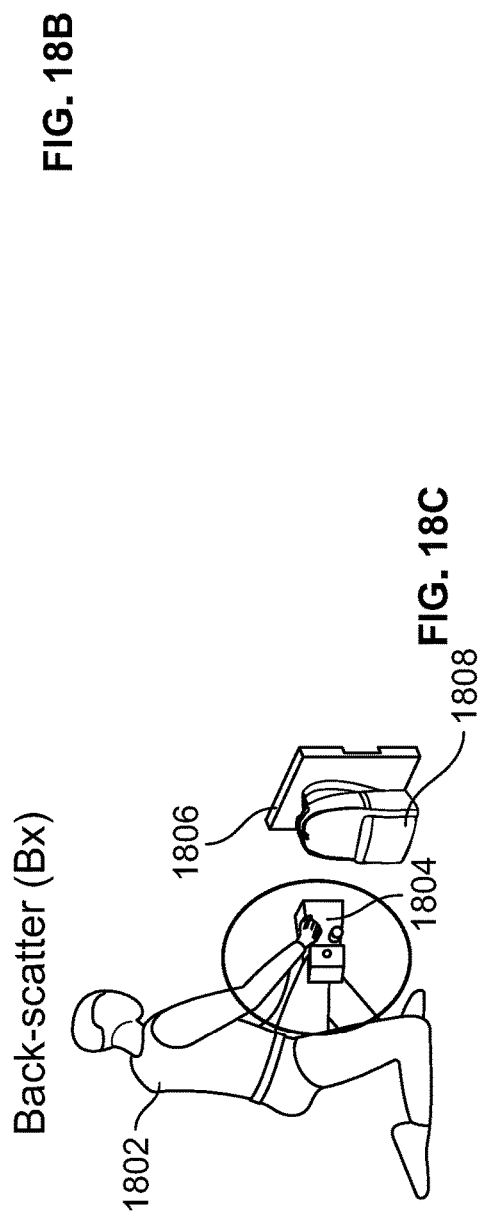
FIG. 18B
FIG. 18C
FIG. 18A

WAVELENGTH-SHIFTING SHEET-COUPLED SCINTILLATION DETECTORS

CROSS-REFERENCE

The present specification relies on U.S. Patent Provisional Application No. 62/687,550, entitled "Wavelength-Shifting Sheet Scintillation Detectors", filed on Jun. 20, 2018, for priority and is herein incorporated by reference in its entirety.

In addition, the present specification relates to U.S. patent application Ser. No. 16/242,163, filed on Jan. 8, 2019, which is a continuation of U.S. patent application Ser. No. 15/490,787, entitled "Spectral Discrimination using Wavelength-Shifting Fiber-Coupled Scintillation Detectors", filed on Apr. 18, 2017, which, in turn, is a divisional application of U.S. Pat. No. 9,658,343 (the "'343 patent"), of the same title filed on Feb. 23, 2016 and issued on May 23, 2017. The '343 patent is a continuation of U.S. Pat. No. 9,285,488 (the '488 patent), of the same title, filed on Feb. 4, 2013, and issued on Mar. 15, 2016. The '488 patent, in turn, claims priority from the following applications:

U.S. Patent Provisional Application No. 61/607,066, entitled "X-Ray Inspection using Wavelength-Shifting Fiber-Coupled Detectors", filed on Mar. 6, 2012.

U.S. Patent Provisional Application No. 61/598,521, entitled "Distributed X-Ray Scintillation Detector with Wavelength-Shifted Fiber Readout", and filed on Feb. 14, 2012.

U.S. Patent Provisional Application No. 61/598,576, entitled "X-Ray Inspection Using Wavelength-Shifting Fiber-Coupled Detectors", and filed on Feb. 14, 2012.

The above-mentioned applications are incorporated herein by reference in their entirety.

FIELD

The present specification relates generally to wavelength-shifting scintillation detectors and more specifically to a wavelength-shifting sheet detector for use in a flying spot transmission imaging system.

BACKGROUND

Fiber-coupled scintillation detectors of radiation and particles have been employed over the course of the past 30 years. In some cases, the scintillator is pixelated, consisting of discrete scintillator elements, and in other cases, other stratagems are employed (such as orthogonally crossed coupling fibers) in order to provide spatial resolution. Examples of fiber-coupled scintillation detectors are provided by U.S. Pat. No. 6,078,052 (to DiFilippo) and U.S. Pat. No. 7,326,933 (to Katagiri et al.), both of which are incorporated herein by reference. The detectors described by both DiFilippo and Katagiri et al. employ wavelength-shifting fibers (WSF) such that light reemitted by the core material of the fiber may be conducted, with low attenuation, to photo-detectors disposed at a convenient location, often distant from the scintillator itself. Spatial resolution is of particular value in applications such as neutron imaging. Spatial resolution is also paramount in the Fermi Large Area Space Telescope (formerly, GLAST) where a high-efficiency segmented scintillation detector employs WSF readout for detection of high-energy cosmic rays, as described in Moiseev, et al., *High efficiency plastic scintillator detector with wavelength-shifting fiber readout for the GLAST Large Area Telescope, Nucl. Instr. Meth. Phys. Res. A*, vol. 583, pp. 372-81 (2007), which is incorporated herein by reference.

A conventional scintillation detector 100 is shown in a side cross-section in FIG. 1A and in a front cross-section in FIG. 1B. An example of such a detector is described in U.S. Pat. No. 5,302,817 (to Yokota), and is incorporated herein by reference. Typically, a light-tight box 102 is lined with scintillating screens 103 where incident X-ray radiation 101 is converted to scintillation light, typically in the UV, visible, or longer wavelength, portions of the electromagnetic (EM) spectrum. Large-photocathode-area photomultiplier tubes (PMTs) 105 are coupled to receive scintillation light via portholes 108. One problem lies in that a fraction of the scintillation light originating within the screen is transmitted from the screen into the enclosed volume. The remaining scintillation light is lost in the screen material. Scintillating screens 103 are designed to maximize the fraction of emitted light, which is tantamount to ensuring a large transmission coefficient T for the interface between screen 103 and the medium (typically air) filling the detector volume.

However, in a conventional backscatter detector of the sort depicted in FIGS. 1A and 1B, the scintillation screens 103 should also serve as good reflectors because scintillation light, once emitted into the volume of box 102, typically needs multiple reflections until it reaches a photo-detector 105. So, the reflection coefficient R of the screen surface should also be large, however, since the sum of T and R is constrained to be unity, both T and R cannot be maximized simultaneously, and a compromise must be struck. As a result, the light collection efficiency of the conventional backscatter detector is inherently low, with only a few percent of the generated scintillation light collected into the photo detectors. Poor light collection can possibly create a secondary quantum sink and increase image noise. The light collection efficiency can be improved by increasing the sensitive area of the photo-detectors which is not only costly, but also adds weight and size. A conventional backscatter (BX) detector assembly with photomultiplier tubes (PMT) power supplies weighs typically between 3 and 4 g/cm$^2$. The light box is typically designed with an aspect ratio of 1:10 for height to thickness, in order to minimize the number of reflections from the internal surfaces. For typical sizes required for transmission detectors in handheld applications, the light box would be 2-3" in thickness, with additional thickness requires for PMT mounting. In addition to size and light collection efficiency, conventional light box detectors are inherently non-uniform in response for application as a transmission detector. Response across the screen in the locations where the PMT is located show a significant drop in response due to the lack of scintillator material in the back of the light box in these locations.

Detectors used in transmission imaging with a handheld flying spot X-ray scanning system may be constructed from materials which are far more thin and rugged than traditional flat panel detectors. For transmission X-ray detection with a handheld scanning system, the detector may not be rigidly attached to the body of the system. In this case, the detector is required to be the same size as the object being imaged, in order to intercept the flying spot beam across the area of interest. In such imaging configurations, the detector response may not be corrected or calibrated due to the non-uniform and non-repeatable illumination of the detector by the source. In this case, any non-uniformity in X-ray sensitivity will be displayed directly in the final images.

Portable hand-held scanners currently utilize low-profile, light-weight Wave-Shifting Fiber (WSF) X-ray detectors in order to generate transmission X-ray images. In general, WSF detector technology enables a low profile, rugged and large area detection of a flying spot x-ray beam. By way of background, wavelength shifting fibers consist of a core with relatively high refractive index, surrounded by one or more cladding layers of lower refractive index. The core contains wavelength-shifting material, also referred to as dye. Scintillation light which enters the fiber is absorbed by the dye which, in turn, emits light with a longer wavelength. The longer wavelength light is emitted isotropically in the fiber material. Total internal reflection traps a fraction of that light and conducts it over long distances with relatively low loss. This is possible, as described with reference to FIG. 2, because the absorption 204 and emission 202 wavelength ranges of the dye effectively do not overlap so that the wavelength-shifted light is not reabsorbed. The captured fraction is determined by the ratio of the refractive indices at surfaces of the fiber. An additional advantage of WSF is that the wavelength shifting can bring the scintillation light 206 into the sensitive wavelength range of the photo detector (PMT, silicon photomultiplier (SiPM), or Multiple-Pixel Photon-Counter (MPPC), or otherwise).

FIG. 3A illustrates a known X-ray detector comprising WSF and scintillator layers, which is disclosed in co-pending U.S. patent application Ser. No. 15/490,787, assigned to the Applicant of the present specification, which is herein incorporated by reference. U.S. Pat. Nos. 9,285,488 and 9,658,343, also assigned to the Applicant of the present specification, are herein incorporated by reference in their entirety. As shown, a layer of closely spaced parallel wavelength-shifting fibers 300 is sandwiched between two layers 303 of composite scintillating screen. One commonly used scintillator material is europium-doped barium fluorochloride (BaFCl:Eu), although other scintillators, such as BaFI:Eu, or other lanthanide-doped barium mixed halides (including, by way of further example, BaBrI:Eu and BaCsI:Eu), are also used. Composite scintillator 303 is structurally supported by exterior layers 304 of plastic, or other material, providing mechanical support. Optical contact between the fiber cladding 301 and the composite scintillator 303 is established by filling the voids with index-matching material 305 of suitable refractive index which is transparent to the scintillation light. The refractive index of the filling material is chosen to optimize the collection of primary light photons into the WSF and the capture of wavelength-shifted photons in the fiber. Filling material 305 may be optical grease or optical epoxy, for example.

Upon incidence of X-ray photons, scintillation light emitted by scintillator 303 is coupled via cladding 301 into core 307 of the respective fibers, down-shifted in frequency (i.e., red-shifted) and propagated to one or more photo-detectors, whereby the photo-detectors convert the light from the fiber cores 307 into a current. The current is integrated for an interval of time, typically in the range of 1-12 µs, to obtain the signal strength for each pixel. Integration of the detector signal may be performed by an integrating circuit (not shown), such as an integrating pre-amplifier, for example. The useful stopping power of the detector can be increased by combining multiple layers of WSF 300 thereby increasing the depth of scintillator material 303 along the path of the incident radiation. FIG. 3B illustrates a cross-sectional view of a typical WSF detector. As shown, a ribbon of WSF is sandwiched between scintillator screens 303. The fiber ends are bundled, cut and polished. The exit surface is mounted to a PMT. This guarantees efficient light collection. In order to minimize the number of PMT's, the fibers can also be bent into a U-shape, and bundled at one end of the detector.

One of ordinary skill in the art understands that the visibility of an artifact is a function of its size. Extended as well as abruptly changing artifacts are highly visible in a noisy background. For a WSF detector, a change in the efficiency of a single fiber (for instance a single point defect in a fiber) results in an extended and abrupt line defect. Such defects are highly visible as the defect extends across the length of the detector. In addition, non-uniformity may occur during or as a result of the manufacturing process of the WSF fiber (such as, but not limited to, cable bending, fiber bundling, and output coupling/polishing).

To overcome the challenges of achieving uniform response, a WSF detector must be manufactured in such a way that maintains the fiber position and bending uniformly across the full detector. Any variations in the spacing or bending can lead to non-uniformity in the detector response. As a result, wavelength-shifting fibers must be physically held by mechanical fixture across the full surface of the detector, which may number in the hundreds. The fiber threading the handling constitutes a manufacturing challenge which adds cost and drops final quality and yield. Thus, there is a need for a WS detector configuration for use in a flying spot transmission imaging system with improved spatial uniformity and reduced cost for materials and manufacturing.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses an X-ray detector comprising: at least one scintillator screen configured to absorb incident X rays and emit corresponding light rays; a wavelength shifting sheet (WSS) optically coupled with the at least one scintillator screen and configured to collect and spectrum shift the light rays, wherein the WSS has at least one edge; at least one wavelength shifting fiber (WSF) optically coupled with the at least one edge of the WSS and configured to collect the spectrum shifted light rays and spectrum shift the collected spectrum shifted light rays to generate twice-spectrum-shifted light rays; and a photodetector optically coupled to the WSF and configured to receive and detect the twice-spectrum-shifted light rays.

Optionally, the WSS comprises a first and a second surface wherein the at least one scintillator screen at least partially covers the first surface and a second scintillator screen at least partially covers the second surface. Optionally, the first surface is coplanar to the second surface.

Optionally, the at least one WSF is physically coupled with at least a portion of the edge of the WSS.

Optionally, the photodetector is a photomultiplier tube (PMT).

Optionally, the X-ray detector further comprises a reflector material covering the WSF to improve the collection of the spectrum shifted light rays. Optionally, the reflector material comprises at least one of a diffuse reflector or a specular reflector material.

Optionally, the at least one scintillator screen comprises a material having an optical absorption length and wherein a thickness of the at least one scintillator screen is less than the optical absorption length.

Optionally, the at least one scintillator screen comprises BaFCl:Eu.

Optionally, the X-ray detector further comprises a spatially varying attenuating material inserted between the at least one scintillator screen and the WSS, wherein the spatially varying attenuating material is configured to correct a non-uniformity in detection by the photodetector. Optionally, the spatially varying attenuating material comprises a plastic substrate printed sheet with absorbing ink on a surface of the plastic substrate printed sheet.

Optionally, the at least one scintillator screen is coupled with the WSS by placing the at least one scintillator screen over a surface of the WSS and wherein the at least one scintillator screen at least partially covers the surface.

The present specification also discloses an X-ray detector configured to detect X-rays, the detector comprising: at least one scintillator screen configured to absorb incident X rays and emit light rays based on the absorbed incident X-rays; a first wavelength shifting sheet (WSS1) coupled with the at least one scintillator screen configured to shift spectra of the light rays, wherein the WSS1 comprises at least one edge; a second wavelength shifting sheet (WSS2) coupled with at the least one edge of said WSS1 and configured to collect the spectra shifted light rays; and a photodetector configured to detect the collected spectra shifted light rays, wherein the photodetector is in optical communication with the WSS2.

Optionally, the WSS1 comprises a first and a second surface, wherein the at least one scintillator screen partially covers the first surface and a second scintillator screen partially covers the second surface. Optionally, the first surface is coplanar to the second surface.

Optionally, the photodetector is a photomultiplier tube (PMT).

Optionally, the X-ray detector further comprises a reflector material covering the WSS2 to improve the collection of the spectra shifted light rays. Optionally, the reflector material comprises at least one of a diffuse reflector or a specular reflector material.

Optionally, the at least one scintillator screen comprises a material having an optical absorption length and wherein a thickness of the scintillator screen is less than the optical absorption length.

Optionally, the at least one scintillator screen is made of BaFCl:Eu.

Optionally, the X-ray detector further comprises a spatially varying attenuating material inserted between the scintillator screen and the WSS, wherein the spatially varying attenuating material is configured to correct non-uniformity in detection photodetector.

Optionally, the spatially varying attenuating material comprises a plastic substrate printed sheet with absorbing ink on a surface of the plastic substrate printed sheet.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings:

FIG. 4A is a diagrammatical representation of a WSF detector panel;

FIG. 4B illustrates a diagrammatical front and side view of the WSF fibers coupled in a 4×4 array and being held by a mechanical fixture;

FIG. 7A illustrates a diagrammatical side view of a WSS X-ray detector, in accordance with an embodiment of the present specification;

FIG. 7B illustrates a diagrammatical front view of the WSS X-ray detector shown in FIG. 7A;

FIG. 9A illustrates light collection or acceptance cones in a wavelength shifting fiber;

FIG. 9B illustrates light loss cones in a wavelength shifting sheet;

FIG. 9C is a diagrammatical representation of light collection cones in a rectangular WS fiber;

FIG. 15A is a side view of a WSS detector comprising a plurality of channels for holding WS fibers, in accordance with an embodiment of the present specification;

FIG. 15B is a top-down view of the WSS detector shown in FIG. 15A, comprising a plurality of channels for holding WS fibers, in accordance with an embodiment of the present specification;

FIG. 17I illustrates a WSS detector panel placed underneath a car to collect transmission radiation emitted by a small portable scanner being used to scan a boot of the car, in accordance with an embodiment of the present specification;

FIG. 17J illustrates explosives hidden approximately two feet under the boot of the car shown in FIG. 17I;

FIG. 18A illustrates a portable detector for handheld imaging, as used in a transmission mode, in accordance with an embodiment of the present specification;

FIG. 18B illustrates a portable detector for handheld imaging, as used in a forward scatter mode, in accordance with an embodiment of the present specification;

FIG. 18C illustrates a portable detector for handheld imaging, as used in a back scatter mode, in accordance with an embodiment of the present specification;

DETAILED DESCRIPTION

Figure 1A:
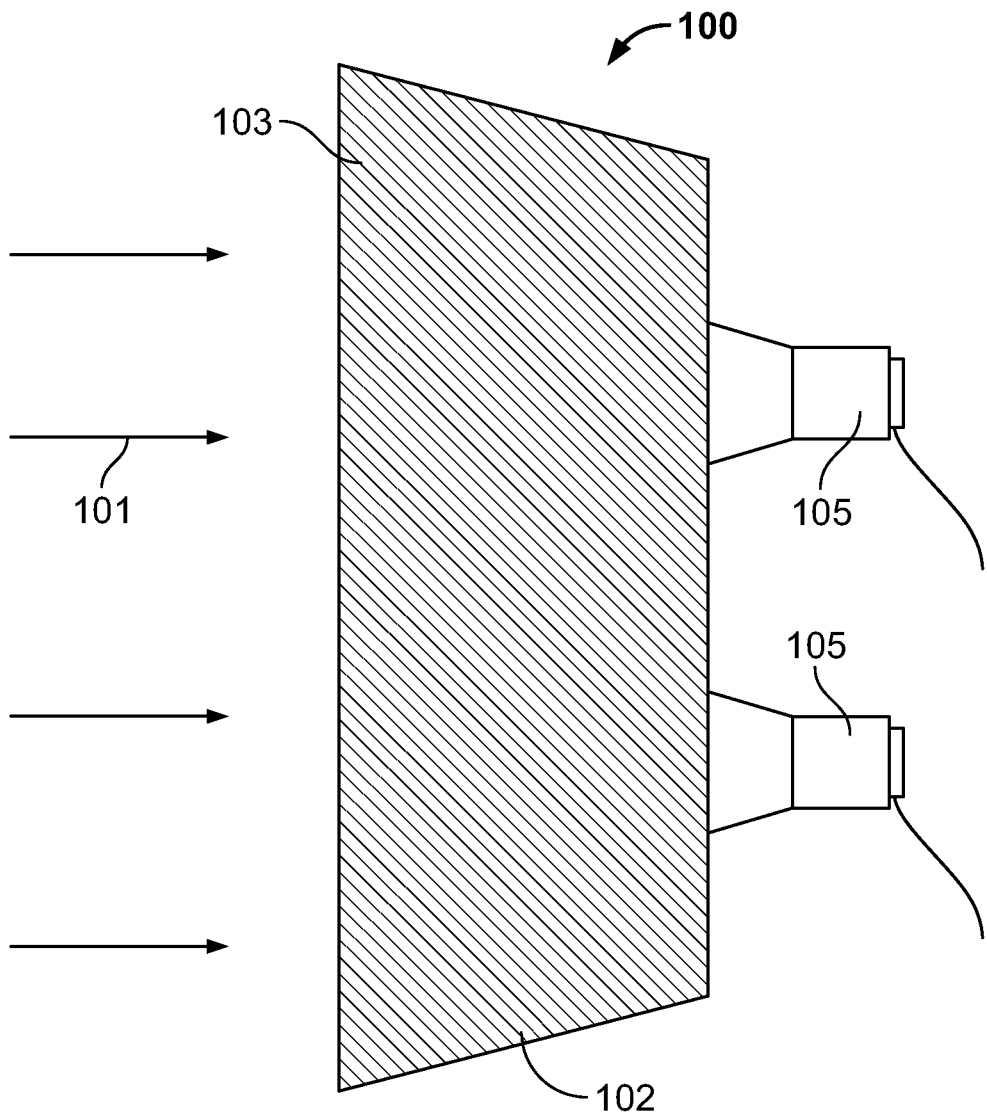
FIG. 1A shows a side cross-sectional view of a "box-type" prior art scintillation detector.
Figure 1B:
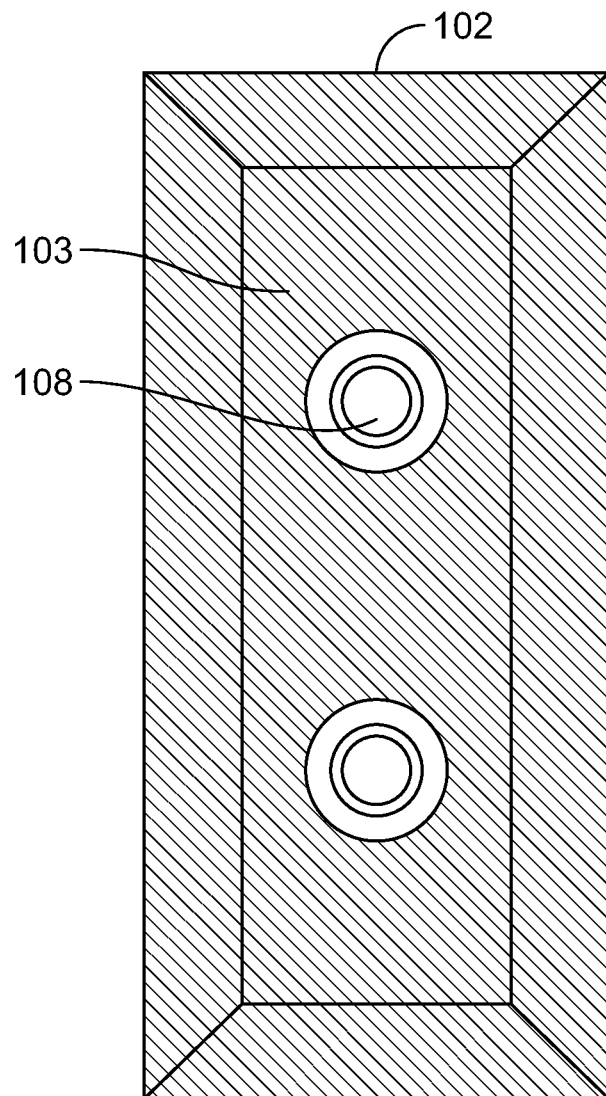
FIG. 1B shows a front cross-sectional view of a "box-type" prior art scintillation detector.
Figure 2:
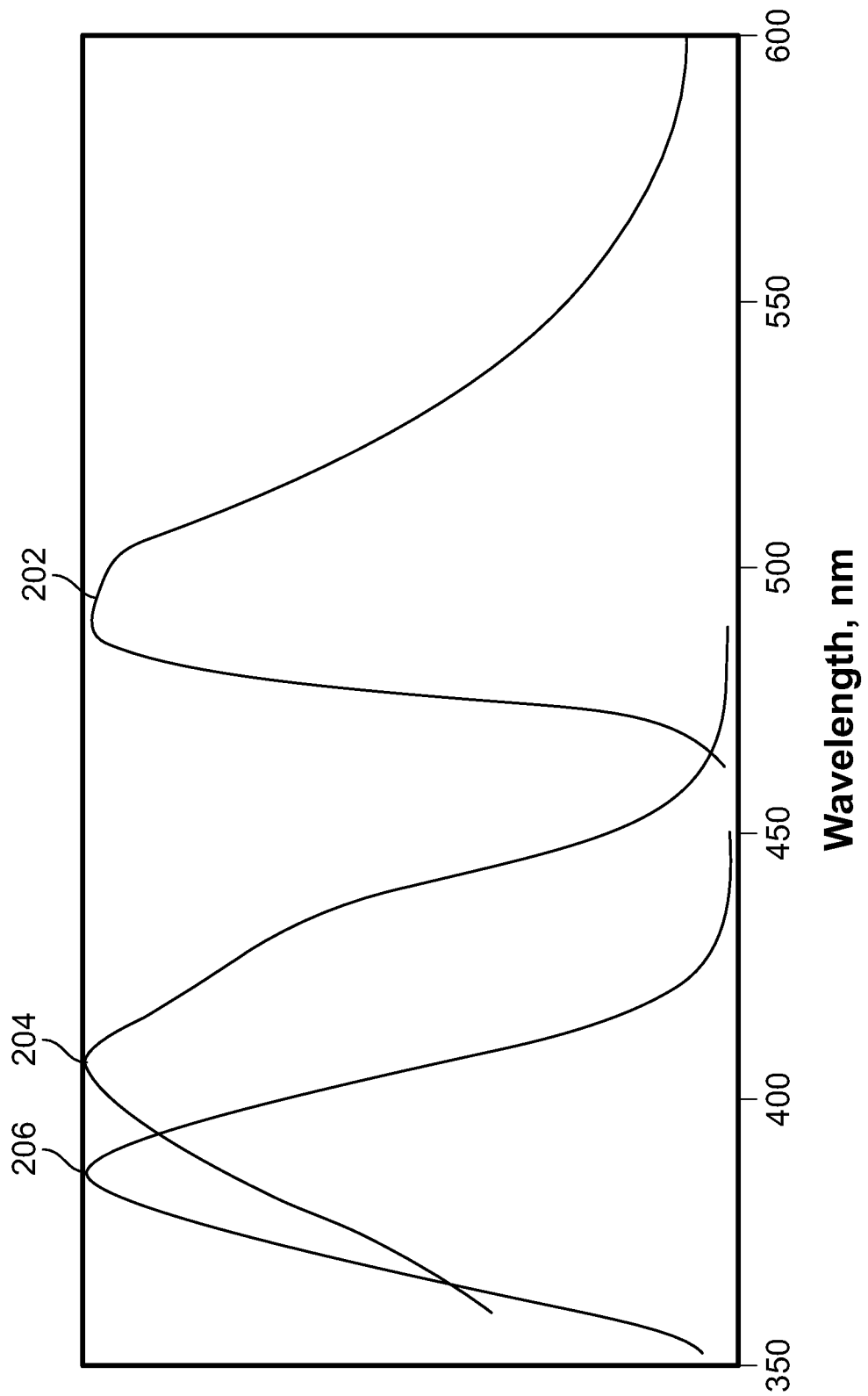
FIG. 2 depicts spectral relationships among scintillation light and typical wavelength-shifting fiber absorption and emission spectra as known in the prior art.
Figure 3A:
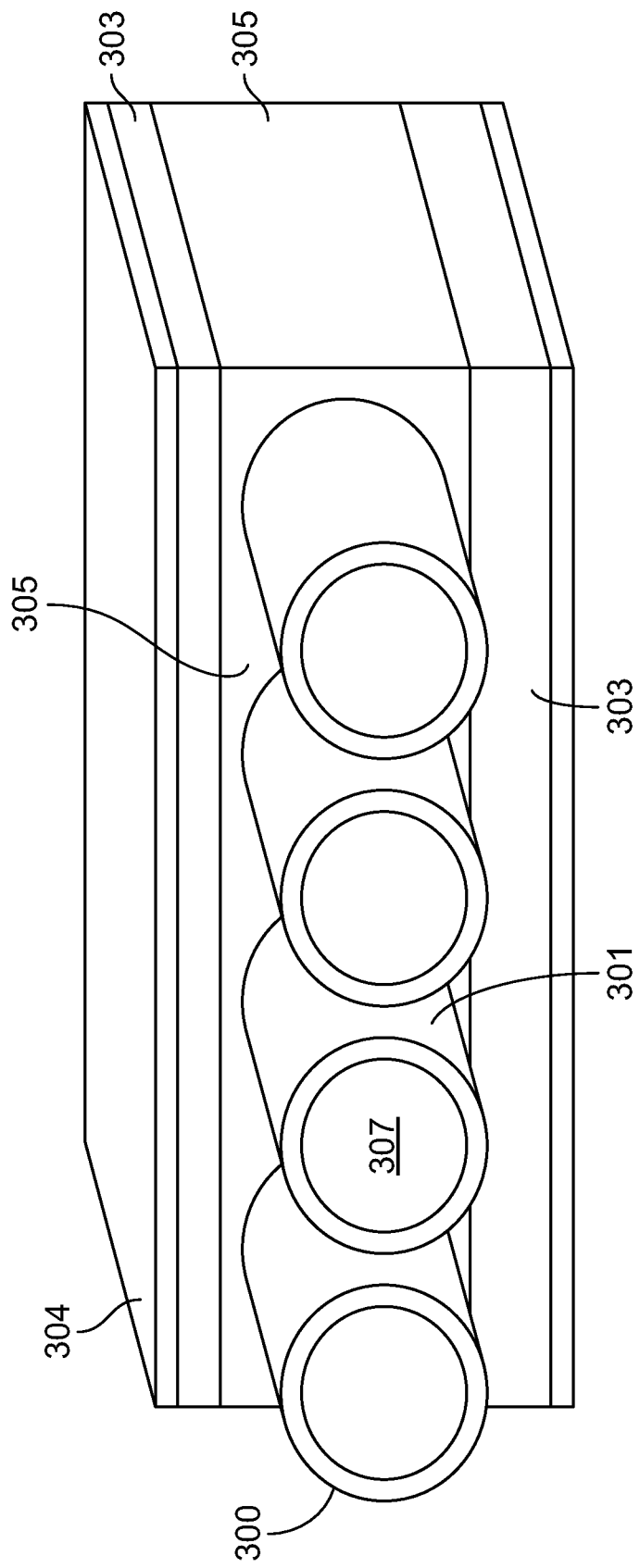
FIG. 3A illustrates a prior art X-ray detector comprising WSF and scintillator layers.
Figure 3B:
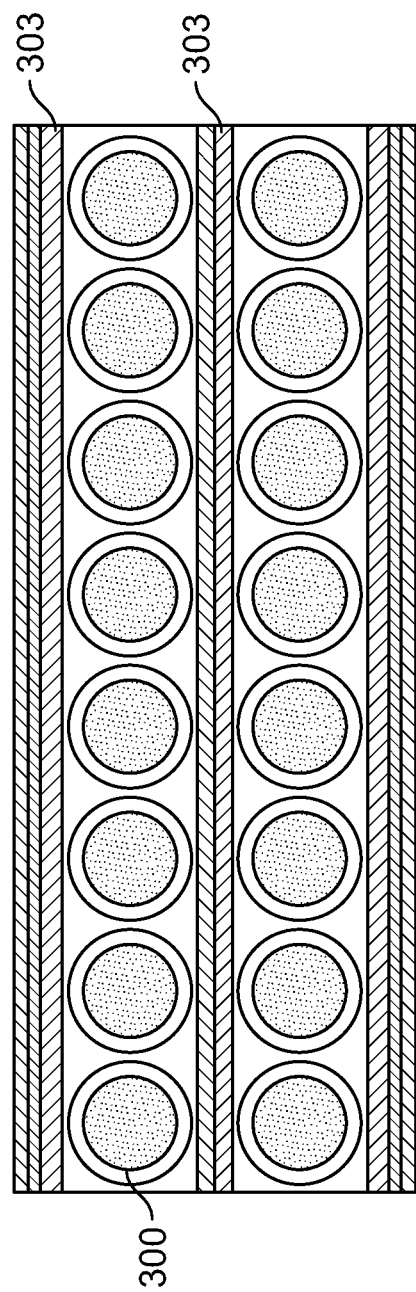
FIG. 3B is a cross-sectional view of a prior art wavelength-shifting fiber (WSF) based detector.

In an embodiment, the present specification discloses an X-ray detector for a flying spot transmission imaging system, wherein the detector enables improved spatial uniformity and reduced cost for materials and manufacturing.

Definitions

The term "image" shall refer to any unidimensional or multidimensional representation, whether in tangible or otherwise perceptible form, or otherwise, whereby a value of some characteristic (such as fractional transmitted intensity through a column of an inspected object traversed by an incident beam, in the case of X-ray transmission imaging) is associated with each of a plurality of locations (or, vectors in a Euclidean space, typically R2) corresponding to dimensional coordinates of an object in physical space, though not necessarily mapped one-to-one thereonto. An image may comprise an array of numbers in a computer memory or holographic medium. Similarly, "imaging" refers to the rendering of a stated physical characteristic in terms of one or more images.

Terms of spatial relation, such as "above," "below," "upper," "lower," and the like, may be used herein for ease of description to describe the relationship of one element to another as shown in the figures. It will be understood that such terms of spatial relation are intended to encompass different orientations of the apparatus in use or operation in addition to the orientation described and/or depicted in the figures.

Where an element is described as being "on," "connected to," or "coupled to" another element, it may be directly on, connected or coupled to the other element, or, alternatively, one or more intervening elements may be present, unless otherwise specified.

For purposes of the present description, and in any appended claims, the term "thickness," as applied to a scintillation detector, shall represent the mean extent of the detector in a dimension along, or parallel to, a centroid of the field of view of the detector. The term area, as applied to a detector, or, equivalently, the term "active area" shall refer to the size of the detector measured in a plane transverse to centroid of all propagation vectors of radiation within the field of view of the detector.

As used herein, and in any appended claims, the term "large-area detector" shall refer to any single detector, or to any detector module, subtending an opening angle of at least 30° in each of two orthogonal transverse directions as viewed from a point on an object undergoing inspection, equivalently, characterized by a spatial angle of at least $\pi$ steradians.

A "conveyance" shall be any device characterized by a platform borne on ground-contacting members such as wheels, tracks, treads, skids, etc., used for transporting equipment from one location to another.

The terminology used herein is for the purpose of describing particular embodiments and is not intended to be limiting. In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise. The singular forms "a," "an," and "the," are intended to include the plural forms as well.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

The X-ray detector disclosed in the present specification comprises a screen fabricated from a scintillator material, such as phosphor, that is optically coupled, in optical contact or in physical communication with a wavelength-shifting sheet (WSS), which shifts light absorbed from the scintillator screen. The wavelength shifting sheet is coupled to a wavelength shifting fiber or sheet at the edge of the wavelength shifting sheet that is configured to collect a plurality of first shifted rays. The rays collected from the edge are transmitted through to a photodetector, such as a photo multiplier tube (PMT).

In various embodiments, the use of a Wave Shifting Sheet (WSS) as the primary material for flying spot transmission X-ray detection reduces or eliminates objectionable, highly visible defects which are inherent in X-ray detectors implemented with solely Wave Shifting Fibers (WSF). In addition, the WSS detector can be fabricated using low cost plastic materials assembled in a simple manufacturing process. The WSS detector of the present specification can be used in conjunction with any flying spot x-ray system as a transmission, backscatter and forward scatter detector, and may also include multiple layers for materials discrimination.

Figure 4C:
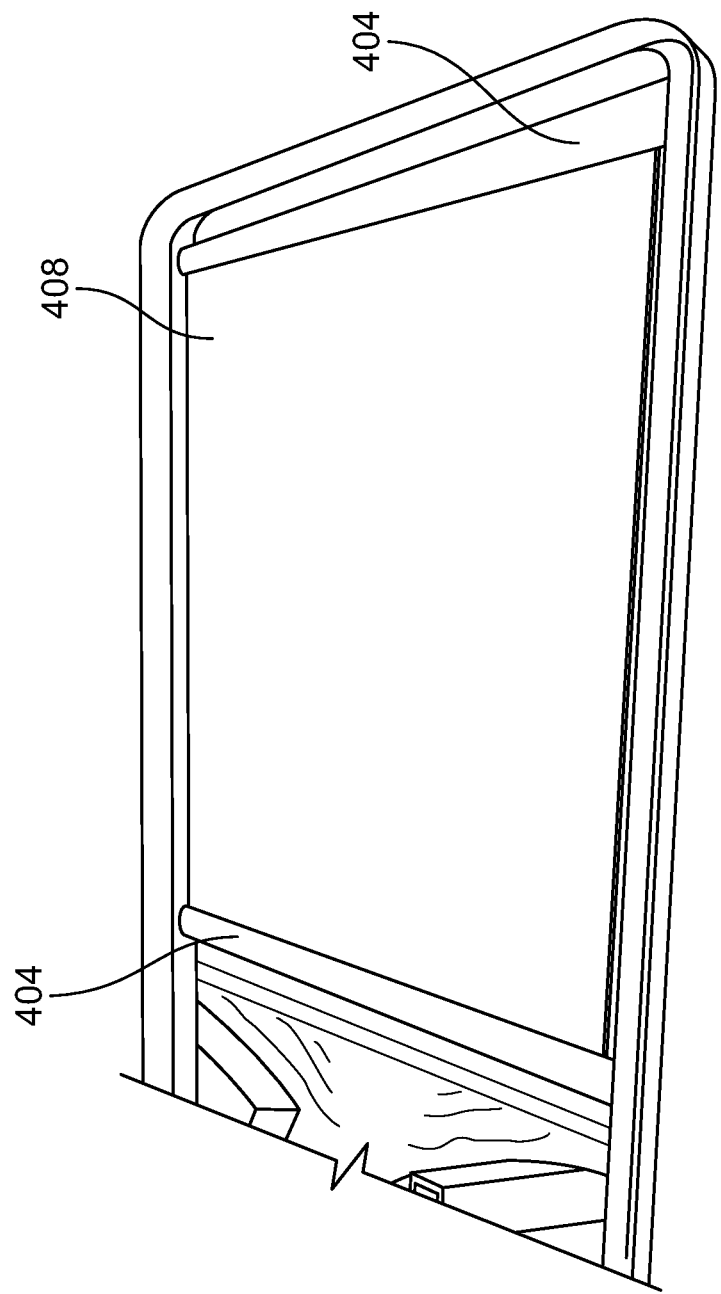
FIG. 4C is an illustration of the WSF detector panel described with respect to FIG. 4A.

FIG. 4A illustrates a diagrammatical representation of a WSF detector panel. FIG. 4B illustrates a diagrammatical front and side view of the WSF fibers coupled in a 4×4 array and being held by a mechanical fixture. As shown in FIGS. 4A and 4B, a plurality of WSF fibers 402 are coupled with a scintillator screen 408 such that the fibers 402 are positioned between the scintillator screen 408 and a photomultiplier tube (PMT) 406. The fibers 402 held by a mechanical support 404 at the edges and fibers 402 are in contact with each other without having any space therebetween. In order to reduce the number of fibers required in the detector by half, a single fiber loops back from the mechanical support 404 to the PMT 406 causing said fibers to bend as shown in FIG. 4A. In various embodiments, fiber ends may be trimmed and polished to improve optical transmission and response uniformity. Optical grease may be used to improve the optical transmission from the fiber to the PMT. FIG. 4C illustrates the WSF detector panel of FIG. 4A, in accordance with an embodiment of the present specification. The detector panel is preferably made of off-the-shelf (OTS) materials, and the constituent WSF fibers are held together without any spacing between them.

Figure 4D:
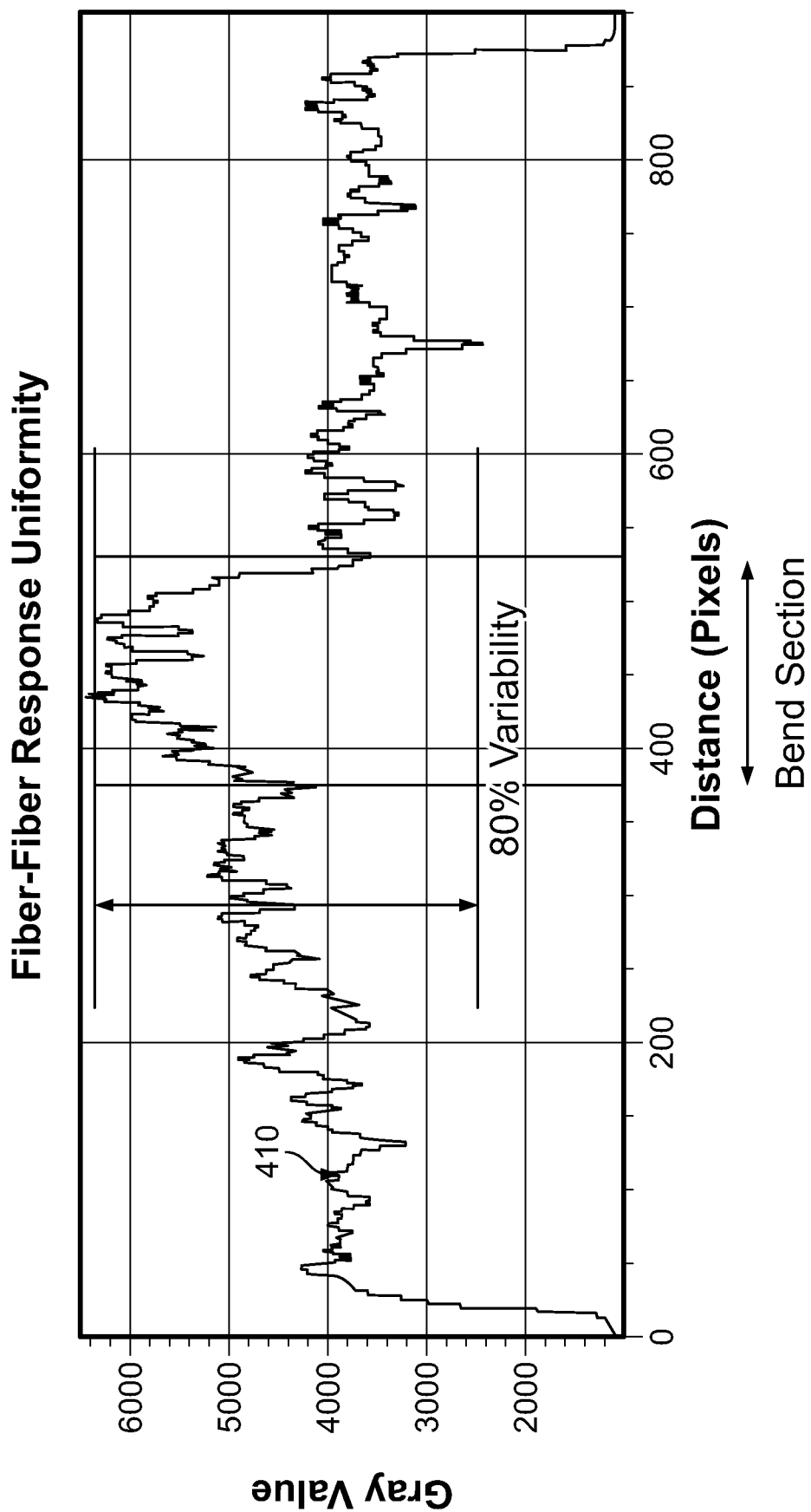
FIG. 4D is a plot illustrating fiber-fiber response uniformity across the prior art detector panel shown in FIG. 4A.

FIG. 4D illustrates a graph 410 illustrating the fiber response uniformity of the detector panel shown in FIGS. 4A and 4B. An example of the uniformity across the detector (from fiber to fiber) is plotted in FIG. 4D. The greyscale plot 410 depicts the signal across the detector. In this case, variability is created due to the groups of bends in the fiber at the ends of the detector as shown in FIG. 4A. The variability is enough to create artifacts which are visible during imaging, cannot be corrected or calibrated, and could be objectionable to the user during typical imaging. Plot 410 also depicts the output light intensity as a function of input X-ray beam position as measured across the detector. The light response output has 80% variability as calculated by the difference between the maximum and minimum intensity divided by the mean.

Figure 5:
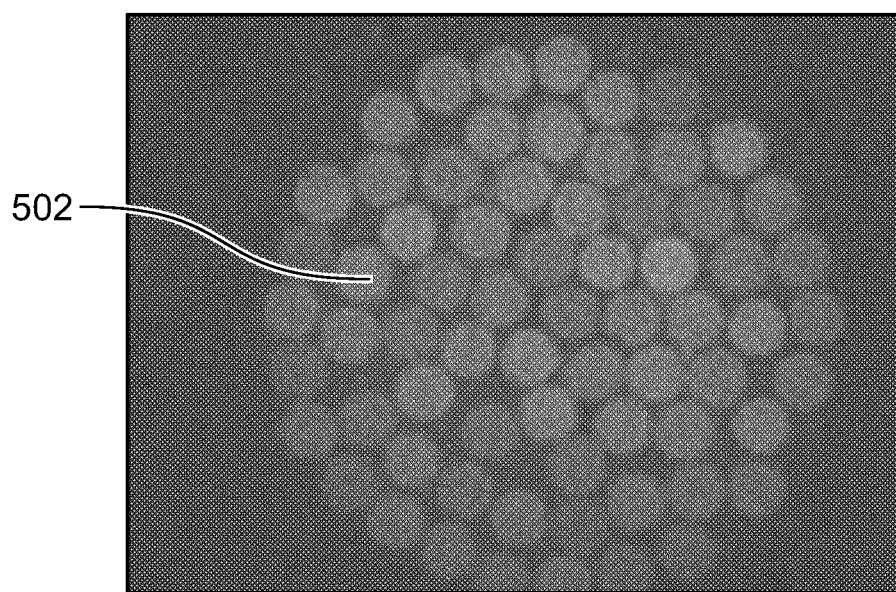
FIG. 5 is a pictorial representation of a bundled end of 1 mm wave-shifting fibers, which have been cut and polished for coupling to a PMT surface.

Conventionally, wave-shifting fibers are cut and their ends are polished for coupling to a PMT surface. FIG. 5 shows the bundled end of 1 mm wave-shifting fibers 502 which have been cut and polished for coupling to a PMT surface. Any non-uniformity in the polishing of the bundle from fiber to fiber will lead to light loss in an individual fiber. The light loss will create a line defect across the entire image detected by the PMT.

Wavelength Shifting Sheet (WSS) Detector Structure

Figure 6A:
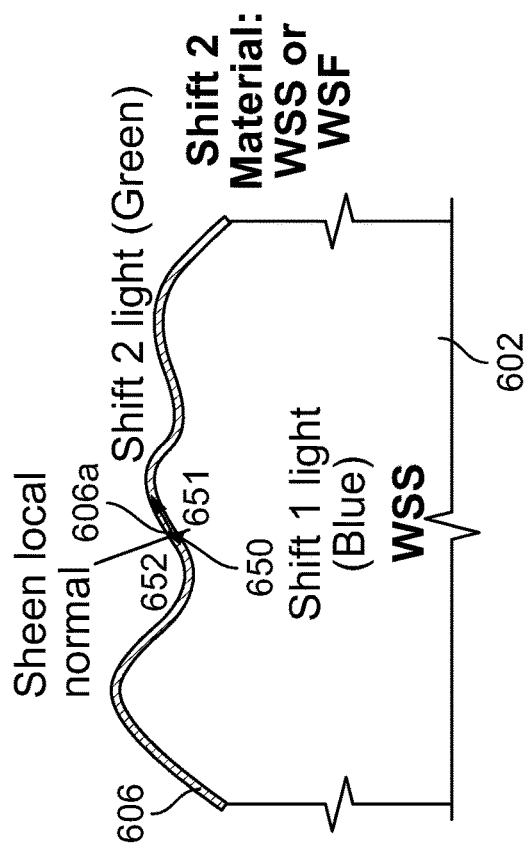
FIG. 6A illustrates a wavelength shifting sheet (WSS) detector, in accordance with an embodiment of the present specification.
Figure 6B:
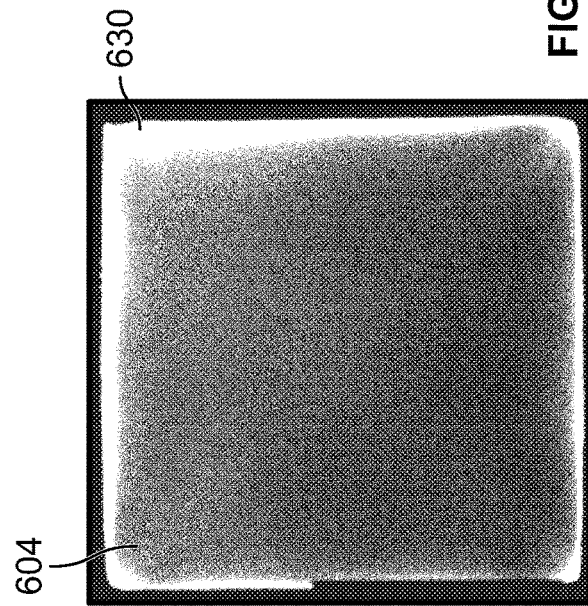
FIG. 6B is a side view of the WSS detector shown in FIG. 6A.

FIG. 6A illustrates a Wave Shifting Sheet (WSS) X-ray detector, in accordance with an embodiment of the present specification. FIG. 6B is a side view of the WSS detector shown in FIG. 6A. Referring to both FIGS. 6A and 6B, WSS detector 600 comprises a sheet 602 fabricated from a wavelength shifting material and at least partially covered by a scintillator screen 604 on at least a portion of, or the entirety of, a first surface 602a of a first side or at least a portion of, or the entirety of, a second surface 602b of a second side, or preferably both the first surface 602a of the first side and the second surface 602b of the second side, of sheet 602, as shown in FIGS. 6A and 6B. In various embodiments, the sheet 602 is a contiguous WSS sheet, and is characterized by a single solid media with single thickness throughout its surface. In an embodiment, sheet 602 is not comprised of a solid ribbon or a ribboned bundle of wavelength shifting fibers. In an embodiment, sheet 602 has a smaller aspect ratio compared to a conventional WS ribbon. In an embodiment, the first surface 602a of the first side or the second surface 602b of the second side, or preferably both the first surface 602a of the first side and the second surface 602b of the second side of sheet 602, is smooth and the surfaces are coplanar with minimal defects in order to maintain total internal reflection and minimize the loss of light. In various embodiments, defects may include any surface imperfections such as scratches, pits, surface particles, fibers or surface bumps/burrs; as well as defects interior to the sheet including bubbles, captured particles or fibers. In embodiments, the surfaces of the sheet 602 are polished and free of scratches, pits, or imperfections. In an embodiment, the surfaces are polished to less than 0.5 µm RMS roughness with less than 10 isolated defects of size up to 100 µm in size in a total area of 1 cm$^2$, less than 3 isolated defects of size ranging from 100 µm to 500 µm in size in a total area of 1 cm$^2$, and no defects are larger than 500 µm.

Typically, in a ribboned bundle of WS fibers, the individual fibers have an aspect ratio of 1 mm×2 mm which is constrained to fit the area of a typical PMT. In an embodiment, for a horizontal detector sheet, a typical circular fiber diameter is 1 mm.

In the WS sheet of the present specification, the aspect ratio may be constrained to a thickness ranging from 1 mm to 10 mm and a width ranging from 2 mm to 3,000 mm. In an embodiment, the thickness of the WS sheet 602 ranges from 2 mm to 10 mm and the width ranges from 2 mm to 5 mm in order to capture a majority of the light exiting the sheet.

In an embodiment, the scintillator screen 604 is a phosphor screen. In an embodiment, the border edge 606 of the wavelength shifting material sheet 602 comprises a wavelength shifting fiber(s) 607 which, in turn is coupled to a photodetector, such as a photomultiplier tube (PMT) 608. In an embodiment, a second WS material sheet is used in place of the WS fiber(s) 607. Thus, in an embodiment, the edge 606 of the wavelength shifting material sheet 602 may comprise a second wavelength shifting material or a wavelength shifting fiber(s), which may be different from the material of WS sheet 602. During operation of the X-ray detector 600, the scintillator screen 604 absorbs any incident X-rays and emits corresponding light rays which are then shifted by the sheet 602. The shifted light is collected by the wavelength shifting (WS) fiber 607 provided at the edge 606. The shifted light is then shifted again by the WS fiber 607 and transmitted through to the PMT 608 for subsequent detection. Since, in this embodiment, only two fibers (one from a first side and one from a second side) enter the PMT 608, a required PMT area is less than that required with prior art detectors.

In an embodiment, the second WS material used in edge 606 of the WSS 602 has a refractive index of 1.5 or greater to improve a capture efficiency of total internal reflection of light which is generated by fluorescence inside the material. In various embodiments, the WS material used in edge 606 absorbs light from the WS sheet 602 and fluoresces at a longer wavelength, and efficiently trapping fluorescent light. In embodiments, the WSS detectors of the present specification are manufacturing using polyvinyl butyral for sheet 602 and polystyrene (n=1.6) with PMMA cladding for the wavelength shifting fiber 607.

Figure 6C:
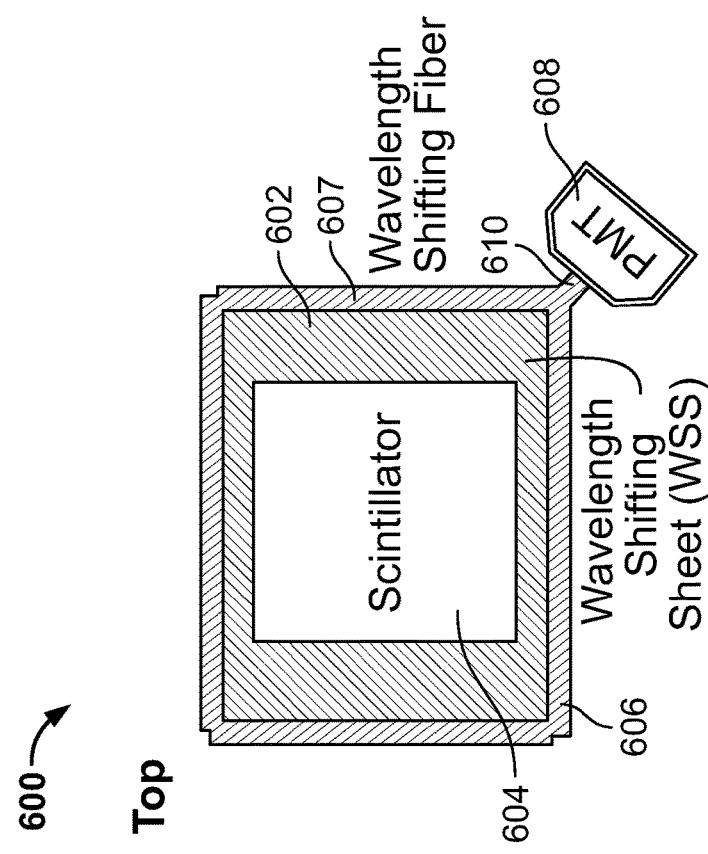
FIG. 6C is a diagrammatical representation of a WS detector, showing light shifted by a second WS material in a direction perpendicular to an edge of a WS detector, in accordance with an embodiment of the present specification.

FIG. 6C is a diagrammatical representation of a WS detector, showing light shifted by a second WS material in a direction perpendicular to an edge of a WS detector, in accordance with an embodiment of the present specification. In various embodiments, a light ray 650 which is shifted by the sheet 602 is absorbed by the second WS material of edge 606 at a location 606a, and re-directed in a direction 651 perpendicular to a line 652 that is normal to location 606a as shown in FIG. 6C. The WS sheet 602 may have an irregular shaped edge, however the light ray re-direction is always normal to the edge location at which the light ray is received after it is redirected by sheet 602.

In various embodiments, the highest capture efficiency for the WS sheet 602 occurs when the media surrounding the sheet 602 has an index of 1 (air), and the index of the sheet 602 is as high as possible. Hence, in embodiments, the WSS detector 600 is obtained by placing a scintillator screen 604 over a wavelength shifting sheet 602 to maintain an air gap between the scintillator 604 and the WSS 602, and as such, does not require an embedding or molding process, thereby decreasing the cost of manufacture. If an adhesive is used to couple the sheet scintillator 604 and the WS sheet 602, a low-index adhesive is beneficial, because, as is known, the total fraction of fluorescent light collected by an infinite WS sheet without scattering corresponds to the following formula:

$$F = \sqrt{(1 - n_1^2/n_2^2)}$$

where $n_1$ is the index of refraction of the surrounding media and $n_2$ is the index of refraction of the WS sheet medium. Hence, in some embodiments, small regions of adhesive material may be used to attach the scintillator screen, with the contact area remaining as small as possible.

In various embodiments, the scintillator screen 604 does not cover the entire surface of the WS sheet 602. In embodiments, a scintillator screen 604 smaller than the WS sheet 602 may be coupled with the WS sheet 602 in such a manner that the scintillator screen 604 is not in contact with the WS sheet near the edges 606, in order to improve uniformity of the image obtained by using the detector 600. If the scintillator screen 604 is placed close to the edge of the WSS 602, there is a greater amount of direct exposure to the edge fiber(s). The scintillator screen 604 absorbs any incident X-rays and emits corresponding light rays which are then shifted by the sheet 602 and then absorbed by the WS fiber 607 at the edge 606 of the sheet 602 for a second shift. If scintillation screen 604 is placed close to the edge of the WSS 602, the photons from light emitted due to scintillation are so close to the fiber(s), that they are directly absorbed by the WS fiber 607, without being shifted by the WS sheet 602.

Figure 6D:
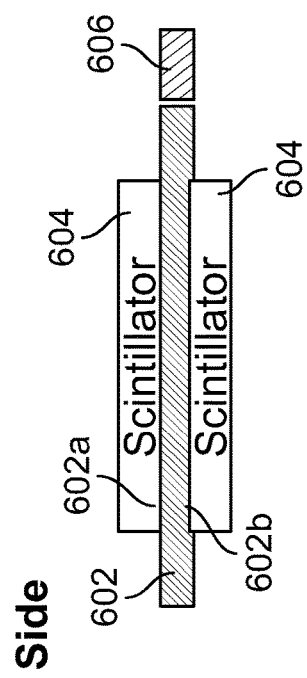
FIG. 6D is a pictorial representation of an image obtained by placing a scintillator screen close to the edge of the WSS.

FIG. 6D is a pictorial representation of an image obtained by placing a scintillator screen close to the edge of the WSS. Bright regions 630 at the edge region are caused by direct illumination (not WSS shifted) scintillator light striking the WSF. Hence, in various embodiments, the scintillator screen 604 is of a different size than WSS 602. In an embodiment, the scintillator screen 604 is either cut smaller than the WSS, or an opaque material is applied along the edges of the scintillator screen to block out a portion of the scintillator screen edge.

Since the light transmitted to the PMT 608 exits from a narrow region 610 along the edge of the WSS detector 600, in an embodiment, the PMT 608 may be included in the same enclosure as the WSS detector 600, or may be coupled through a clear fiber optic cable to an external PMT (not shown in the FIG. 6A) having an area equal to or larger than the exit area of the cable. In an embodiment, having a coupling with a cable from both ends of the detector to minimize cable absorption losses, an external PMT having an area equal to approximately 20 mm$^2$ is used for a total WS sheet thickness of 3 mm to 5 mm and a width of an edge border WS fiber at approximately 2 mm, for absorption of 90% of the incident light.

In various embodiments, the areal density of the top and bottom scintillating screen 604 can be optimized for maximum x-ray absorption.

FIG. 7A illustrates a diagrammatical side view of a WSS X-ray detector, in accordance with an embodiment of the present specification. FIG. 7B illustrates a diagrammatical front view of the WSS X-ray detector shown in FIG. 7A. As shown a first set of incident X rays 702 are absorbed by a top scintillator layer 704 and the corresponding emitted light 703 enters the WSS layer 706, which in turn shifts the light 703 a first time and transmits the light outward, to its edges, in all directions such that the light 703 is received, absorbed, and then shifted a second time by WS fibers 708. A second set of incident X rays 710 which pass through the top scintillator layer 704 and the WSS layer 706, are absorbed by a bottom scintillator layer 712 and the corresponding light re-enters the WSS layer 706, which in turn shifts the light and transmits the light outward, to its edges, in all directions such that the light is also absorbed by WS sheet or fibers 708. The shifted light absorbed by the WS sheet or fibers 708 and shifted again are transmitted along the length of the WS sheet or fibers and subsequently transmitted into a photo multiplier tube (PMT) 714 for detection. In an embodiment, a second WS material sheet is preferably used in place of the WS fibers 708.

An advantage of the second shift of light by the WS sheet or fibers 708 is that the photons are concentrated into a smaller exit face area. With a single shift as used in most currently available detectors, the PMT area is proportional to the width of the detector multiplied by its thickness. A typical detector width is 400 mm and a typical thickness of a WS fiber is 1 mm, leading to a required PMT area of 400 mm². By using a WS sheet instead of fiber and thus incorporating a second shift, the PMT area needed reduces to the thickness of the WS sheet multiplied by the width of the second shift region or edge region. A typical sheet thickness is 2 mm and a typical width of the second WS material 708 is 2 mm, which equals a required PMT area of 4 mm², with a significant reduction by a factor of 100×. The area reduction factor is limited by both a light trapping efficiency and a fundamental physical limit which prevents light concentration where the total entropy is reduced.

Figure 7C:
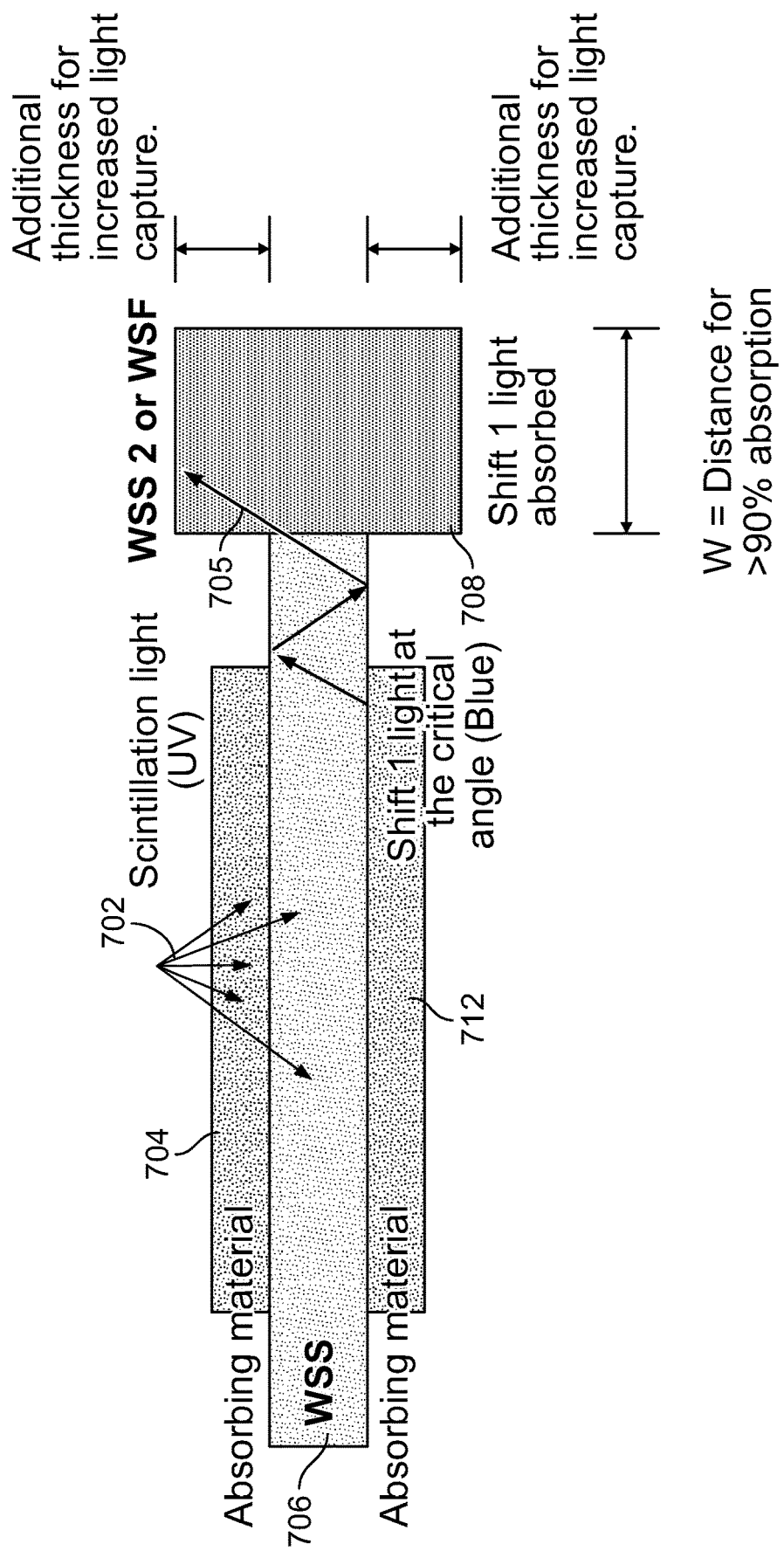
FIG. 7C illustrates a diagrammatical side view of a WSS X-ray detector, wherein the thickness of the second WS material is increased, in accordance with an embodiment of the present specification.

In an embodiment, the second WS material 708 covers the entire face of the first WS sheet 706. Further in an embodiment, the efficiency of the light collection in the WS sheet 708 is improved by increasing the thickness of the second WS material 708. FIG. 7C illustrates a diagrammatical side view of a WSS X-ray detector, wherein the thickness of the second WS material 708 is increased, in accordance with an embodiment of the present specification. As shown in FIG. 7C, the additional thickness captures light 705 which exits the second WS material 708 at an angle equal to the critical angle of the material. In an embodiment where the width and thickness of the second WS material 708 is 'W' and 'T', respectively, the optimized value of 'T' for capturing of 90% of the light emitted by WS sheet 706 is:

$$T2=T1+2\cdot\cos(\alpha_c)$$

where '$\alpha c$' is the critical angle for first WS sheet 706, and $\sin(\alpha c)=1/n$; where 'n' is the refractive index for second WS material 708, assuming air is surrounding second WS material 708. In embodiments where the second WS material 708 is fiber, the light capture efficiency is dependent on the shape of the fiber, and a greater capture efficiency may be obtained by using a square cross section of WS fiber 708.

In an embodiment, a reflector material 716 is provided around all exposed edges of WS fiber or sheet to improve X ray absorption and transmission to the PMT 714. The reflector material 716 may be composed of a diffuse reflector (paint or tape) or a specular reflector material (metallic).

In various embodiments, the thickness of the top scintillator layer 704 does not exceed the optical absorption length of the scintillator material, as that may lead to absorption of X-rays which do not contribute to the signal detected by PMT 714. As is known, the optical path length in a scintillator screen 704 is limited by absorption of light scattered in the phosphor. Hence, X-rays which are absorbed near the top of the scintillator screen 704, emit light which is absorbed before exiting the bottom of the scintillator screen 704 and entering the WSS 706.

The scintillator material emits visible light, preferably in the UV portion of the spectrum in order to maintain efficient energy transfer. In an embodiment, Europium-doped barium fluorochloride (BaFCl:Eu) is used as the scintillator material. In other embodiments various other suitable scintillator materials, such as, but not limited to Gadolinium Oxysulfide, and Cesium Iodide may be used.

There are advantages to collecting light shifted by the WS sheets with a wavelength-shifting fiber 607 used at the edges of the sheet 602, as opposed to using a second wavelength shifting sheet, including the following:

WS fibers are not directly illuminated in the active area of the image, and thus variations in individual fibers response (output coupling, bend loss, fiber defects) affect only large regions of the image and not lines across the image;

WS fibers enable more efficient collection around the corners of the detector; and, WS fibers are flexible and the coupling cable can be extended past the edge of the active area of the detector to enable remote coupling to the PMT at a large distance from the detector (up to 1 meter).

Figure 7D:
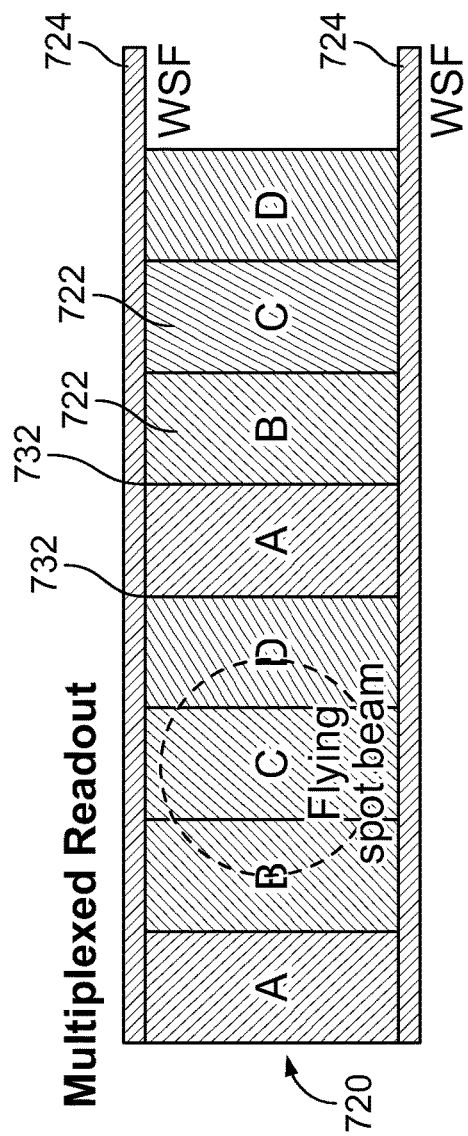
FIG. 7D is a block diagram of a segmented WS sheet of a WSS X-ray detector, in accordance with an embodiment of the present specification.
Figure 7E:
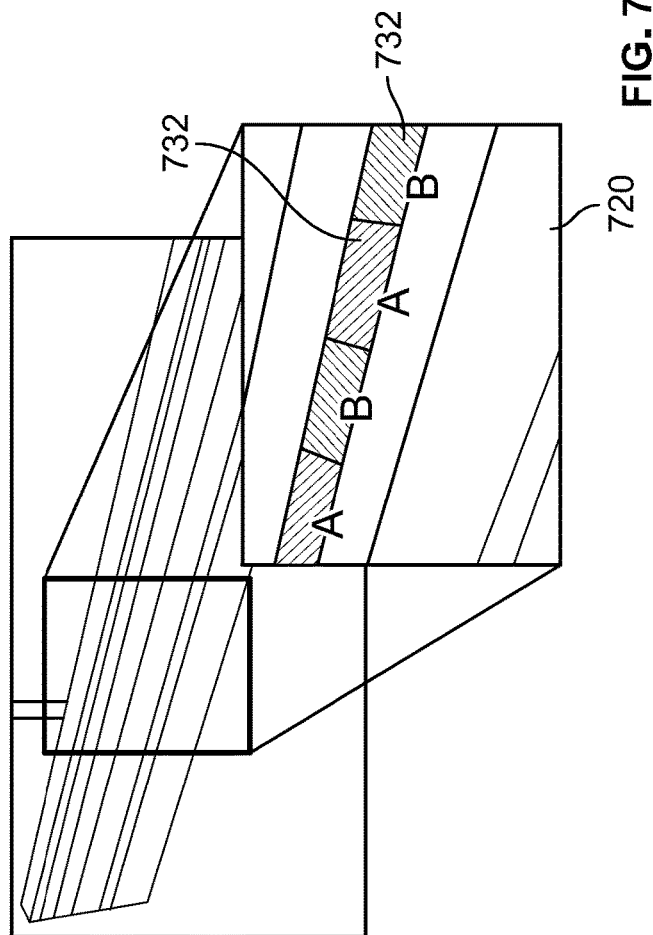
FIG. 7E illustrates a plurality of channels milled into the surface of a WS sheet, in accordance with an embodiment of the present specification.
Figure 7F:
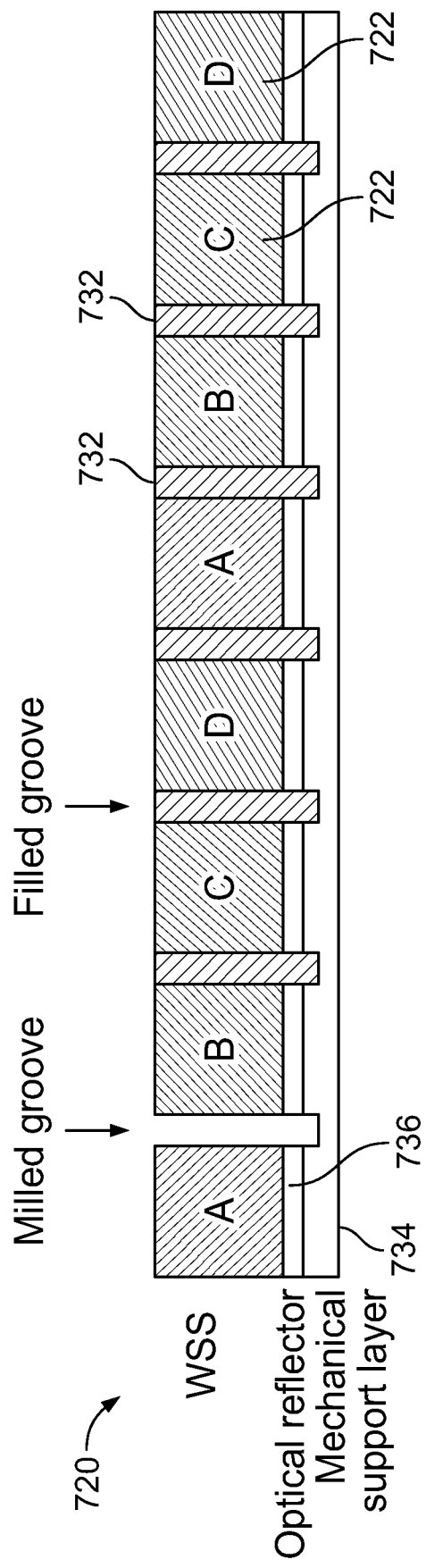
FIG. 7F is a block diagram illustrating a front view of FIG. 7E, showing channels milled into the surface of a WS sheet, in accordance with an embodiment of the present specification.
Figure 7G:
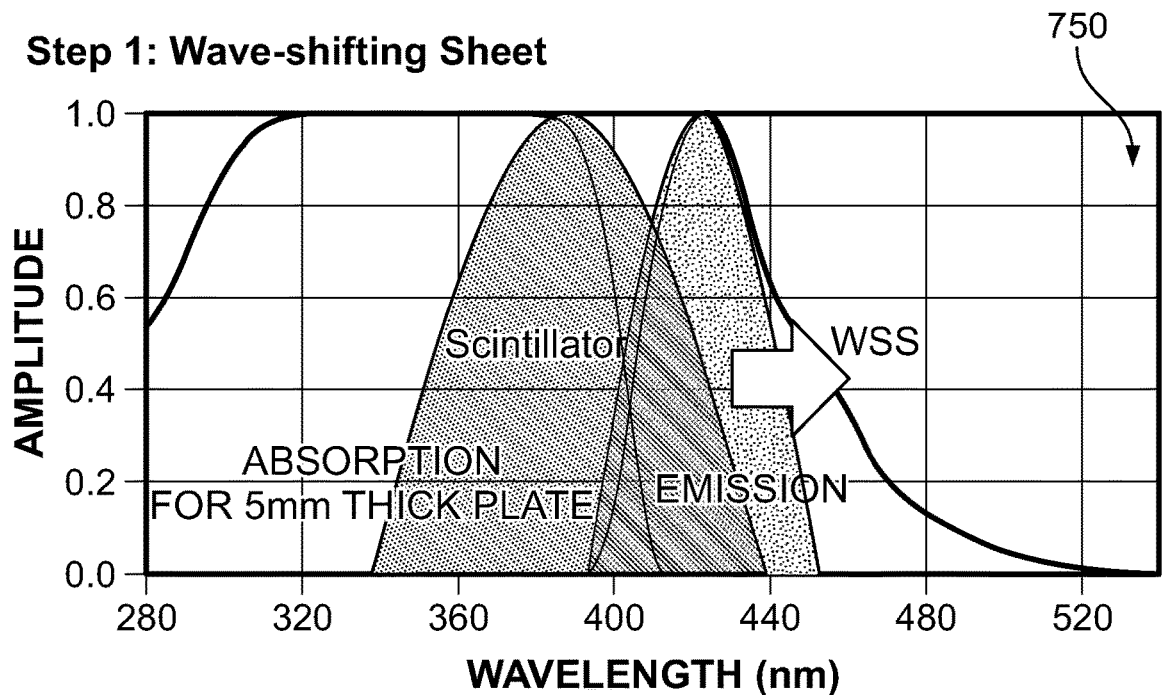
FIG. 7G illustrates a two-step spectral overlap in a segmented WSS detector, in accordance with an embodiment of the present specification.
Figure 7G:
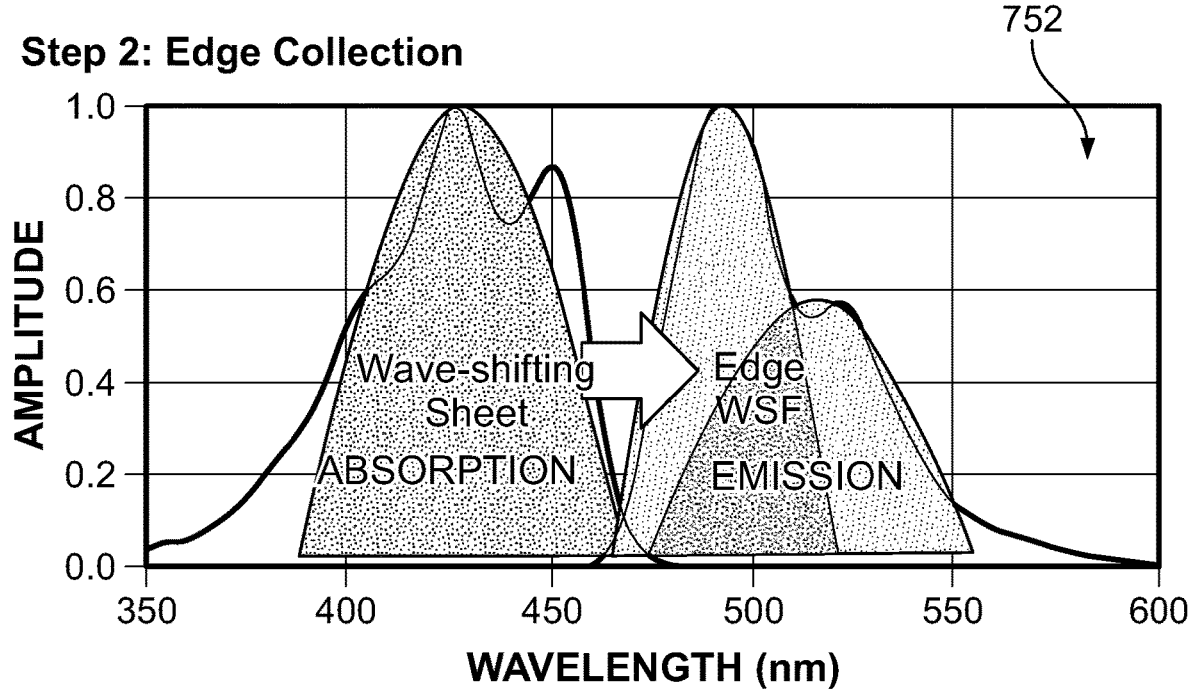

In an embodiment, the WS sheet of the detector as described with reference to FIGS. 7A, 7B, and 7C is optically segmented into pixels using a mechanical milling process. FIG. 7D is a block diagram of a segmented WSS of a WSS X-ray detector array, in accordance with an embodiment of the present specification. WSS 720 comprises a plurality of segments 722 formed by milling grooves 732 into WSS 720, bound by WS fibers 724 at the edges. In various embodiments, the grooves have a thickness ranging from 0.25 mm to 1 mm and a depth ranging from 50% to 90% of the total sheet thickness are cut into WS sheet having a minimum thickness of 0.5 mm. In various embodiments, the milled regions 732 (dead region) are made as thin as possible to maintain detector efficiency. FIG. 7E illustrates grooves 732 milled into the surface of a WS sheet 720, in accordance with an embodiment of the present specification. FIG. 7F is a block diagram illustrating a front view of grooves milled into the surface of a WS sheet, in accordance with an embodiment of the present specification. As shown in FIGS. 7D, 7E and 7F, WS sheet 720 is divided into a plurality of segments 722 by grooves 732. In embodiments, the grooves 732 may be filled with reflector material such as, but not limited to, 3M ESR tape, Teflon tape, or white $TiO_2$ paint to prevent cross talk of optical photons between pixels while also improving detector efficiency. To maintain the mechanical structure of the WSS 720 when the grooves are placed into the WS material, the sheet may be adhesively bonded to a light-weight and thin mechanical support 734. In embodiments, the top of the mechanical support 734 is coated with a reflector material 736 to reflect scintillator light into the sheet. The minimum pixel size, which in an embodiment is 0.5 mm is limited by the machining of the grooves. If the pixel size is approximately the same as the groove width, the dead region in the pixel will be large and the detector will not function. The minimum pixel size may be approximately 2 mm, for a 0.5 mm groove width. As described with reference to FIGS. 7A and 7D, the segmented pixelated WS sheet is covered with a scintillator layer for converting incident X rays into light rays which are collected by a WS fiber provided at the edge of the WSS detector and fed to a PMT. FIG. 7G illustrates a two-step spectral overlap in a WSS detector having a segmented WSS, in accordance with an embodiment of the present specification. Plot 750 illustrates absorption and emission plots of both a scintillator and WSS while plot 752 illustrates absorption and emission plots of both the WSS and WSF. Plot 750 demonstrates the light spectrum overlap between the emission spectra of the scintillator and the absorption of the WSS. Plot 752 demonstrates the spectral overlap between the WSS and the WS fiber. Regions where the two curves do not overlap represent inefficiency in the light coupling between the detector layers.

Figure 8A:
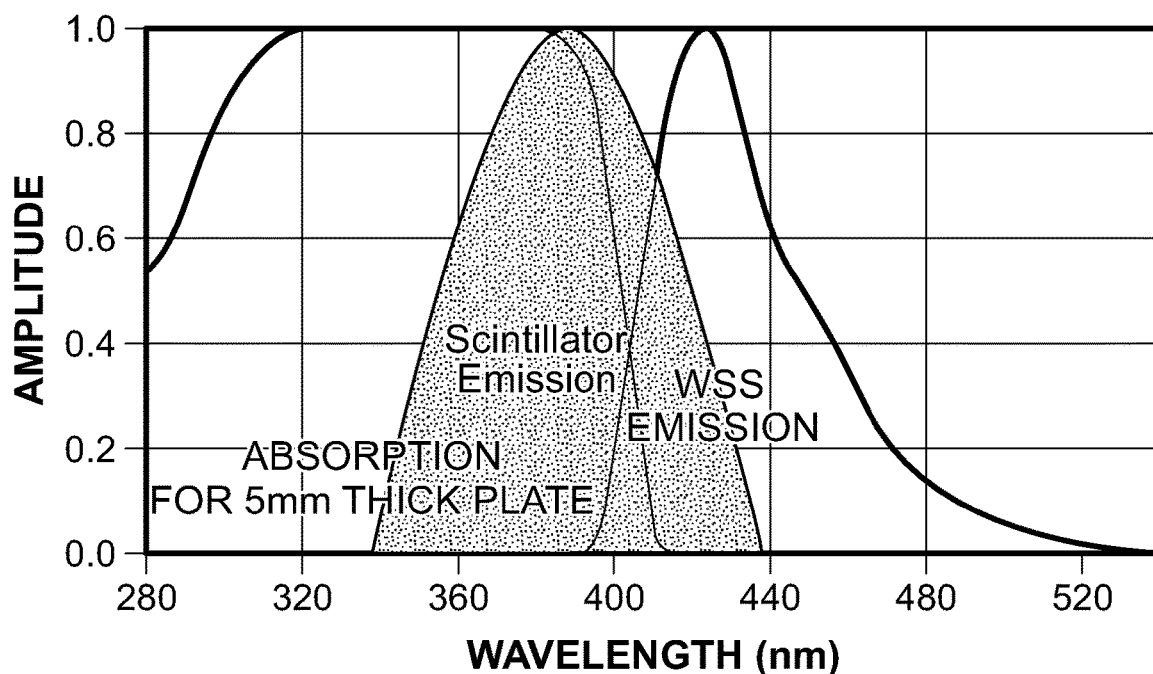
FIG. 8A is a graph depicting an absorption and emission spectra of BaFCl:Eu in the wavelength shifting sheet layer of the detector shown in FIG. 7A.
Figure 8B:
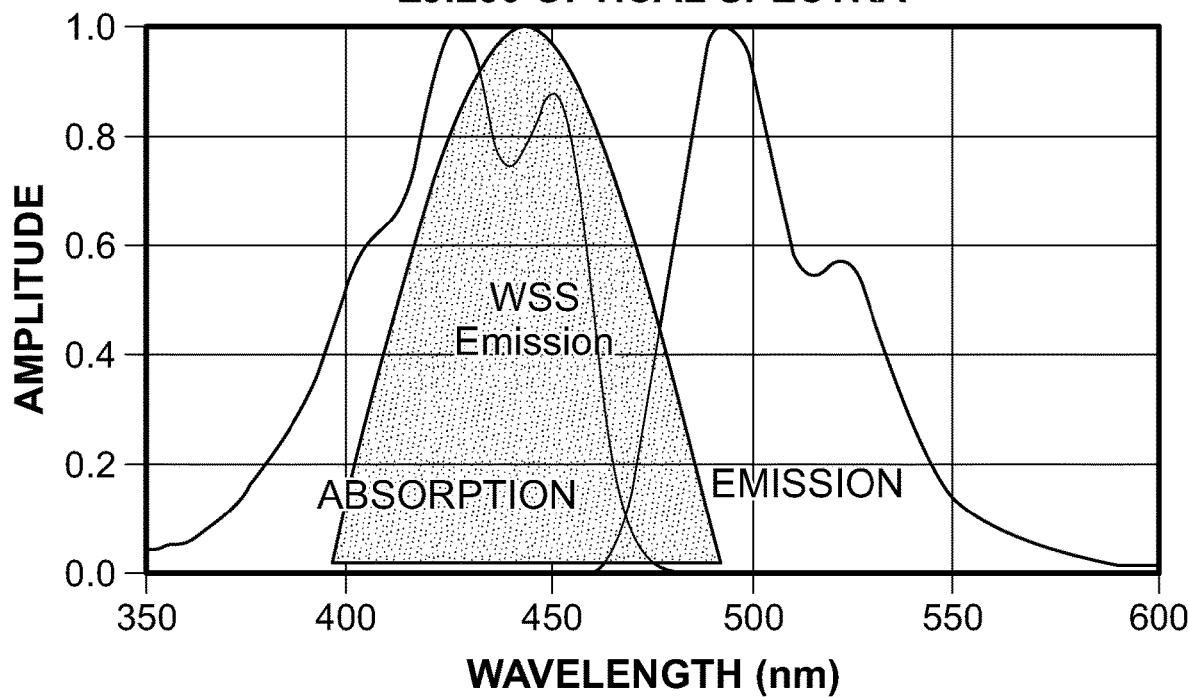
FIG. 8B is a graph depicting an absorption and emission spectra of BaFCl:Eu in the wavelength shifting fiber layer of the detector shown in FIG. 7A.

FIG. 8A is a graph depicting an absorption and emission spectra of BaFCl:Eu in the WSS layer of the detector shown in FIG. 7A. FIG. 8B is a graph depicting an absorption and emission spectra of BaFCl:Eu in the WS fiber layer of the detector shown in FIG. 7A. As show in FIG. 8A, scintillator material BaFCl:Eu has an emission spectrum peak near 390 nm. Light is absorbed in the WSS layer and emitted at the shifted wavelength of 400 nm.

With reference to FIGS. 7A and 7B light 703 travels in the WSS detector through either diffuse reflection from the surface of the WS sheet 706 or the scintillator layer 704, or through total internal reflection (TIR) from the WSS surface. All light rays which are emitted in the WS sheet 706 at an angle which is larger than the critical angle of the WS material are captured by TIR and propagated to the edge of the sheet 706. Hence the light collection efficiency of the WSS detector is dependent on the index of refraction of the WS sheet 706.

In an embodiment, in order to improve the TIR angle, the index of refraction of the scintillator material 704 maybe decreased while the index of the WSS layer 706 may be increased, as the critical angle $$\theta_c = \arcsin\left(\frac{n_2}{n_1}\right);$$

where $n_1$ denotes the refractive index of the WSS material 706 and $n_2$ denotes the refractive index of air if no adhesive is used to attach the scintillator 704 to the WSS. For example, if typical plastics such as acrylic/PMMA are used in the detector, having a refractive index n1=1.4 and wherein the refractive index of air is equal to 1, the critical angle $\theta_c$ can be calculated as being equal to 40°.

It is advantageous to use WS sheets for obtaining X ray detectors as provided by the present specification instead of using WS fibers, as the light collection in WS sheets is more efficient than that in WS fibers. FIG. 9A illustrates light collection cones in a WS fiber. In a WS fiber 902, light rays which fall within two light collecting cones 904 are transmitted via TIR along the length of the fiber 902. FIG. 9B illustrates light loss cones in a WS sheet. In sheet 906, light is collected for all rays except for light lost due to rays which fall within two light loss cones 908, leading to a much wider volume of acceptance angles.

FIG. 9C is a diagrammatical representation of light collection cones in a rectangular WS fiber. As shown in FIG. 9C rectangular fiber 910 comprises four light collecting cones 912, one cone corresponding to each of the four surface of fiber 910.

The solid angle for a single light loss cone is $$\Omega_{cone} = 2\pi(1-\sqrt{1-1/n^2})$$

Thus the capture efficiency for the rectangular WS fiber 910 is:

$$F_{rect} = (4\pi - 4 \cdot \Omega_{cone})/4\pi = \left(2 \cdot \sqrt{1 - \frac{1}{n^2}}\right) - 1$$

Assuming that an infinite WS sheet has two faces, and thus two light loss cones have a capture efficiency of:

$$F_{sheet} = \sqrt{(1-1/n^2)}$$

Figure 9D:
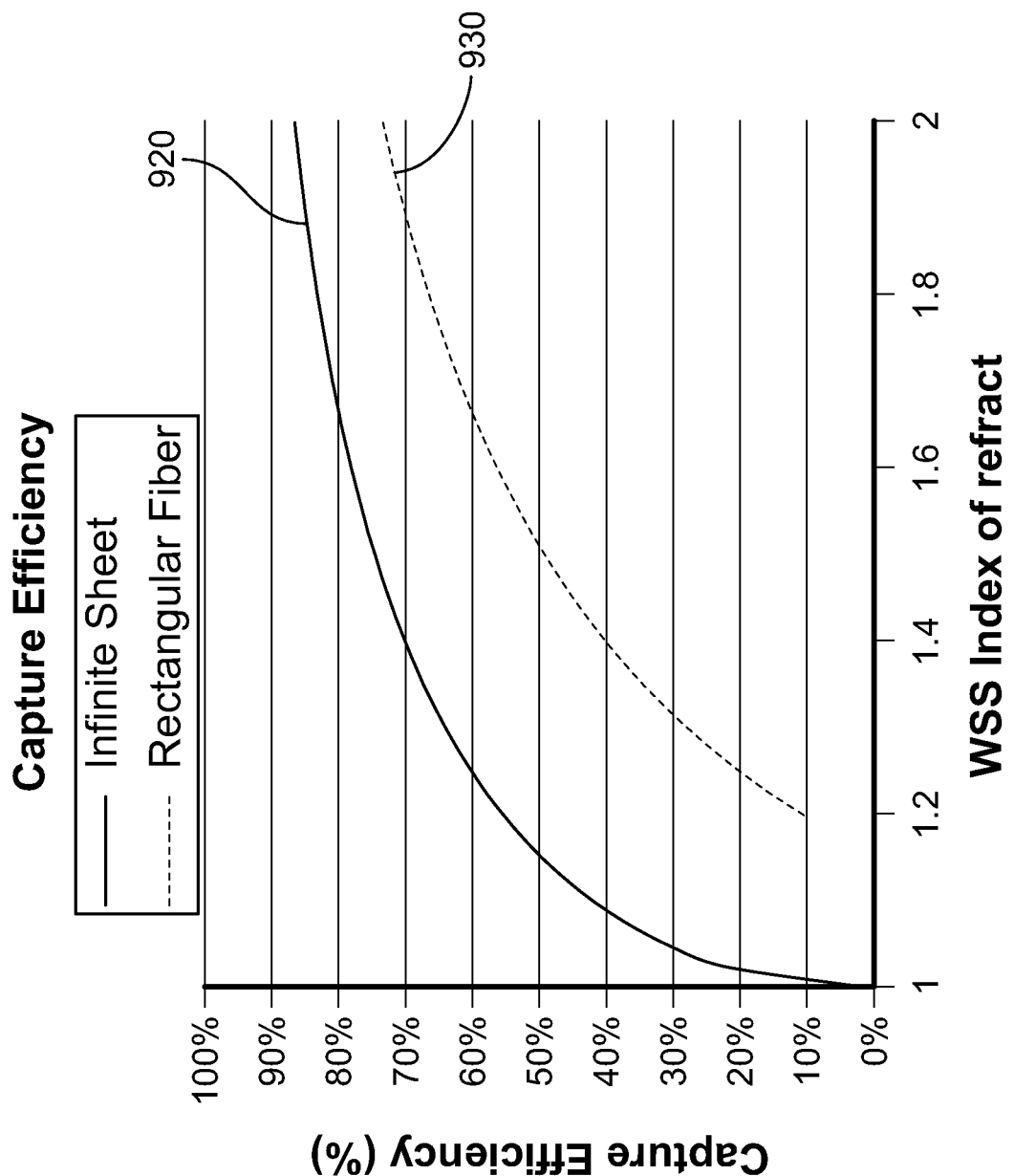
FIG. 9D is a graphical representation of the light capture efficiencies of a WS Sheet and a WS fiber made of materials having the same refractive index.

Hence, it can be seen that the light capture efficiency in WS sheets is greater than that in WS fibers. FIG. 9D is a graphical representation of the light capture efficiencies of a WS Sheet 920 and a WS fiber 930 made of materials having the same refractive index. As, demonstrated by the plots 920 and 930, WS sheets provide better light capturing efficiencies.

Referring to FIGS. 7A and 7B again, light will be attenuated in the WSS material 706 which contains a dye material, leading to a uniform decrease in the signal intensity away from the X-ray source absorption point. The dye material is used to absorb light emitted from the scintillator and emit light that transmits to the edge of the WS sheet 706. In various embodiments, any commercially available wavelength shifting paint may be used as the dye material. In order to minimize absorption, the WSS 706 material is kept as thin as possible for creating a shortest length path for the light 703 to reach to the edge of the sheet. Conversely, the WSS 706 material thickness is increased to minimize the number of reflections from the surface of the sheet. Depending on the attenuation length of light in WSS 706 material and the absorption loss in the scintillator layer 704, the optimal thickness of the WSS 706 changes. For example, the thickness of a WSS 706 material may range from 2 mm to 10 mm, with an attenuation length of approximately 3.5 cm.

In edge region, the light 703 is absorbed and re-emitted for collection by the PMT 714. In an embodiment, in order to improve coupling efficiency and uniformity, the edge WSS or WSF 708 material is in contact with the WSS 706 material around four sides of the detector; and the width of the edge WSS or WSF 708 material is increased to an optimal level for better absorption of light from the WSS 706. In embodiments, the width of the edge WSS or WSF 708 material is determined by measuring the optical attenuation length at the wavelength of emission light from the WSS 706, and selecting a length with an attenuation greater than 90%. In various embodiment, the width of the edge WSS or WSF 708 material ranges from 2 mm to 5 mm. In an embodiment, the width of the edge WSS or WSF 708 material is 4 mm.

Figure 10A:
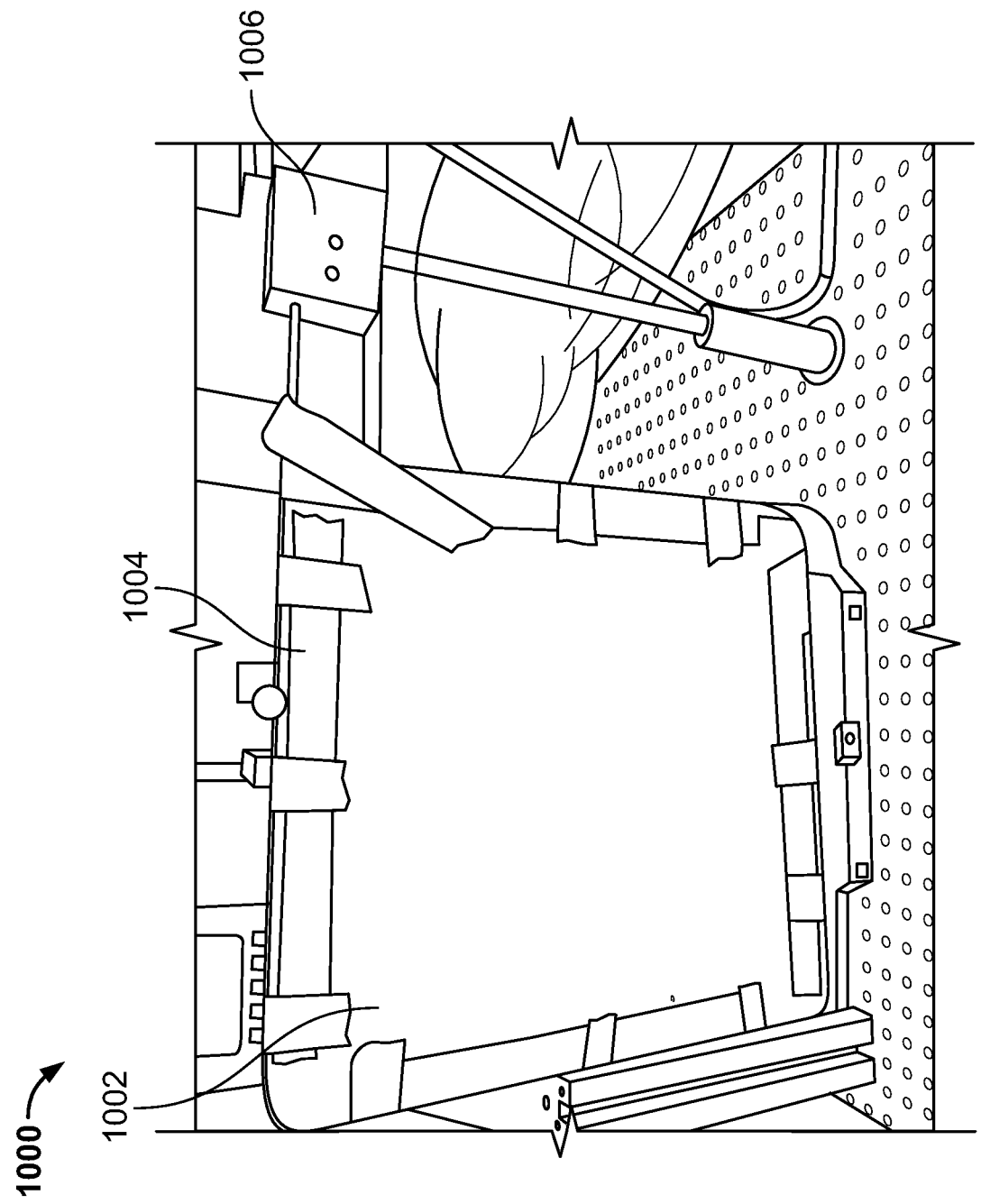
FIG. 10A illustrates a WSS detector comprising a wavelength shifting sheet coupled with a wavelength shifting fiber (WSF) wrapped around four edges of the sheet, in accordance with an embodiment of the present specification.

FIG. 10A illustrates a WSS detector comprising a wavelength shifting sheet 1002 coupled with a wavelength shifting fiber (WSF) wrapped around/couple to/in direct communication with four edges of the sheet, in accordance with an embodiment of the present specification. In other embodiments, the WSF may be wrapped around/coupled to/in direct communication with one, two, or three edges/sides of the WS sheet 1002. In the embodiment shown in FIG. 10A, the WS sheet has a dimension of 12"×12" and the aggregate WSF fiber at the edges comprises a bundle of six WS fibers. The corners of the of the WS sheet 1002 have been rounded for uniform bending of the WSF fiber with a fillet having an approximate diameter of 0.75".

In an embodiment, the detector 1000 is constructed using a plastic (PVB) WSS material coated with a dye for absorbing light in the UV spectrum and emitting light in the blue spectrum, and having a width ranging from 50 mm to 800 mm, height ranging from 50 mm to 2,500 mm and thickness ranging from 2 mm to 10 mm; wherein all edges of the sheet are diamond milled.

In an embodiment, a scintillator screen of BaFCl:Eu having a density ranging from 40 mg/cm2 to 250 mg/cm2 is coupled with the front and back faces of WSS detector 1000. In an embodiment a reflector tape 1004 is used to attach the WSS 1002 with the WSF, as well as to attach the scintillator screen to the WSS. A PMT 1006 is coupled with the detector 1000 for signal detection. In other embodiments, the WS sheet may be circular, oval, or have an irregular shape with at least one edge; wherein, the WSF is wrapped around at least a portion of the edge.

Figure 10B:
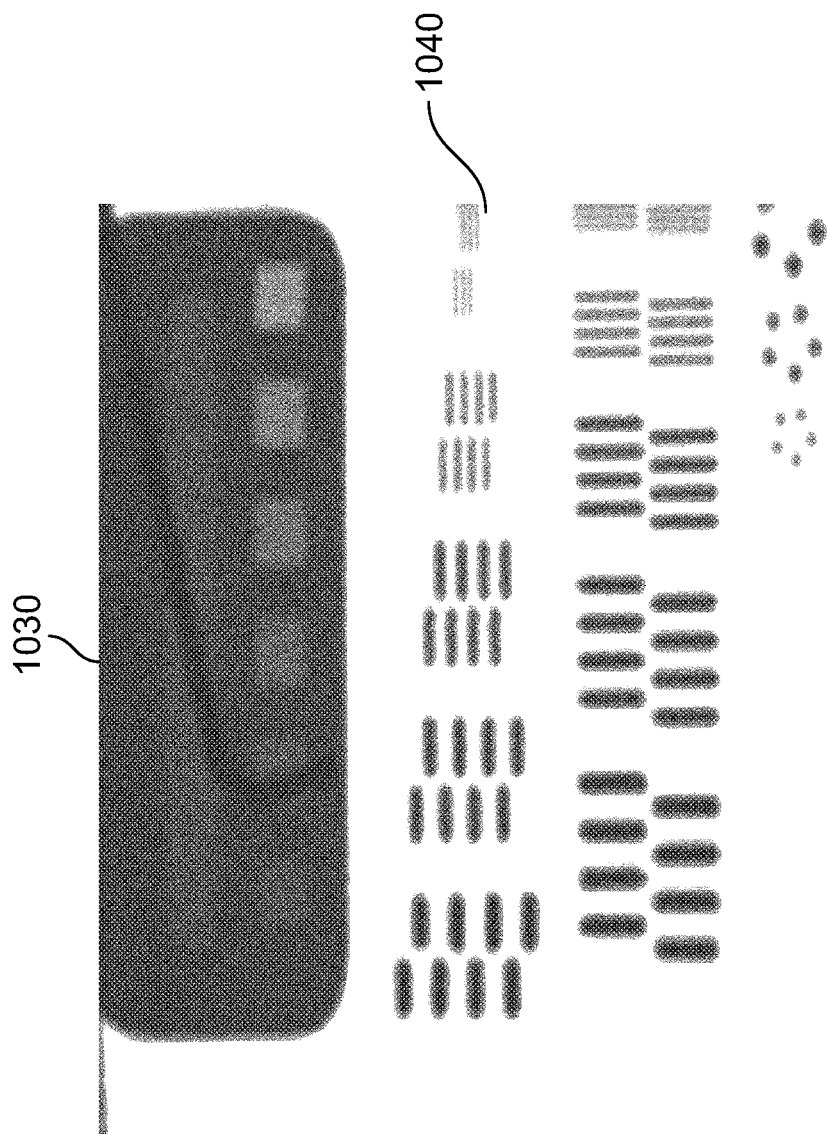
FIG. 10B illustrates image data obtained from the detector shown in FIG. 10A.
Figure 10C:
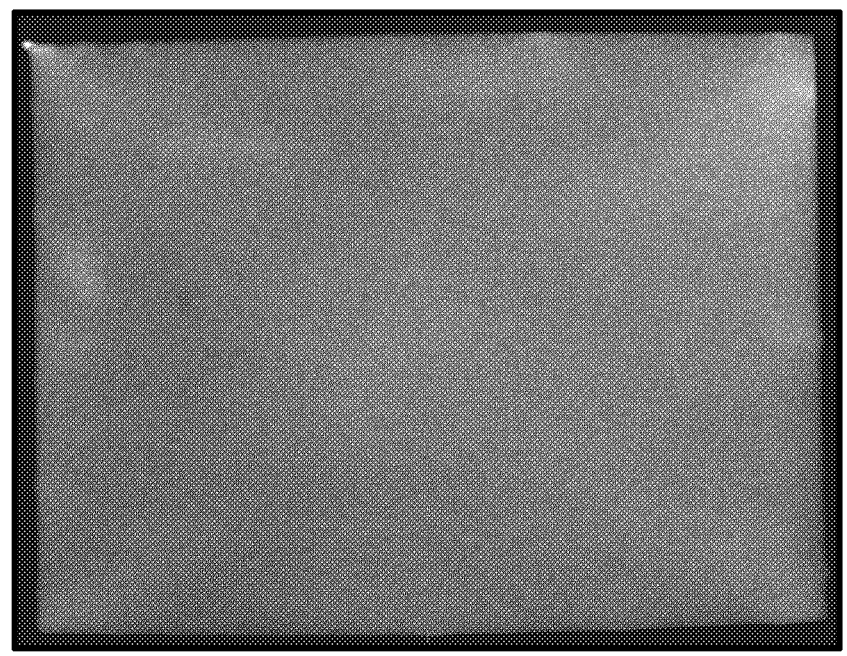
FIG. 10C illustrates the image response of the WSS detector shown in FIG. 10A.
Figure 10D:
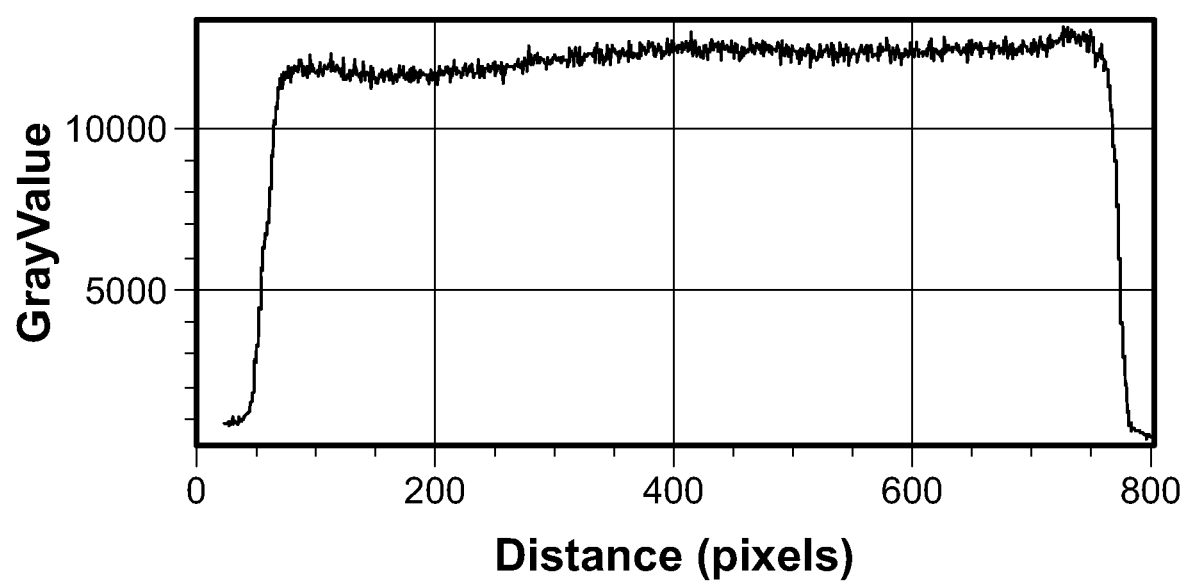
FIG. 10D illustrates a log-linear cross-cut of the signal response shown in FIG. 10C.

FIG. 10B illustrates image data obtained from the detector shown in FIG. 10A. The image is a transmission image of a HDPE phantom with resolution blocks demonstrating steel penetration. Penetration thru ⅜" thick steel is demonstrated in the outset portion 1030 of the image 1040. The WSS detector 1000 as described in the present specification has a predictable and repeatable non-uniform response. FIG. 10C illustrates the gain uniformity of the image response of the WSS detector shown in FIG. 10A. As shown, excluding the edge region, the detector has a smooth varying gain with a variability being greater than 10%. FIG. 10D illustrates a log-linear cross-cut of the signal response shown in FIG. 10C.

Figure 11A:
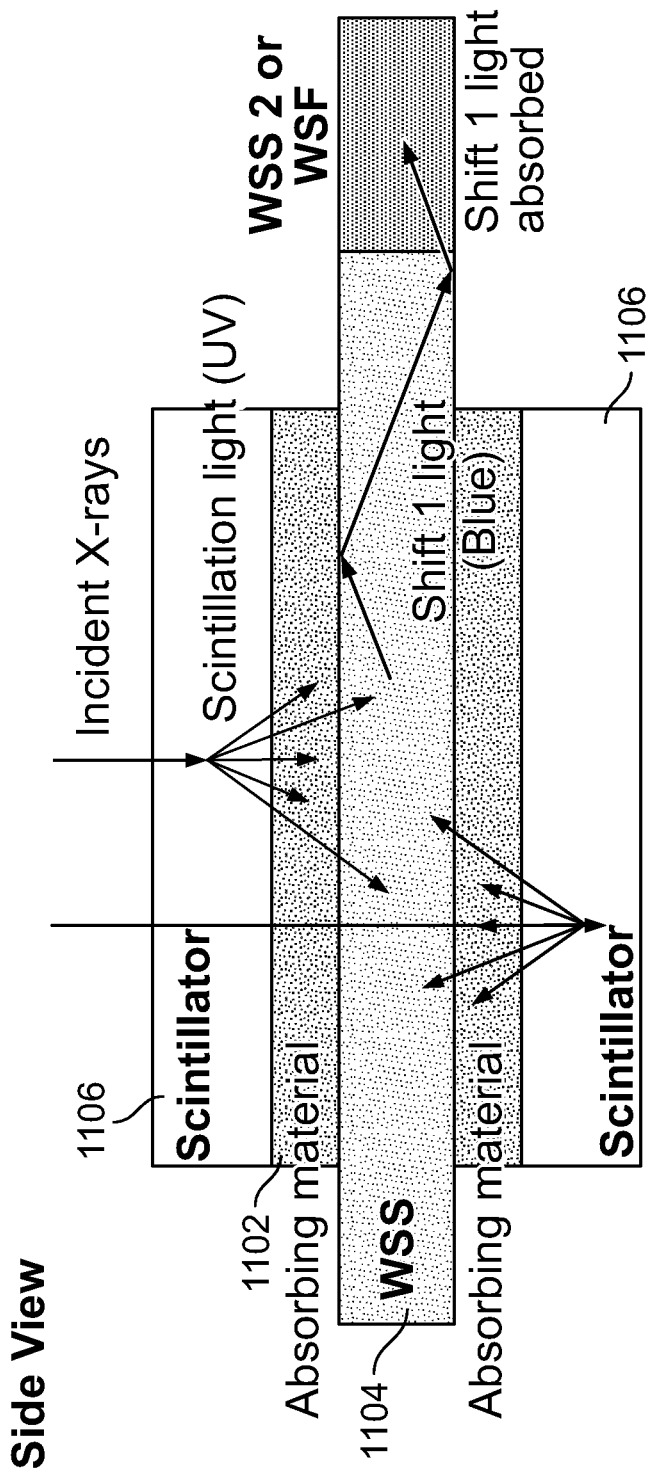
FIG. 11A is a block diagram depicting an attenuating material inserted between WSS and a scintillator screen, in accordance with an embodiment of the present specification.

When coupled with a second WS material on all four sides, the non-uniformity of the detected image obtained by using the WSS detector as described above, is symmetric and lowest in the center of the detector panel with a weak change due to attenuation in the second WS material sheet. In an embodiment, the non-uniformity is corrected by inserting a spatially varying attenuating material between the scintillator screen and the WSS. FIG. 11A is a block diagram depicting an attenuating material inserted between WSS and a scintillator screen, in accordance with an embodiment of the present specification. Referring to FIG. 11A attenuating material 1102 is inserted between WSS 1104 and a scintillator screen 1106 in the form of a compensating sheet. The attenuating material 1102 may be applied in the form of a printed sheet with absorbing ink on the surface. For a given set of materials and sizes of detector, the non-uniformity and compensation pattern are fixed and repeatable from detector to detector. The compensating sheet made of the attenuating material 1102 is printed with a pattern that attenuates high response regions of the detector panel. In various embodiments, the attenuating material 1102 is a spatially varying attenuating material, used to smooth out the repeatable gain variations in the WS sheet. Repeatable variations may be caused by the geometry of the WSS, by the light cross-shading in the detector gain. In embodiments, by inserting the compensating sheet with attenuation of light emitted from the scintillator, the gain variation can be corrected.

Figure 11C:
FIG. 11C is an image showing a compensating pattern of the attenuating material used in the WSS detector shown in FIG. 11A.
Figure 11B:
FIG. 11B is an image showing the response uniformity of the WSS detector, in accordance with an embodiment of the present specification.

FIG. 11B illustrates an image showing the response uniformity of the WSS detector, in accordance with an embodiment of the present specification. FIG. 11C illustrates a compensating pattern of the attenuating material 1102 used in the WSS detector shown in FIG. 11A. In various embodiments, the spatially attenuating material 1102 has the following characteristics:

Dynamic range & Extinction coefficient: For maximum absorption, the attenuating material has a large extinction coefficient with the ability to absorb 100× the total light output from the scintillator in 1-2 mm thickness ($\mu$=5 cm-1). The spectral absorption is neutral (flat) across the range from 350 nm to 600 nm in order to cover the full range of scintillators commonly used. The minimum absorption cuts the output of the scintillator by <6-7% of the total output.

Low cost: <100$ for 16"×16" part, substrate plastic or other readily available material.

Printed/Patterned: ability to change absorption with printing resolution of at least 0.5 mm, using dithered printing or greyscale.

Thin: total attenuator material is less than 1-2 mm thick in order to add a minimum of thickness to the WSS detector.

In various embodiments, techniques such as but not limited to laser printed pattern on acetate film by using either greyscale pattern or dithered printing; printed absorber such as: screen printing, ink jet printing, transfer print, print inks on acetate or other clear substrate, or directly print absorber on the WSS; absorbing sheet with varying thickness; textured sheet or textured surface of WSS such as bead blast, sanded, chemically roughened, or direct transfer thru mold, or plastic film or directly textured WSS surface; printed scintillator material; and variable dye concentration WSS such as spatially patterned surface printed dye and resin on the WS sheet may be used.

Figure 12A:
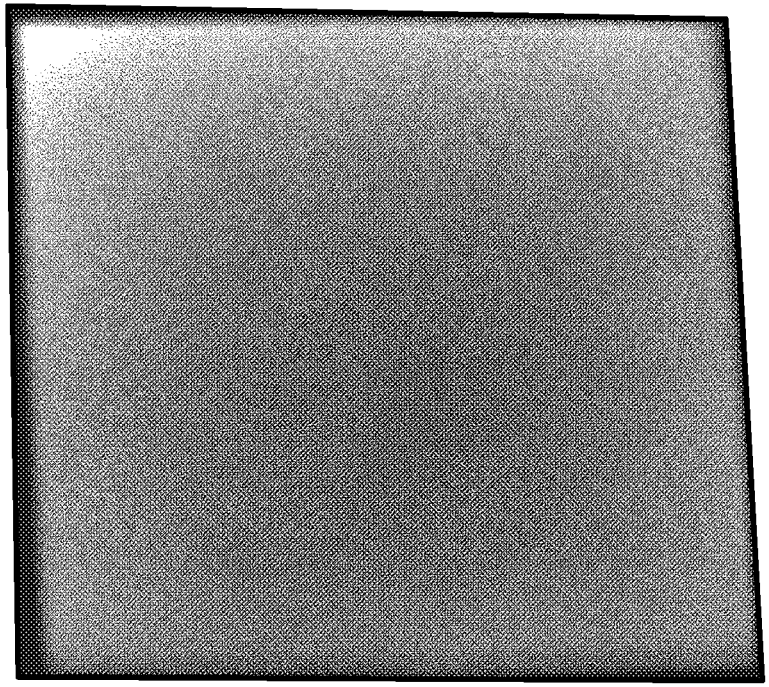
FIG. 12A is an image showing signal response from a wavelength shifting fiber edge coupled WSS detector.
Figure 12B:
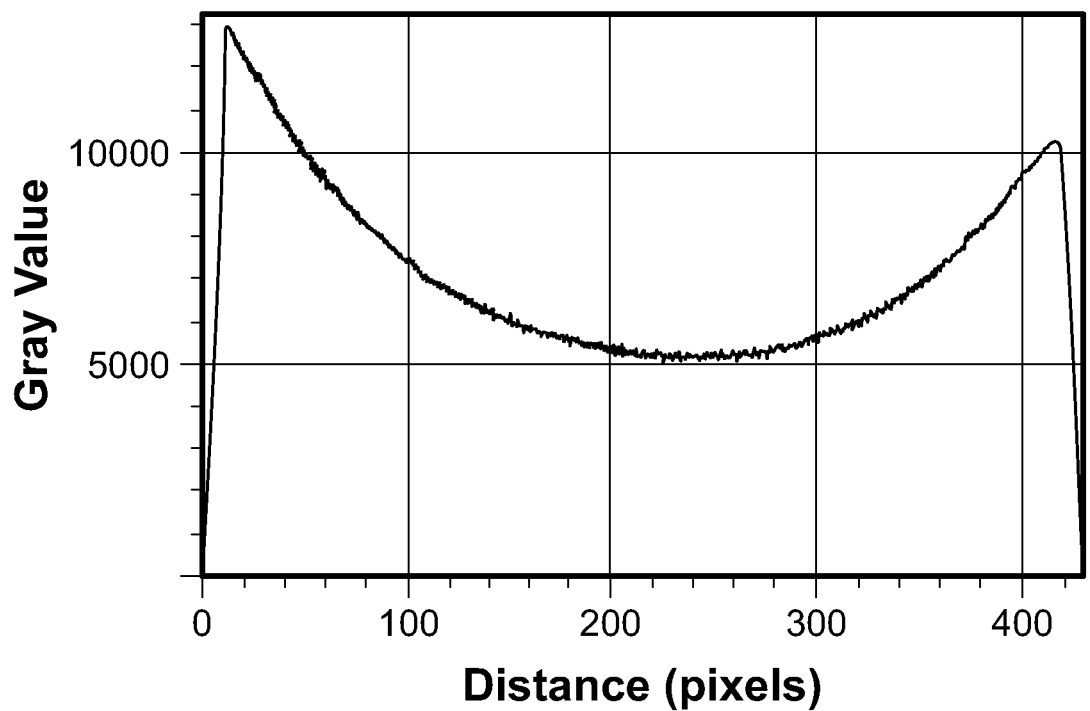
FIG. 12B is a graph showing the signal response of FIG. 12A, from a horizontal cross-section through a center region of the WSS detector.
Figure 12C:
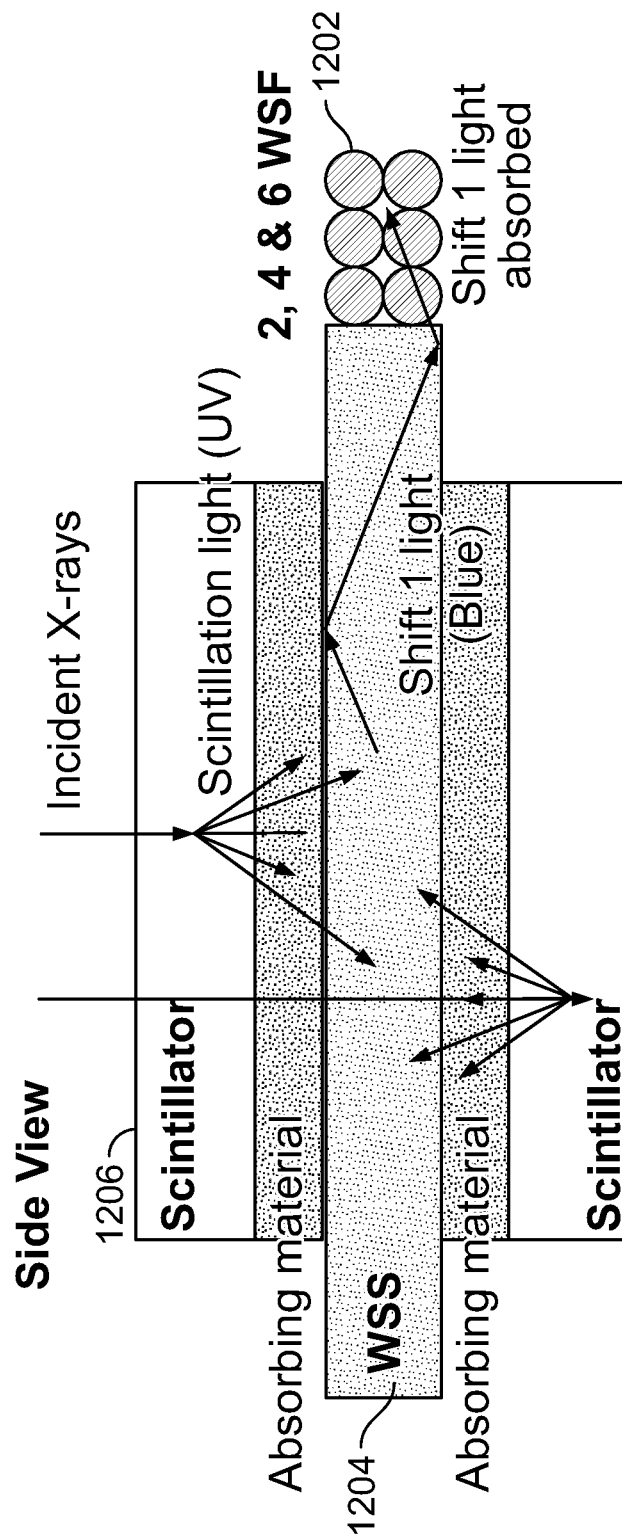
FIG. 12C is a graph depicting a wavelength shifting sheet detector response with a variable number of fibers used for light collection at the edge of the wavelength-shifting sheet, in accordance with an embodiment of the present specification.

As described above with reference to FIG. 7A, in various embodiments, it is advantageous collect of X rays with WS fibers as opposed to a second WS material sheet. FIG. 12A illustrates an image showing signal response from a WS fiber edge coupled WSS detector. FIG. 12B illustrates a graphical depiction of a cross cut of the signal response shown in FIG. 12A, horizontally across the center region of the WSS detector. In various embodiments, the response of a WSS detector coupled with four sided WSF collection shows an improvement in uniformity. The uniformity improves from a 100× variation in a single sided WSS to 2.6× variation from edge to center of the detector in a WSS detector coupled with four sided WSF collection. In addition, variations are smooth and correctable with an absorbing filter. In embodiments, the number of fibers coupled with the edges of a WSS detector may be increased in order to improve the total amount of light absorbed. FIG. 12C illustrates additional WS Fibers 1202 arranged at the edge of WSS 1204 and a scintillator screen 1206, in accordance with an embodiment of the present specification. In various embodiments, inserting additional fibers increases the total amount of light collected at the edge of the sheet 1204.

Figure 12D:
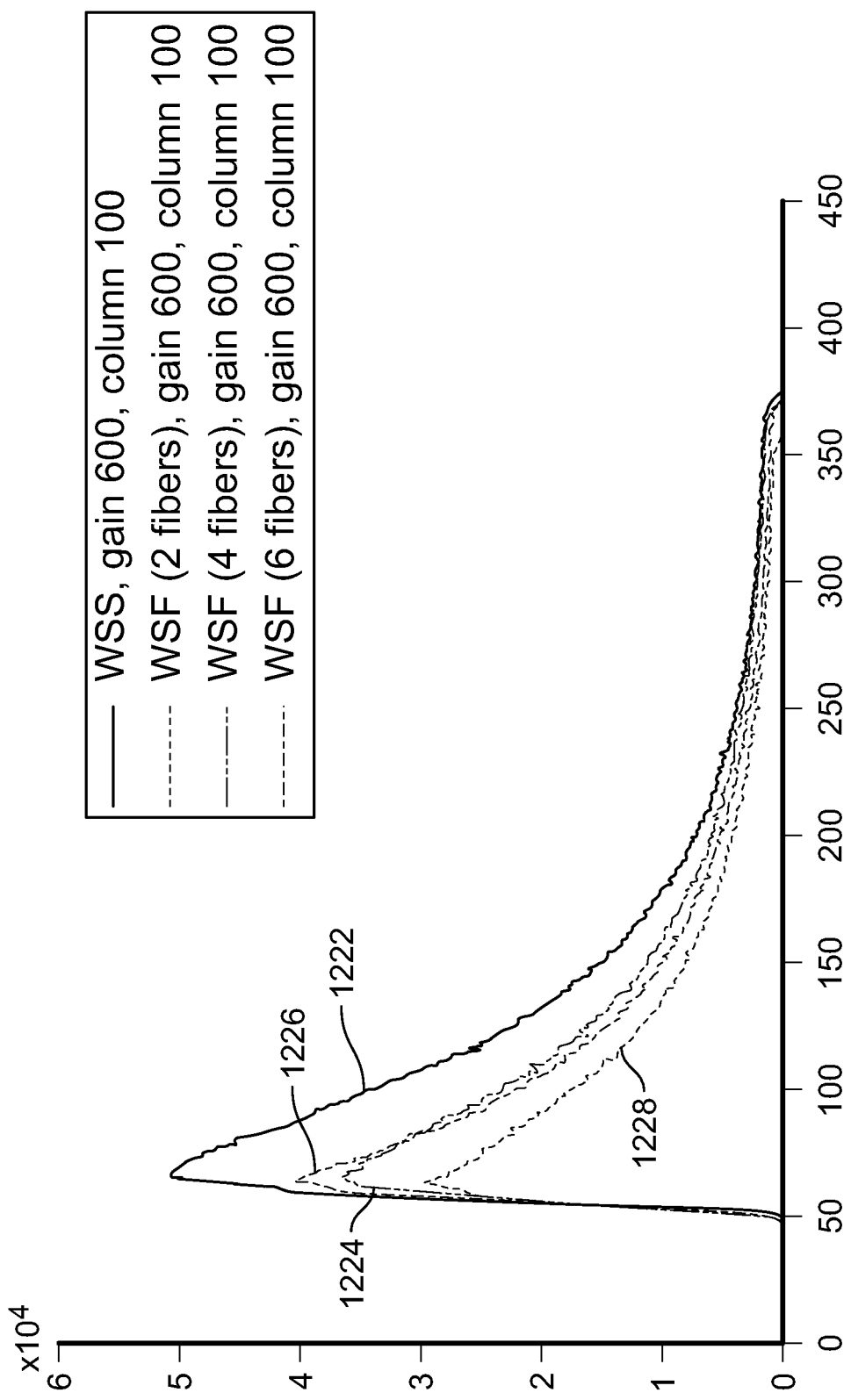
FIG. 12D shows a plot depicting a WSS detector response with variable number of fibers used for light collection at the edge of the WS sheet, in accordance with an embodiment of the present specification.

FIG. 12D shows a plot depicting a WSS detector response with variable number of fibers used for light collection at the edge of the WS sheet, in accordance with an embodiment of the present specification. Plot 1222 depicts response from a WSS detector having 2, 4 and 6 WS Fibers coupled with the edges. Plots 1224, 1226 and 1228 depict response from WSS detectors coupled along a single edge with 2, 4 and 6 WS fibers respectively for feeding collected X-rays to a PMT. As shown by the plots, additional fibers add to the amount of material which can absorb light at the edge of the sheet, and in embodiments, each additional two fibers adds 1 mm of thickness to the absorbing region thickness.

Figure 13A:
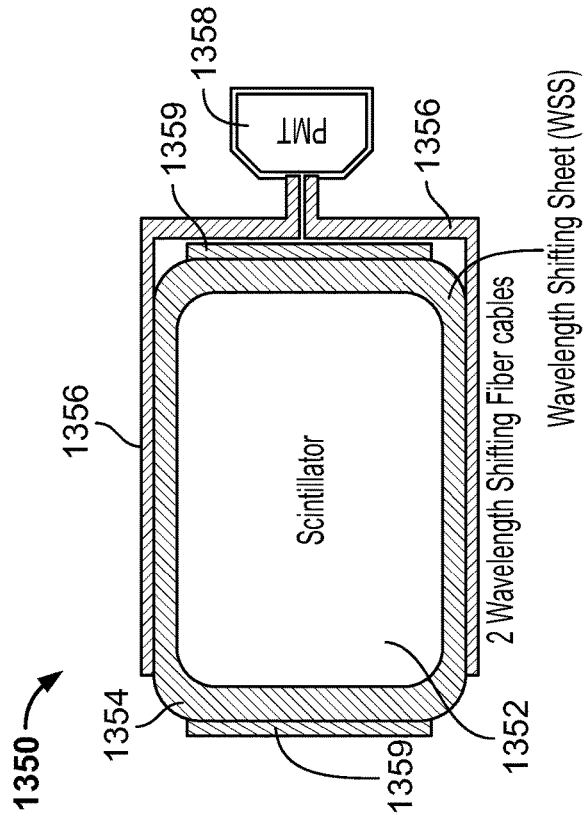
FIG. 13A is a diagrammatical representation of a rectangular WSS detector having WS fibers in direct communication with/coupled to four sides of a wavelength shifting sheet enabling a four side readout as used in a transmission detection mode, in accordance with an embodiment of the present specification.

FIG. 13A is a diagrammatical representation of a rectangular WSS detector having WS fibers in direct communication with/coupled to four sides of a wavelength shifting sheet enabling a four side readout as used in a transmission detection mode, in accordance with an embodiment of the present specification. WSS detector 1340 comprises a scintillator screen 1342 partially covering a WS sheet 1344, which is in turn coupled with WS Fibers 1346 on all four sides for transmitting shifted light rays into a PMT 1348. In an embodiment, the scintillator screen 1342 is an 80 mg/cm2 sheet and is applied on both sides (top and bottom) of the WS sheet 1344 which has a thickness of 4 mm with corners rounded at 0.75" ROC. In an embodiment, the WS fibers 1346 are provided in the form a cable having a diameter of 1 mm, and the PMT 1348 has a diameter of 8 mm.

Figure 13B:
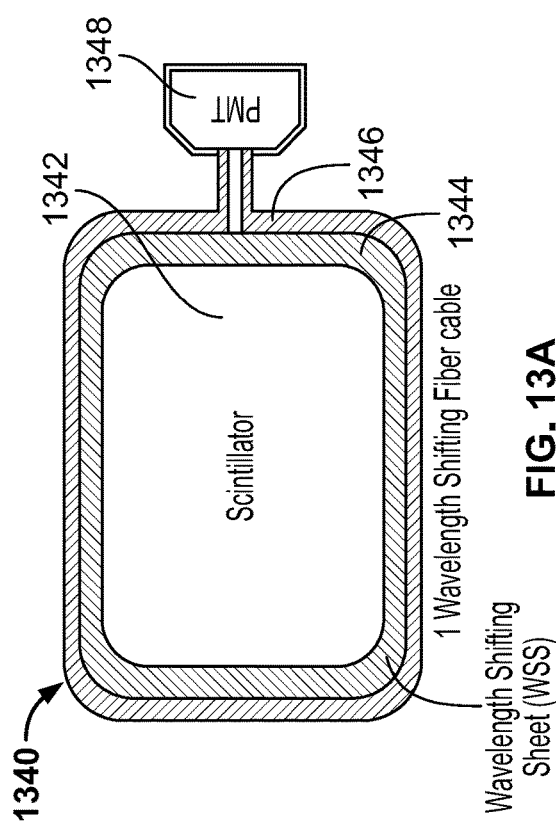
FIG. 13B is a diagrammatical representation of a rectangular WSS detector having WS fibers in direct communication with/couple to two sides of a wavelength shifting sheet, enabling a two side readout as used in a transmission detection mode, in accordance with an embodiment of the present specification.

FIG. 13B is a diagrammatical representation of a rectangular WSS detector having WS fibers in direct communication with/couple to two sides of a wavelength shifting sheet, enabling a two side readout as used in a transmission detection mode, in accordance with an embodiment of the present specification. WSS detector 1350 comprises a scintillator screen 1352 partially covering a WS sheet 1354, which is in turn coupled with two WS fiber cables 1356 on two sides (as shown in FIG. 13B) for transmitting shifted light rays into a PMT 1358. In an embodiment, the remaining two sides of the WS sheet 1354 are covered with a reflector material 1359 to improve X-ray absorption.

Figure 13C:
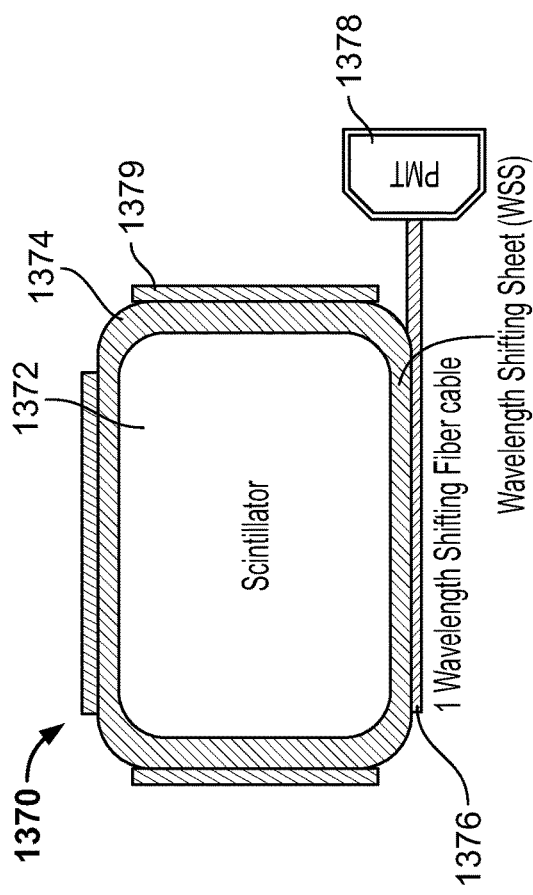
FIG. 13C is a diagrammatical representation of a rectangular WSS detector having WS fibers in direct communication with/coupled to one side of a wavelength shifting sheet, enabling a single side readout as used in a transmission detection mode, in accordance with an embodiment of the present specification.

FIG. 13C is a diagrammatical representation of a rectangular WSS detector having WS fibers in direct communication with/coupled to one side of a wavelength shifting sheet, enabling a single side readout as used in a transmission detection mode, in accordance with an embodiment of the present specification. WSS detector 1370 comprises a scintillator screen 1372 partially covering a WS sheet 1374, which is in turn coupled with one WS fiber cable 1376 on one sides (as shown in FIG. 13C) for transmitting shifted light rays into a PMT 1378. In an embodiment, the remaining three sides of the WS sheet 1374 are covered with a reflector material 1379 to improve X-ray absorption.

Figures 14A, 14B, 14C:
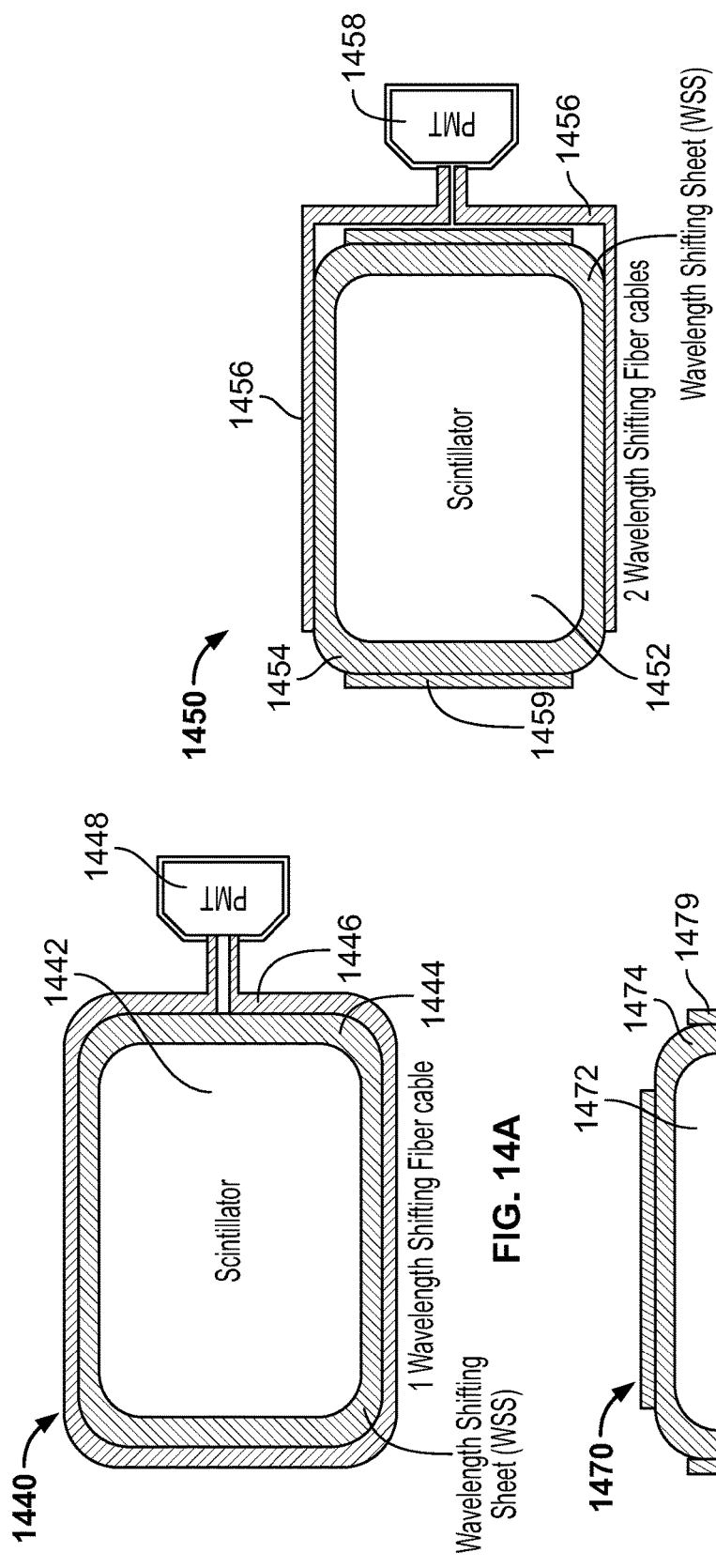
FIG. 14A is a diagrammatical representation of a rectangular WSS detector having WS fibers in direct communication with/coupled to four sides of a wavelength shifting sheet, enabling a four side as used in a backscatter detection mode, in accordance with an embodiment of the present specification.
FIG. 14B is a diagrammatical representation of a rectangular WSS detector having WS fibers in direct communication with/coupled to two sides of a wavelength shifting sheet, enabling a two side readout as used in a backscatter detection mode, in accordance with an embodiment of the present specification.
FIG. 14C is a diagrammatical representation of a rectangular WSS detector having WS fibers in direct communication with/couple to one side of a wavelength shifting sheet, enabling a single side readout as used in a backscatter detection mode, in accordance with an embodiment of the present specification.

FIG. 14A is a diagrammatical representation of a rectangular WSS detector having WS fibers in direct communication with/coupled to four sides of a wavelength shifting sheet, enabling a four side as used in a backscatter detection mode, in accordance with an embodiment of the present specification. WSS detector 1440 comprises a scintillator screen 1442 partially covering a WS sheet 1444, which is in turn coupled with WS fibers 1446 on all four sides (as shown in FIG. 14A) for transmitting shifted light rays into a PMT 1448. In embodiments, the WS fibers 1446 may be provided in the form of a single cable.

FIG. 14B is a diagrammatical representation of a rectangular WSS detector having WS fibers in direct communication with/coupled to two sides of a wavelength shifting sheet, enabling a two side readout as used in a backscatter detection mode, in accordance with an embodiment of the present specification. WSS detector 1450 comprises a scintillator screen 1452 partially covering a WS sheet 1454, which is in turn coupled with two WS fiber cables 1456 on two sides (as shown in FIG. 14B) for transmitting shifted light rays into a PMT 1458. In an embodiment, the remaining two sides of the WS sheet 1454 are covered with a reflector material 1459 to improve X-ray absorption. In an embodiment, the WS fibers 1446 may be provided as two cables.

FIG. 14C is a diagrammatical representation of a rectangular WSS detector having WS fibers in direct communication with/coupled to one side of a wavelength shifting sheet, enabling a single side readout as used in a backscatter detection mode, in accordance with an embodiment of the present specification. WSS detector 1470 comprises a scintillator screen 1472 partially covering a WS sheet 1474, which is in turn coupled with one WS fiber cable 1476 on one sides (as shown in FIG. 14C) for transmitting shifted light rays into a PMT 1478. In an embodiment, the remaining three sides of the WS sheet 1474 are covered with a reflector material 1479 to improve X-ray absorption.

Figure 14D:
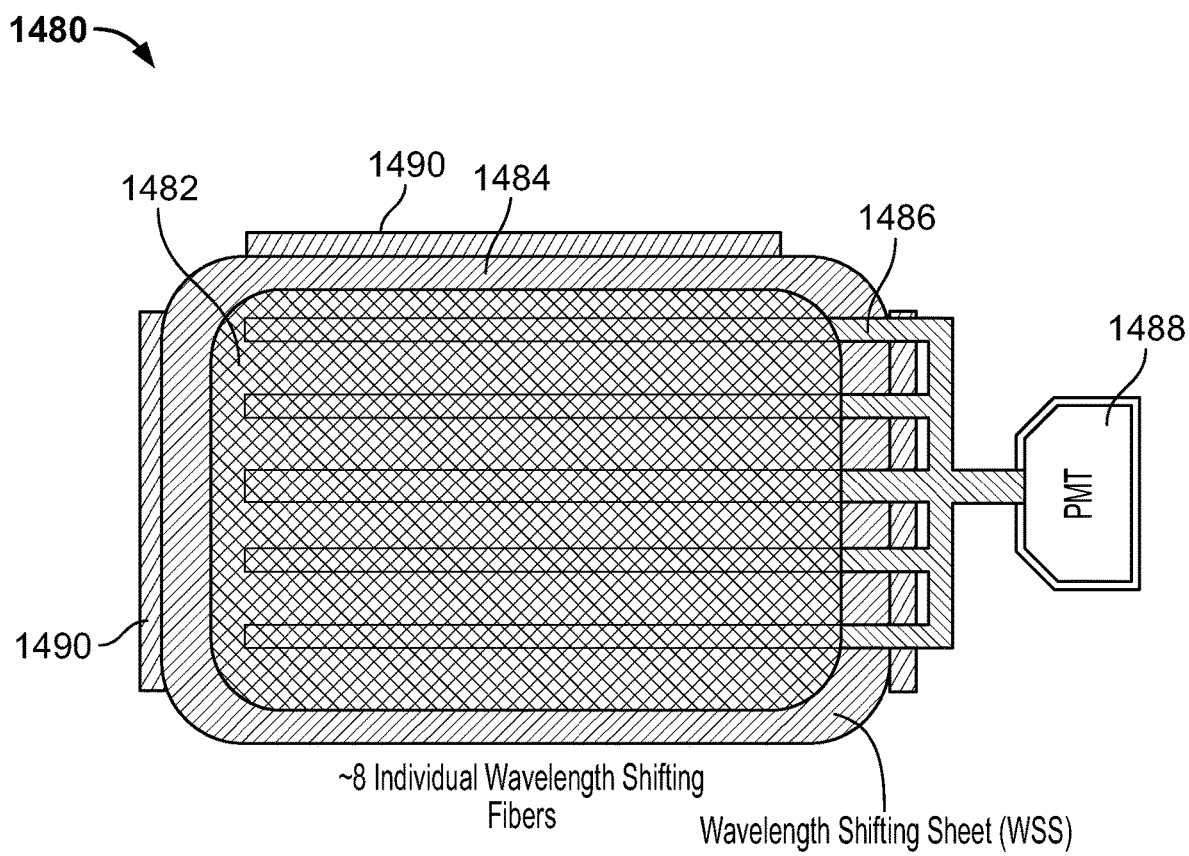
FIG. 14D is a diagrammatical representation of a rectangular WSS detector being used in a backscatter detection mode, having eight WS fibers placed within a plurality of channels cut into a wavelength shifting sheet, in accordance with an embodiment of the present specification.

In an embodiment, a WSS detector operating in backscatter mode comprises a plurality of channels cut into a WS sheet wherein WS fibers are positioned within said channels instead of along one or more sides of the WS sheet. FIG. 14D is a diagrammatical representation of a rectangular WSS detector having discrete WS fibers placed within a plurality of corresponding channels cut into the WS sheet, as used in a backscatter detection mode, in accordance with an embodiment of the present specification. WSS detector 1480 comprises a scintillator screen 1482 partially covering a WS sheet 1484, comprising channels, each channel housing a WS fiber 1486 (as shown in FIG. 14D) for transmitting shifted light rays into a PMT 1488. In embodiments, eight channels and thus, eight WS fibers 1486 are employed. In an embodiment, a reflector material 1490 is provided around all exposed edges of WS sheet 1484 to improve X ray absorption and transmission to the PMT 1488.

FIG. 15A is a side view of a backscatter WSS detector comprising a plurality of channels for housing WS fibers, in accordance with an embodiment of the present specification. FIG. 15B is a top view of the backscatter WSS detector comprising a plurality of channels for holding WS fibers, in accordance with an embodiment of the present specification. The placement of WS fibers in channels cut within the surface of the WS sheet is advantageous as a smaller length of WS fiber may be required, compared to embodiments where the WS fiber is placed along the sides of the WS sheet. In an embodiment, the spacing between the channels ranges between 5 mm to 20 mm; and for a 20 cm×20 cm×0.5 cm sheet with channels at 1 cm spacing, approximately (20 cm*20 channels)+20 cm=420 cm of WS fiber is required; in comparison, (2*(20+20))*(8 cables)=640 cm of WS fiber being required for an embodiment where the WS fiber is placed along the sides of a WS sheet of the same dimensions.

Co-pending U.S. patent application Ser. No. 16/242,163, of the same Applicant of the present specification, entitled "Spectral Discrimination using Wavelength-Shifting Fiber-Coupled Scintillation Detectors" is herein incorporated by reference in its entirety. In addition, U.S. patent application Ser. No. 15/490,787, entitled "Spectral Discrimination using Wavelength-Shifting Fiber-Coupled Scintillation Detectors", filed on Apr. 18, 2017, which, in turn, is a divisional application of U.S. Pat. No. 9,658,343 (the "'343 patent"), of the same title filed on Feb. 23, 2016 and issued on May 23, 2017 are also incorporated by reference herein in their entirety. Also, U.S. Pat. No. 9,285,488 (the '488 patent), of the same title, filed on Feb. 4, 2013, and issued on Mar. 15, 2016 and any priority applications thereof are herein incorporated by reference in their entirety. The embodiments described in the present specification are more cost-effective as they do not require that individual fibers are separated into low and high resolution, with each needing separate PMTs, which would increase the overall length of the fiber. Thus, the wavelength-shifting sheet scintillation detectors of the present specification are lower cost owing to both the elimination of a fiber bundle and manufacturing complexity due to the handling, cutting and polishing of the fiber bundles included therein.

As shown in FIGS. 15A and 15B, a first set of incident X rays 1502 are absorbed by a top scintillator layer 1504. The corresponding emitted light 1503 enters a WS sheet 1506, which in turn shifts the light a first time, such that the shifted light 1507 is received, absorbed, and shifted a second time by WS fibers 1508 placed within channels 1509 formed within the WS sheet 1506. A second set of incident X rays 1510 which pass through the top scintillator layer 1504 and the WSS 1506, are absorbed by a bottom scintillator layer 1512 whereby the corresponding emitted light re-enters the WSS 1506, which in turn shifts the light 1515 a first time, such that the shifted light is received, absorbed, and shifted a second time by WS fibers 1511 placed within channels 1513 formed within the WS sheet 1506. The light shifted by the WS fibers 1508, 1511 is transmitted along the length of the WS fibers 1508, 1511 and subsequently transmitted to a photo multiplier tube (PMT) 1514 for detection. In embodiments, a reflector material 1516 is provided around all exposed edges of WS sheet 1506 to improve X ray absorption and transmission to the PMT 1514. The reflector material 1516 may be composed of a diffuse reflector (paint or tape) or a specular reflector material (metallic) such as, but not limited, to Teflon tape, 3M enhanced specular reflector (ESR) Tape and Silver Metalized Polyester.

Figure 15C:
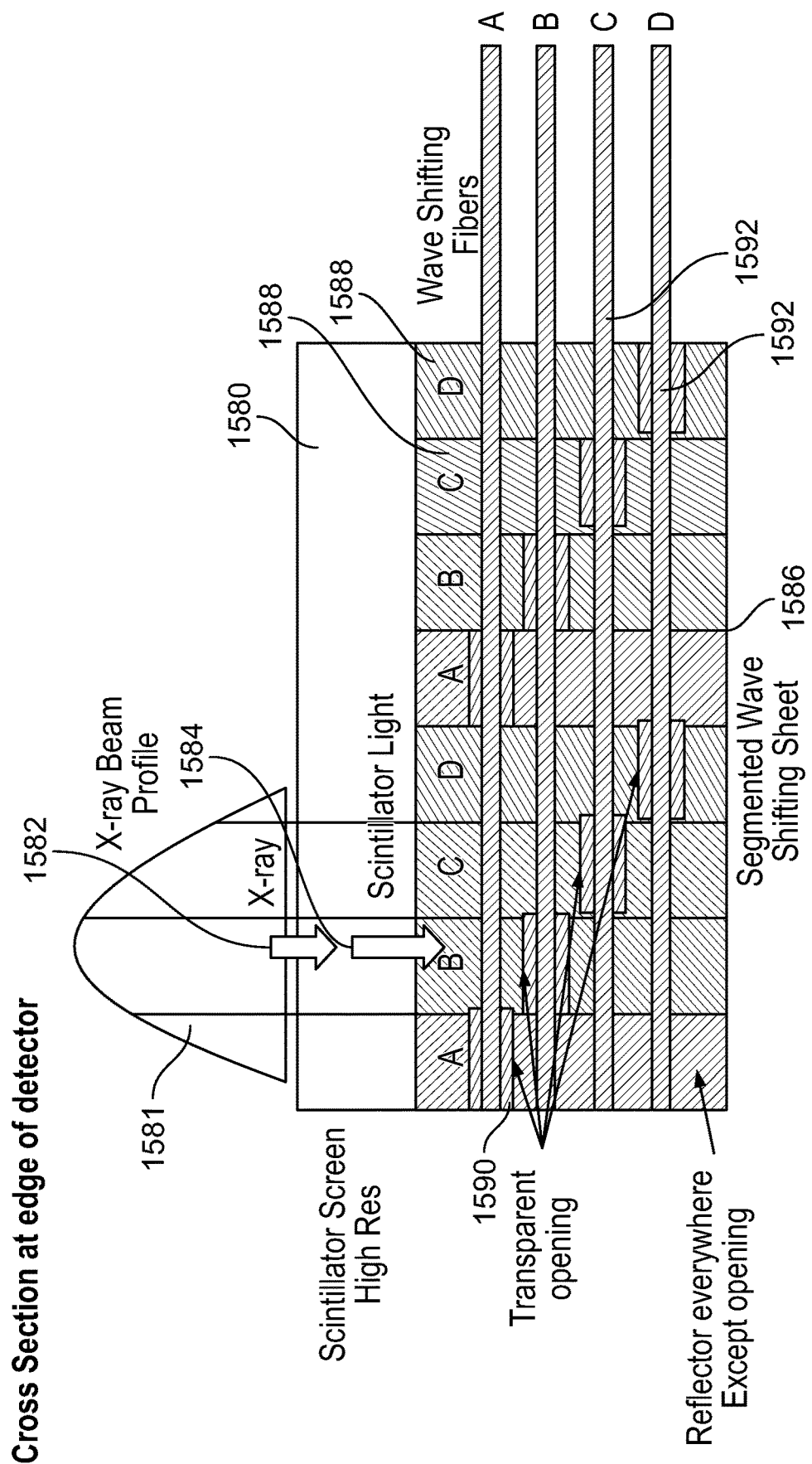
FIG. 15C is a diagrammatical representation of a WSS detector array with a segmented, pixelated WS sheet comprising a plurality of channels for holding WS fibers, in accordance with an embodiment of the present specification.
Figure 15D:
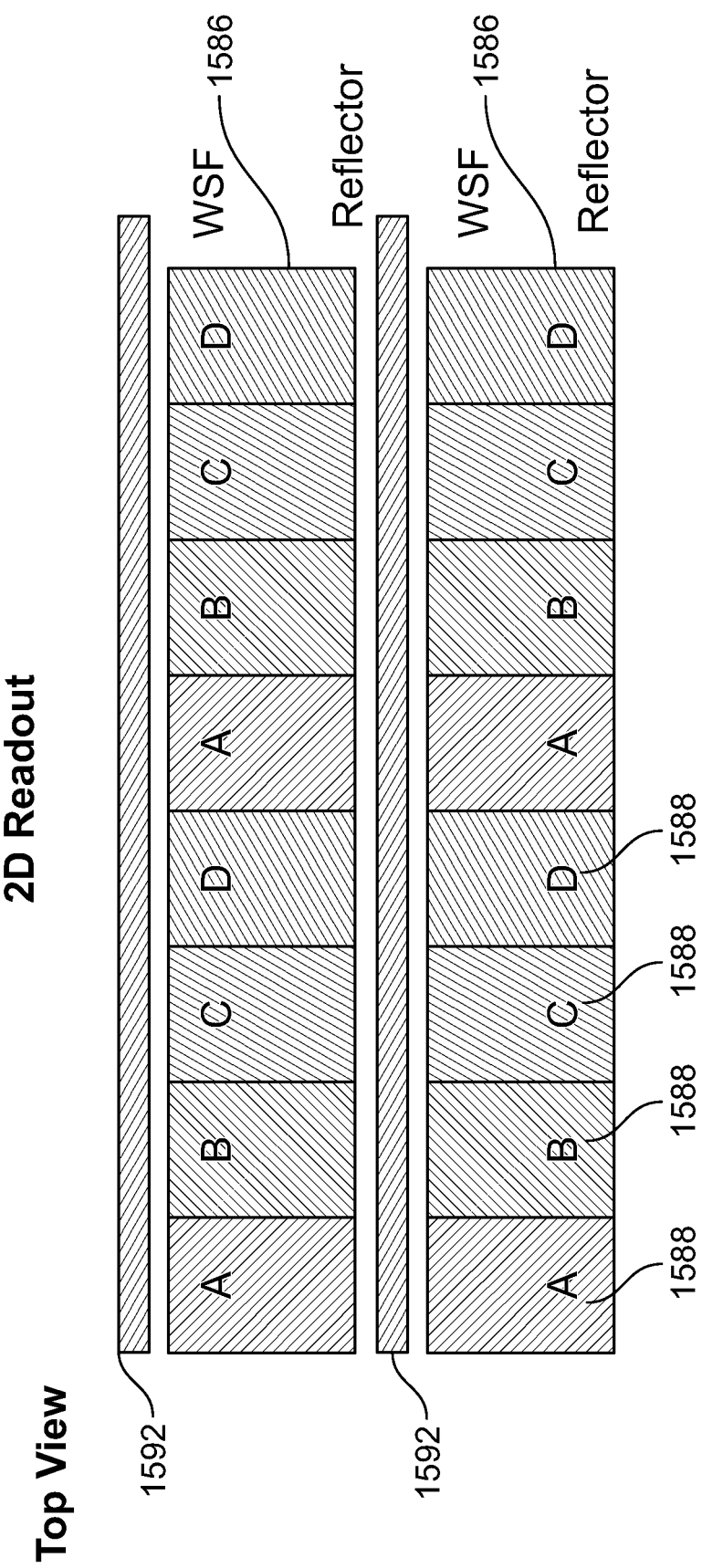
FIG. 15D is a top view of the WSS detector array of FIG. 15C, showing two WS fibers placed within channels cut into the segmented WS sheet, in accordance with an embodiment of the present specification.

In an embodiment, along with having channels housing wavelength shifting fibers as described with reference to FIGS. 15A and 15B, the sheet of a WSS detector in accordance with an embodiment of the present specification, may be optically segmented into pixels using a mechanical milling process. FIG. 15C is a diagrammatical representation of a cross-section of a WSS detector array with a segmented pixelated WS sheet comprising a plurality of channels for holding WS fibers, in accordance with an embodiment of the present specification. FIG. 15D is a top view of the WSS detector having two WS fibers placed within channels cut into the segmented WS sheet, in accordance with an embodiment of the present specification. As shown in FIG. 15C, a scintillator layer 1580 converts incident X rays 1582 from a flying spot X ray beam 1581 to scintillation light 1584 which is typically in the ultraviolet (UV) wavelength range of approximately 400 nm. The light 1584 then falls upon a segmented WS sheet 1586 comprising optically isolated pixels ranging in size from approximately 2 mm to 5 mm. As shown in FIG. 15C the WSS 1586 comprises a plurality of channels 1590 containing WSF 1592. In an embodiment, the segments 1588 and the WSF 1592 are made perpendicular to each other. The WSS 1586 converts the UV light 1584 to blue light having a wavelength of approximately 425 nm which then strikes WSF 1592, which in turn absorbs the blue light and converts it to green light having a wavelength of approximately 475 nm. The green light is detected by a PMT connected to the WSF 1592.

Light from the pixelated WSS 1586 is multiplexed at the transition from WSS 1586 to WSF 1592. In an embodiment, a reflective material coating is inserted between the WSS 1586 and the WSF 1592 for preventing light from exiting the WSS 1586. In an embodiment, the channels 1590 containing the WSF 1592 are not covered by the reflective coating. In an embodiment, the reflective coating may be patterned so that only light from the selected channel may exit the WSS. In this manner, pixels may be grouped to share a signal on a common fiber, if the X-ray beam spot 1581 does not simultaneously illuminate two pixels from the same segment.

In various embodiments, a reflective coating may be patterned onto the edge of the WSS 1586 or directly onto the WS fiber 1592, so that only light from specific channels may enter the fiber. FIG. 15C illustrates a reflector deposited on the edge of the WSS 1586 everywhere except at the openings for the channels. Light from the fibers exits at the PMT. Hence, in various embodiments, light is either reflected or transmitted to the WSF 1592 using the optical reflector coating. Thus, pixels of the same multiplexed group can transmit light from the WSS 1586 to the WSF 1592.

Figure 16:
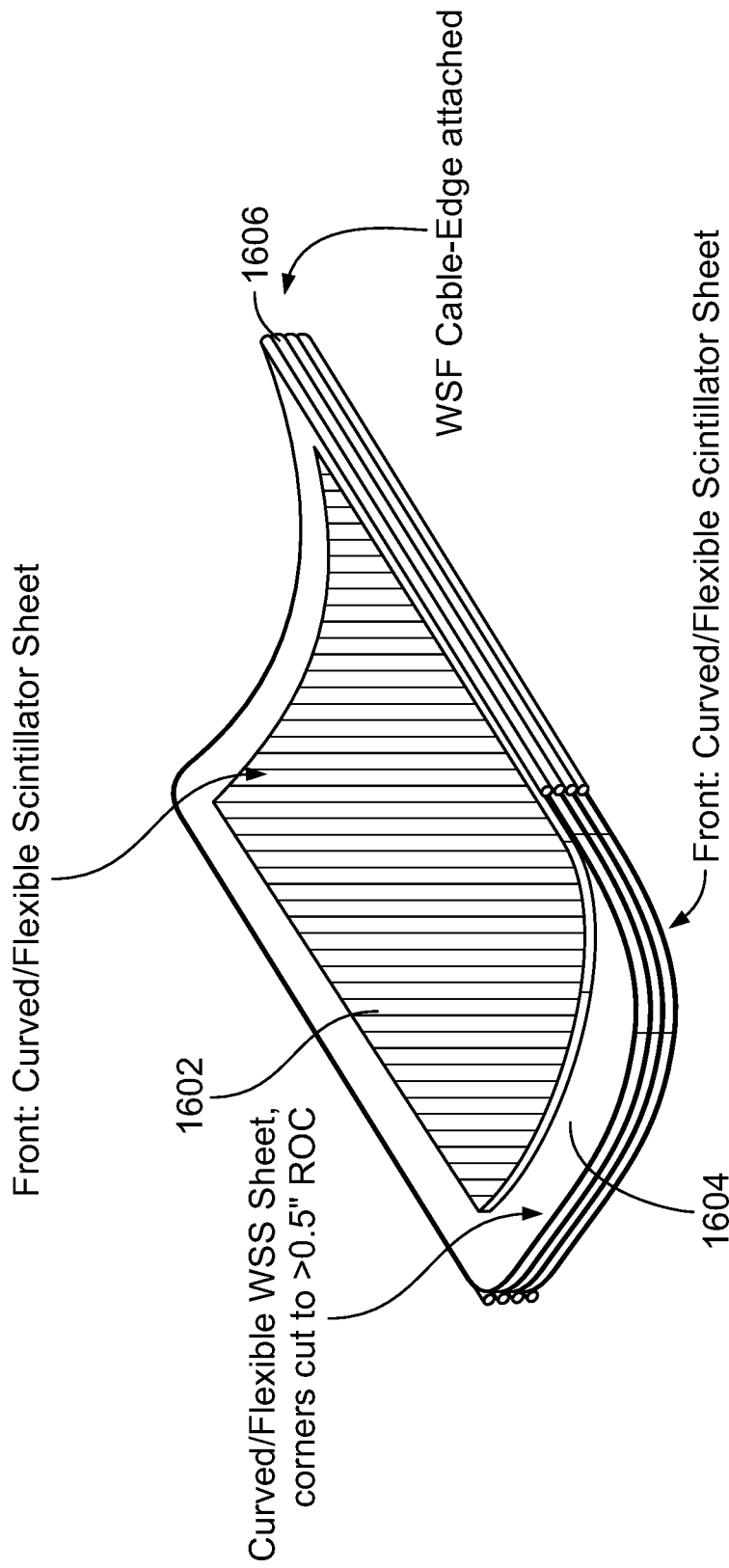
FIG. 16 illustrates a curved WSS detector, in accordance with an embodiment of the present specification.

In some imaging applications, for example non-destructive pipeline inspection, it is important to maintain proximity from the object being imaged to the detector in order to prevent a degradation of the spatial resolution of the recorded image. Hence, in an embodiment, the WSS detector is made of a curved WS sheet. FIG. 16 illustrates a curved WSS detector, in accordance with an embodiment of the present specification. As shown, a curved scintillator screen 1602 at least partially covers a curved WS sheet 1604 having a WSF cable coupled along the edges for enhancing the uniformity of the detector.

In an embodiment, a typical thickness of a WSS detector is 6 mm, wherein two scintillator screens having a thickness of 1 mm each, a WSS having a thickness of 2 mm and a cover having a thickness of 3 mm is employed. In an embodiment, the WSS detector has an area greater than 432 mm*432 mm; weight less than 2.5 kg; and a bezel thickness less than 4 mm. In an embodiment, the WSS detector operates in a temperature range of −20 C to 50 C, and a humidity range of 20% to 80%.

In an embodiment, the WSS detector of the present specification may be converted into a multi-energy detector. The multi-energy WSS detector may be obtained by employing a layered structure that includes a high energy and a low energy WSS detector. A filter such as, but not limited to, a sheet of copper may be inserted between two stacked WSS (high and low energy) detectors to obtain a multi-energy WSS detector.

In another embodiment, the WSS detector described in the present specification may be converted to a flexible X-ray detector by using WSS and/or edge collection WSF/WSS made of flexible materials such as, but not limited to silicone based materials. In embodiments, where the photodetector available for coupling with the WSS detector is larger than the thickness of the active area of the WSS detector, the PMT may be removed from the WSS detector package and coupled with the detector via a clear fiber optic cable.

Wavelength Shifting Sheet (WSS) Detector Implementation

In various embodiments, the WSS detector described above may be implemented as a transmission detector, a forward scatter detector, and a backscatter detector, depending on the placement of the detector with respect to an imager being used in conjunction with the detector. In embodiments, the detector of the present specification is implemented in an imaging system having an enclosure and housing that is built around the imaging system, and that is separate from the imaging system.

Figure 17A:
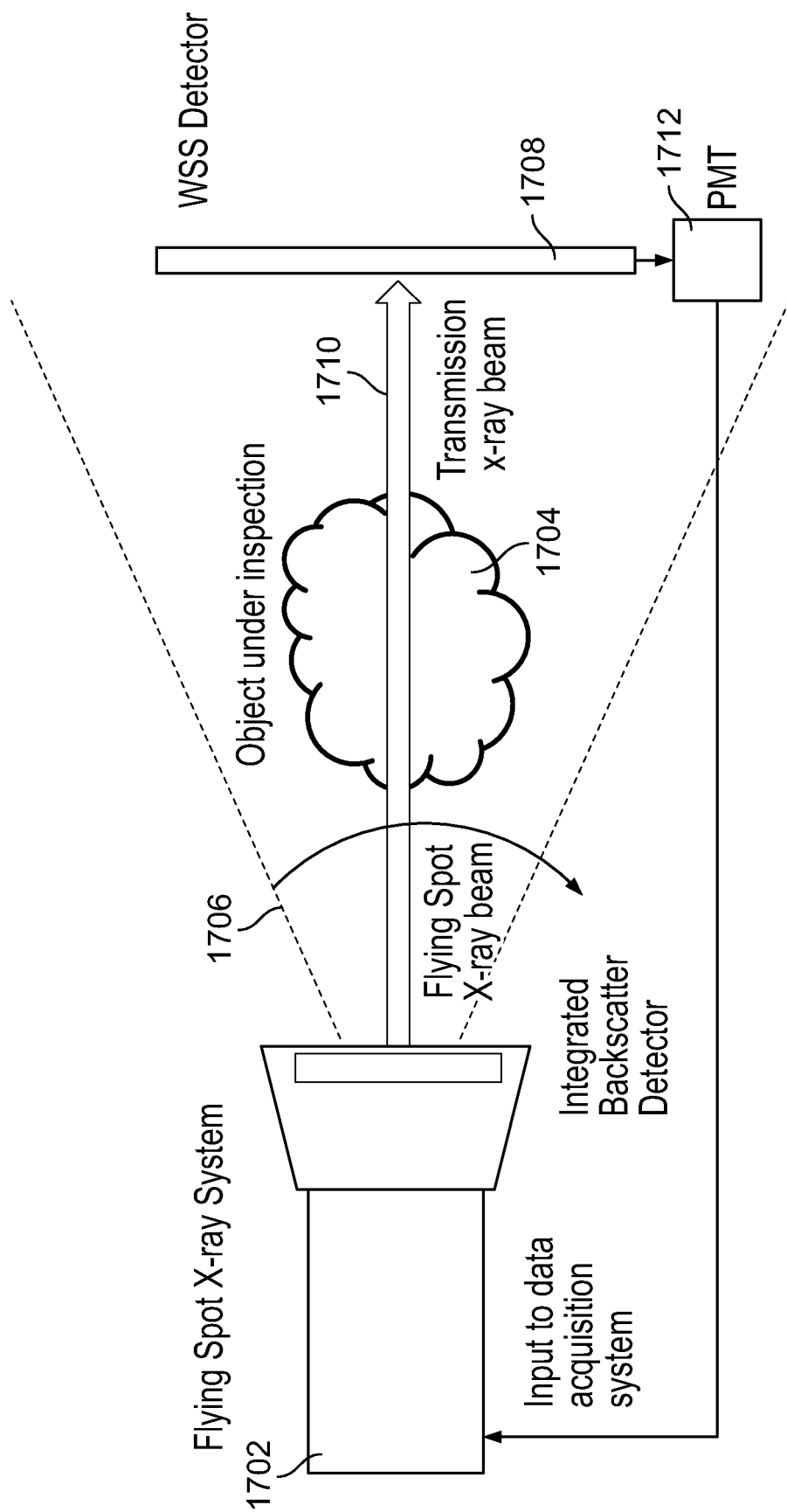
FIG. 17A is a diagrammatic representation of a WSS detector as used in a transmission mode with a flying spot X-ray imager, in an embodiment of the present specification.

FIG. 17A is a diagrammatic representation of a WSS detector as used in a transmission mode with a flying spot X-ray imager, in an embodiment of the present specification. A flying spot X-ray imager 1702 irradiates an object 1704 being inspected with a flying spot beam 1706, as shown in the FIG. A WSS detector 1708 placed behind the object 1704 (such that the object 1704 is between the imager 1702 and the detector 1708), receives a transmission beam 1710 comprising X rays that are transmitted through the object 1704. The beam 1710 is absorbed by a scintillator layer (not shown in the FIG.) and shifted by one or more WS materials of the WSS detector 1708 as explained in the preceding sections. The shifted beam is transmitted to a photomultiplier tube 1712 for detection which in turn transmits the detected data to a data acquisition system (not shown in the FIG.) of the imager 1702 for processing.

Figure 17B:
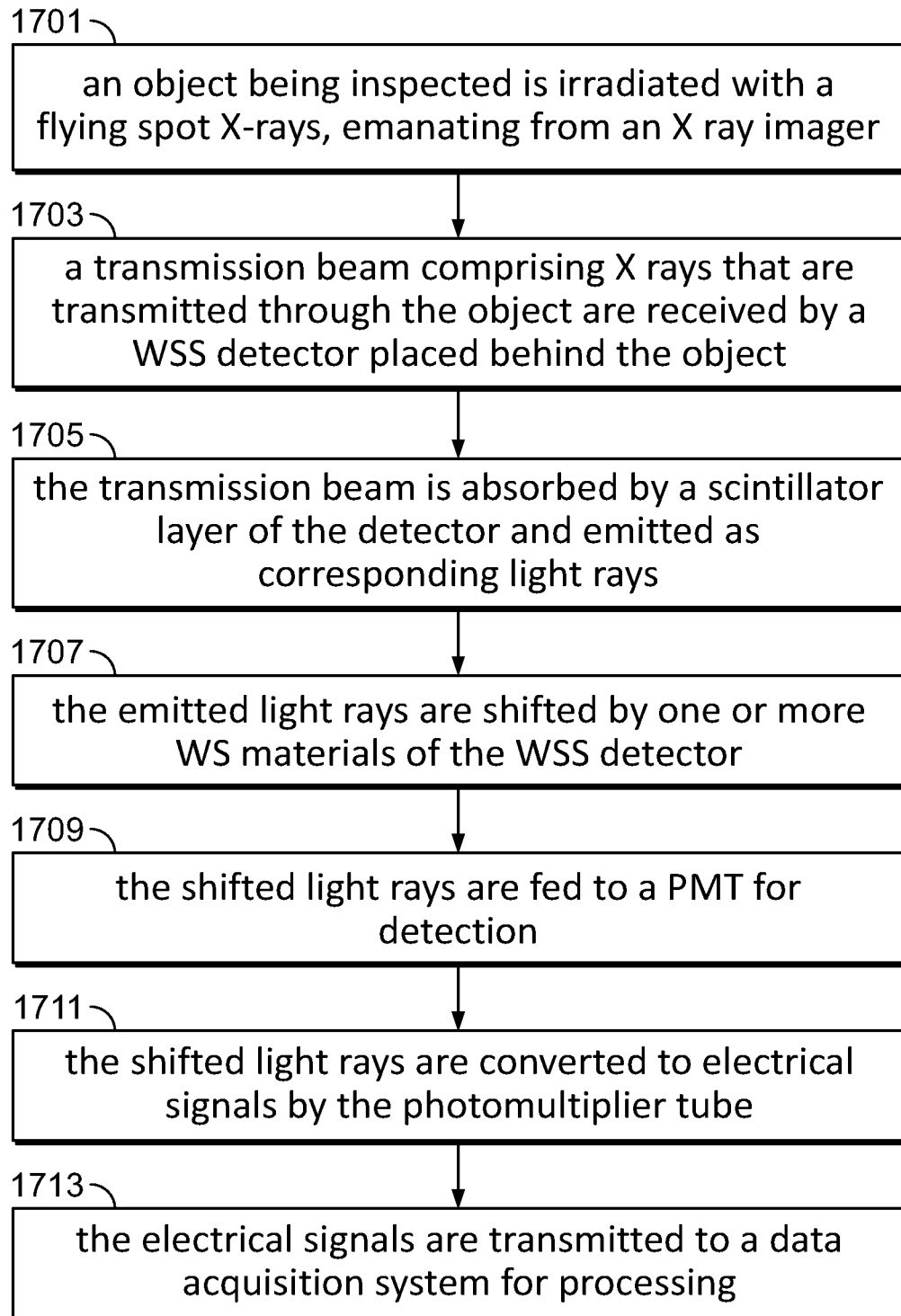
FIG. 17B is a flow diagram representing the steps of using an WSS detector in a transmission mode with a flying spot X-ray imager, in accordance with an embodiment of the present specification.

FIG. 17B is a flow diagram representing the steps of using an WSS detector in a transmission mode with a flying spot X-ray imager, in accordance with an embodiment of the present specification. At step 1701 an object under inspection is irradiated with a flying spot X-rays, emanating from an X-ray imager. At step 1703 a transmission beam comprising X rays that are transmitted through the object are received by a WSS detector placed behind the object (such that the object is positioned between the imager and the detector). At step 1705, the transmission beam is absorbed by a scintillator layer of the detector and emitted as corresponding light rays. At step 1707, the emitted light rays are shifted by one or more WS materials of the WSS detector. At step 1709, the shifted light rays are transmitted to a PMT for detection. At step 1711, the shifted light rays are converted to electrical signals by the photomultiplier tube. At 1713, the electrical signals are transmitted to a data acquisition system for processing.

Figure 17C:
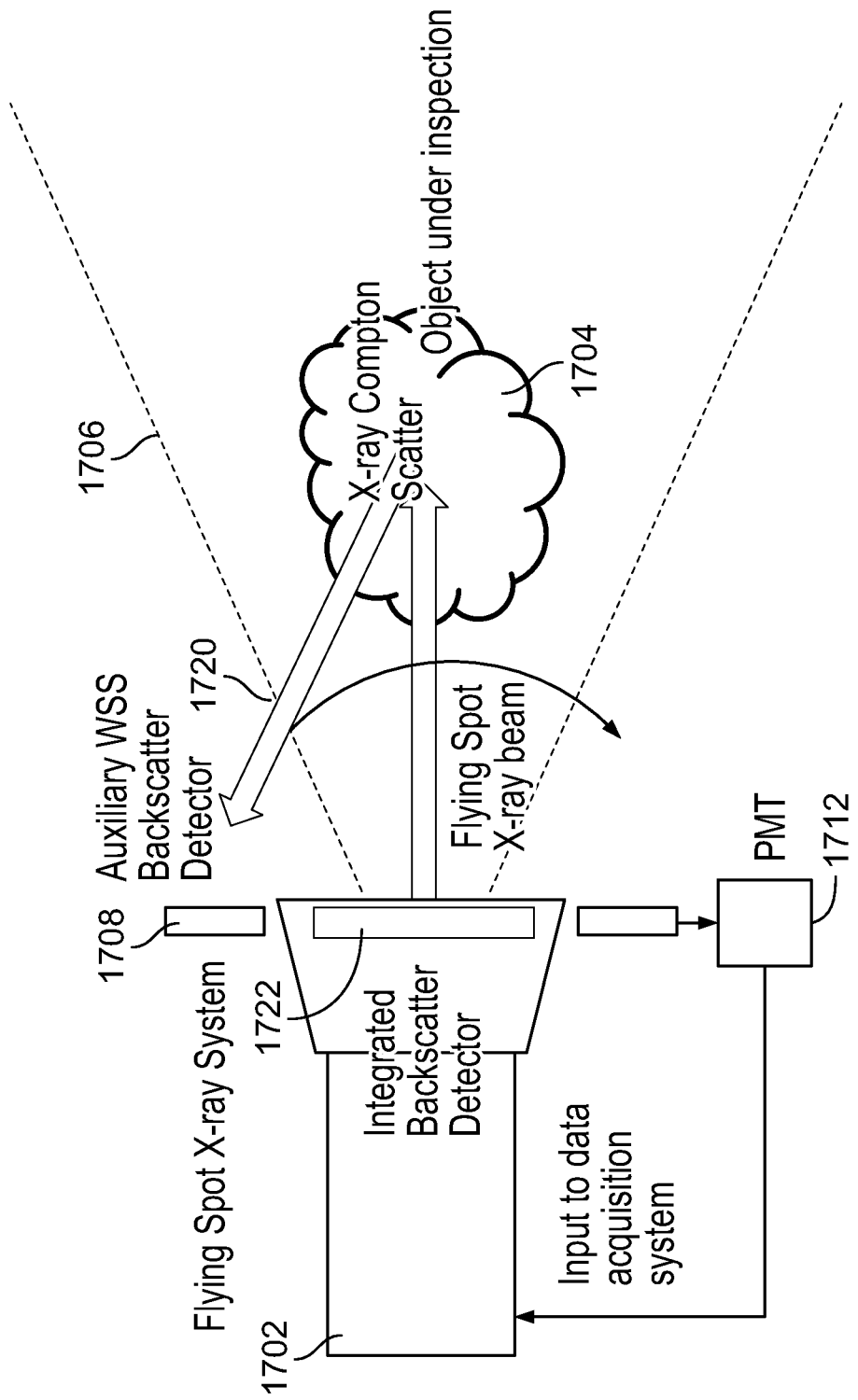
FIG. 17C is a diagrammatic representation of a WSS detector as used in a backscatter mode with a flying spot X-ray imager, in an embodiment of the present specification.

FIG. 17C is a diagrammatic representation of a WSS detector as used in a backscatter mode with a flying spot X-ray imager, in an embodiment of the present specification. A flying spot X-ray imager 1702 irradiates an object 1704 being inspected with a flying spot beam 1706, as shown in the FIG. A WSS detector 1708 placed before the object 1704 (such that the detector 1708 is between the imager 1702 and the object 1704), receives a backscatter beam 1720 comprising X rays that are backscattered by the object 1704. The beam 1720 is absorbed by a scintillator layer (not shown in the FIG.) and shifted by one or more WS materials of the WSS detector 1708 as explained in the preceding sections. The shifted beam is transmitted to a photomultiplier tube 1712 for detection which in turn transmits the detected data to a data acquisition system (not shown in the FIG.) of the imager 1702 for processing. In the embodiment shown in FIG. 17B, the WSS detector 1708 is implemented as an auxiliary backscatter detector while the imager 1702 comprises a primary backscatter detector 1722 integrated with the imager 1702. In embodiments, the auxiliary detector provides additional detection areas, capturing more of the scattered X-ray photons and thus boosting the contrast to noise ratio (CNR) of the imaging system.

Figure 17D:
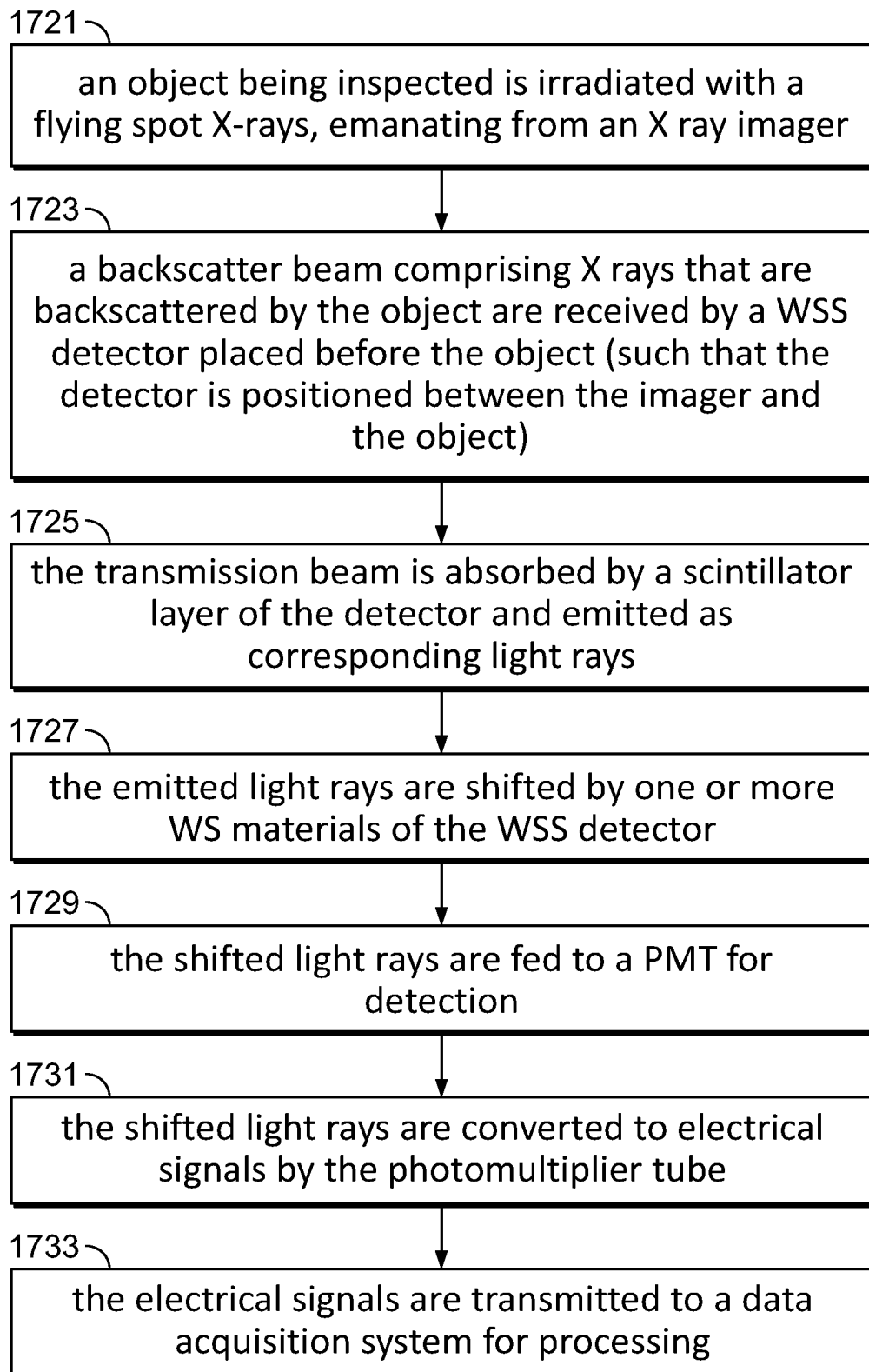
FIG. 17D is a flow diagram representing the steps of using an WSS detector in a backscatter mode with a flying spot X-ray imager, in accordance with an embodiment of the present specification.

FIG. 17D is a flow diagram representing the steps of using a WSS detector in a backscatter mode with a flying spot X-ray imager, in accordance with an embodiment of the present specification. At step 1721 an object being inspected is irradiated with a flying spot X-rays, emanating from an X-ray imager. At step 1723 a backscatter beam comprising X rays that are backscattered by the object are received by a WSS detector placed before the object (such that the detector is positioned between the imager and the object). At step 1725, the backscatter beam is absorbed by a scintillator layer of the detector and emitted as corresponding light rays. At step 1727, the emitted light rays are shifted by one or more WS materials of the WSS detector. At step 1729, the shifted light rays are transmitted to a PMT for detection. At step 1731, the shifted light rays are converted to electrical signals by the photomultiplier tube. At 1733, the electrical signals are transmitted to a data acquisition system for processing.

Figure 17E:
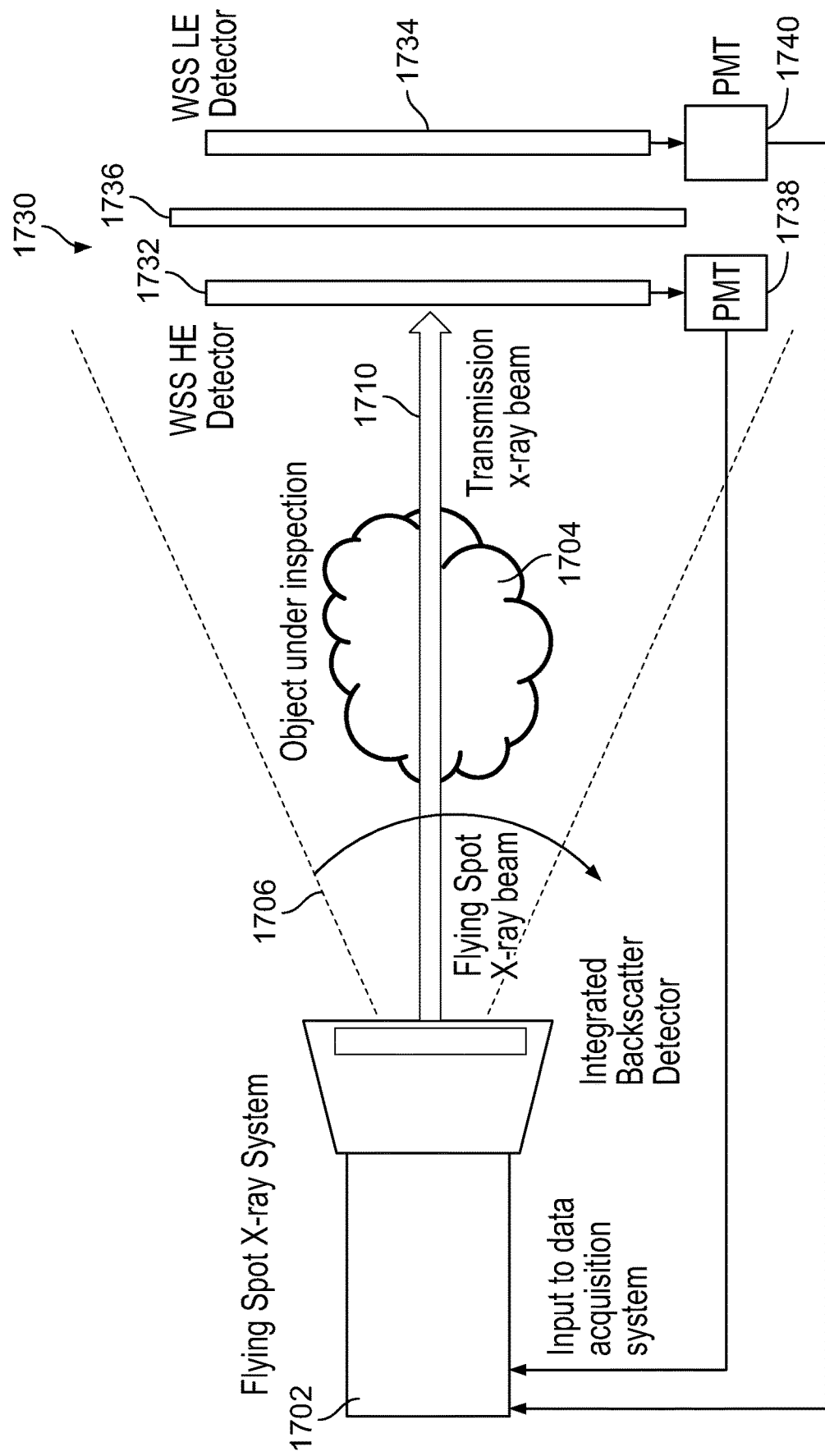
FIG. 17E is a diagrammatic representation of a multi-energy WSS detector as used in a transmission mode with a flying spot X-ray imager, in an embodiment of the present specification.

FIG. 17E is a diagrammatic representation of a multi-energy WSS detector as used in a transmission mode with a flying spot X-ray imager, in an embodiment of the present specification. A flying spot X-ray imager 1702 irradiates an object 1704 being inspected with a flying spot beam 1706, as shown in the FIG. A multi-energy WSS detector 1730 comprising a layered structure that includes a high energy 1732 and a low energy 1734 WSS detector, with a filter 1736 such as, but not limited to, a sheet of copper inserted between the two stacked WSS (high and low energy) detectors is placed behind the object 1704 (such that the object 1704 is between the imager 1702 and the detector 1730), receives a transmission beam 1710 comprising X rays that are transmitted through the object 1704. The beam 1710 is shifted by each of the high energy 1732 and the low energy 1734 WSS detectors and the shifted beams are transmitted to photomultiplier tubes 1738 and 1740 respectively for detection, which in turn transmit the detected data to a data acquisition system (not shown in the FIG.) of the imager 1702 for processing. The filter 1736 provides a shift in the energy of the transmission beam 1710, preferentially removing more low energy X-rays and shifting the beam spectrum to a higher energy level. As a result, in various embodiments the first detector layer is a Low Energy (LE) detector 1734 and the second post filter 1736 layer is a High Energy (HE) detector 1732.

Multi-energy WSS detectors are described in U.S. Pat. No. 9,285,488 entitled "X-ray inspection using wavelength-shifting fiber-coupled scintillation detectors", assigned to the Applicant of the present specification, and is herein incorporated by reference in its entirety. Multi-energy detectors work by separating the signals from both the front and back layers of scintillators, which allows the front layer to give a measure of the low-energy component of each pixel while the back layer gives a measure of the high-energy components. Putting a layer of absorbing material between the front and back scintillators is a standard methodology to enhance the difference between low and high energy components, which is typically done with a Sc-WSF detector. The Sc-WSF detector makes practical a dual-energy detector consisting of a layer of Sc-WSF, such as BaFCl-WSF, on top of a plastic scintillator detector; the BaFCl is sensitive to the low-energy x-rays and not the high-energy x-rays, while the plastic detector is sensitive to the high-energy x-rays and very insensitive to low energy x-rays. An alternative and potentially more effective material discriminator can be made by using more than two independent layers of Sc-WSF, with separate readouts for each layer. A passive absorber, such as an appropriate thickness of copper, can be inserted after the top Sc-WSF to enhance dual energy application, as is practiced with segmented detectors. Alternatively, the middle scintillator can be used as an active absorbing layer. The measurement of three independent parameters allows one to get a measure of both the average atomic number of the traversed materials and the extent of beam hardening as well.

Figure 17F:
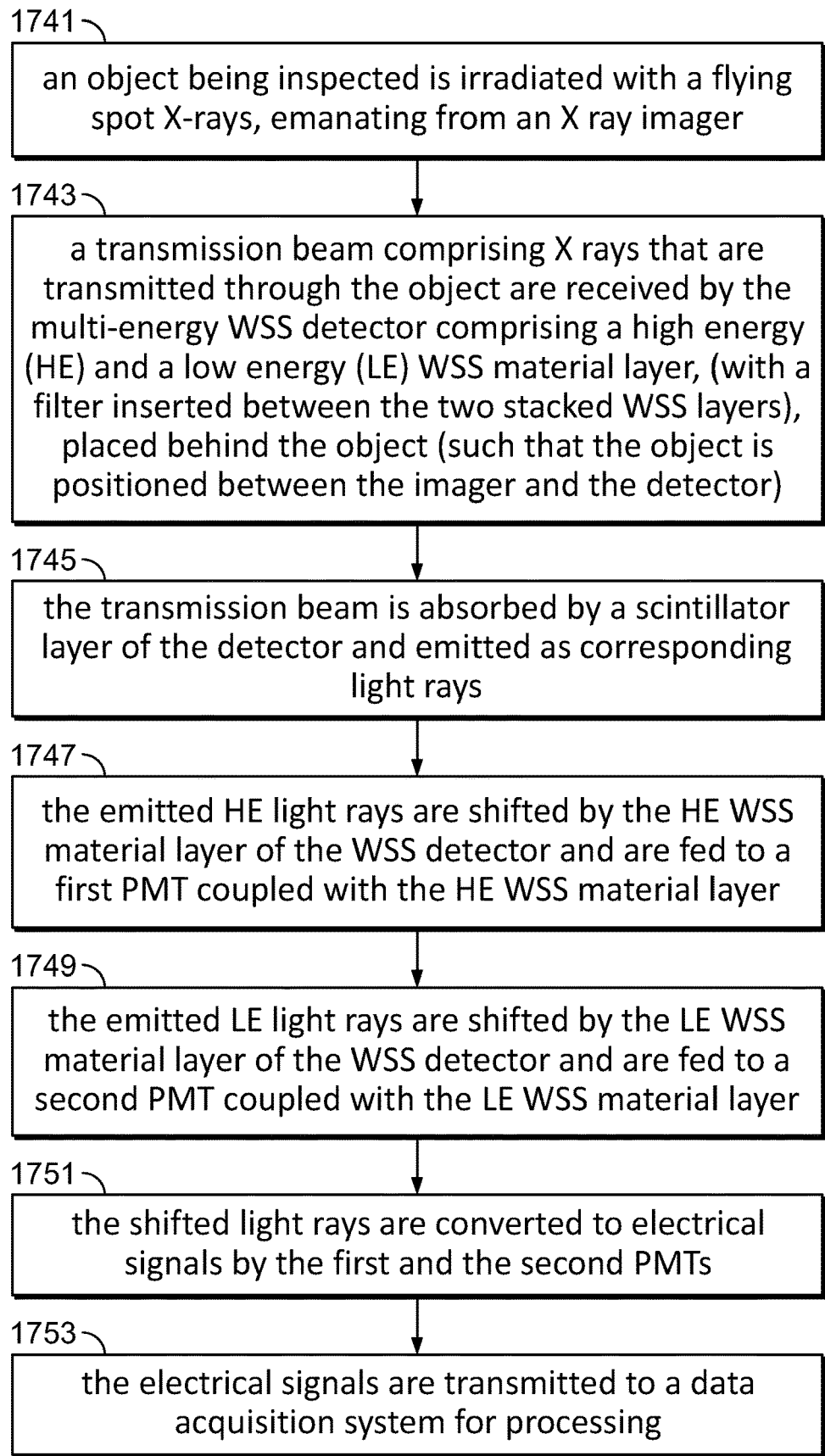
FIG. 17F is a flow diagram representing the steps of using the multi-energy WSS detector shown in FIG. 17E, in a transmission mode with a flying spot X-ray imager, in accordance with an embodiment of the present specification.

FIG. 17F is a flow diagram representing the steps of using the multi-energy WSS detector shown in FIG. 17E, in a transmission mode with a flying spot X-ray imager, in accordance with an embodiment of the present specification. At step 1741 an object being inspected is irradiated with a flying spot X-rays, emanating from an X-ray imager. At step 1743 a transmission beam comprising X rays that are transmitted through the object are received by the multi-energy WSS detector comprising a high energy (HE) and a low energy (LE) WSS material layer, with a filter inserted between the two stacked WSS layers, placed behind the object (such that the object is positioned between the imager and the detector). At step 1745, the transmission beam is absorbed by a scintillator layer of the detector and emitted as corresponding light rays. At step 1747, the emitted HE light rays are shifted by the HE WSS material layer of the WSS detector and are transmitted to a first PMT coupled with the HE WSS material layer. At step 1749, the emitted LE light rays are shifted by the LE WSS material layer of the WSS detector and are transmitted to a second PMT coupled with the LE WSS material layer. At step 1751, the shifted light rays are converted to electrical signals by the first and the second PMTs. At 1753, the electrical signals are transmitted to a data acquisition system for processing.

Figure 17G:
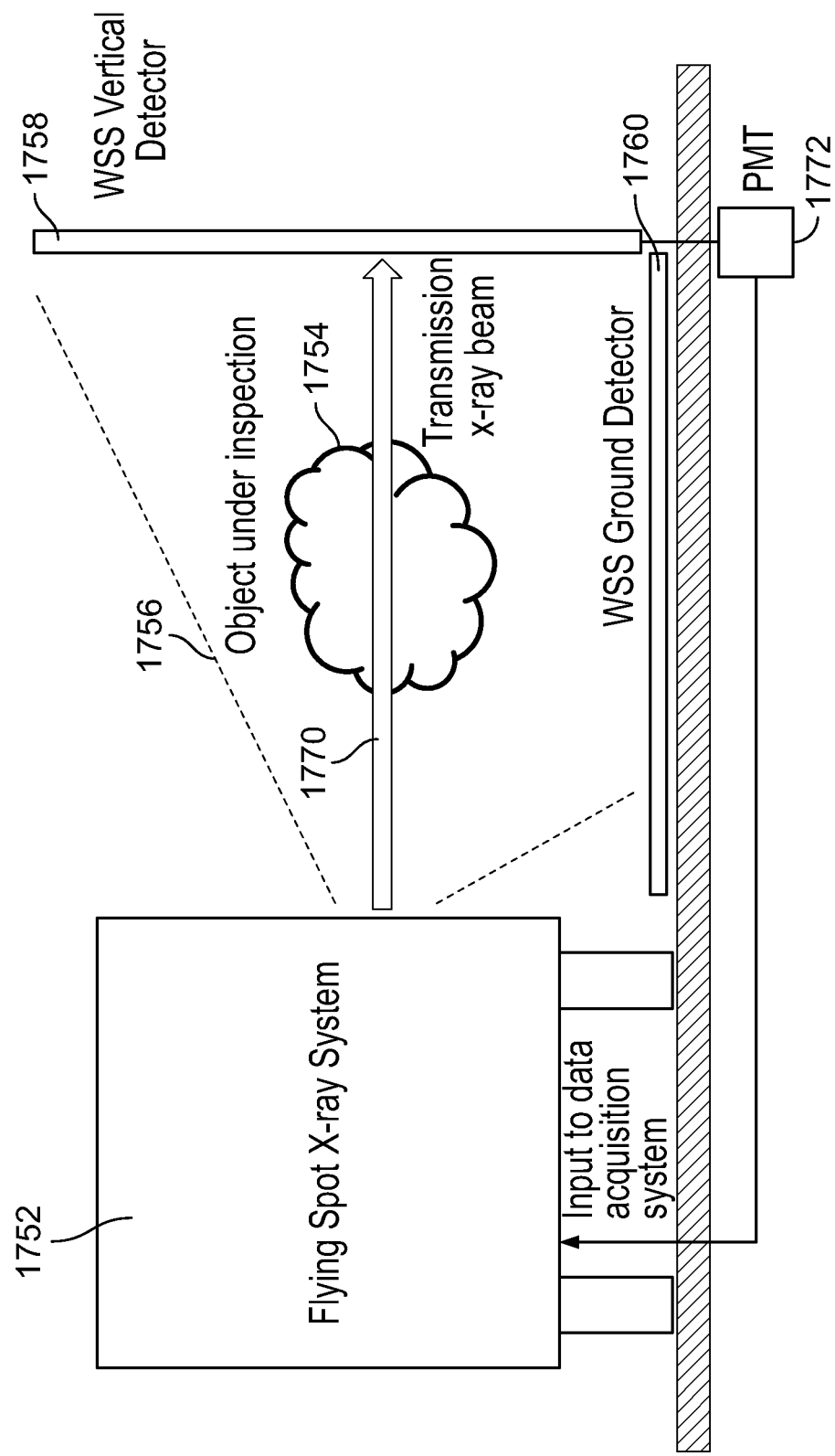
FIG. 17G is a diagrammatic representation of a vertical WSS detector and a ground-level WSS detector as used in a transmission mode with a flying spot X-ray imager for scanning a cargo object, in an embodiment of the present specification.

FIG. 17G is a diagrammatic representation of a vertical WSS detector and a ground-level WSS detector as used in a transmission mode with a flying spot X-ray imager for scanning a cargo object, in an embodiment of the present specification. A flying spot X-ray imager 1752 irradiates a cargo object 1754 being inspected with a flying spot beam 1756, as shown in the FIG. A WSS vertical detector 1758 and a WSS ground detector 1760 are arranged perpendicular to each other, as shown in FIG. 17G for scanning the cargo object 1754. A WSS vertical detector 1758 and a WSS ground detector 1760 are placed behind the object 1754 (such that the object 1754 is between the imager 1752 and the detectors 1758, 1760), receive a transmission beam 1770 comprising X-rays that are transmitted through the object 1754. The beam 1770 is absorbed by a scintillator layer (not shown in the FIG.) and shifted by one or more WS materials of the WSS detectors as explained in the preceding sections. The shifted beam is transmitted to a photomultiplier tube 1772 for detection which in turn transmits the detected data to a data acquisition system (not shown in the FIG.) of the imager 1752 for processing. WSS vertical detector 1758 may have multiple detector segments in a direction transverse to the direction of transmission beam 1770 and substantially along the direction of relative motion between inspected cargo object 1754 and transmission beam 1770 so as to provide an indication of skewness or lateral shift of the detectors with respect to the beam.

Figure 17H:
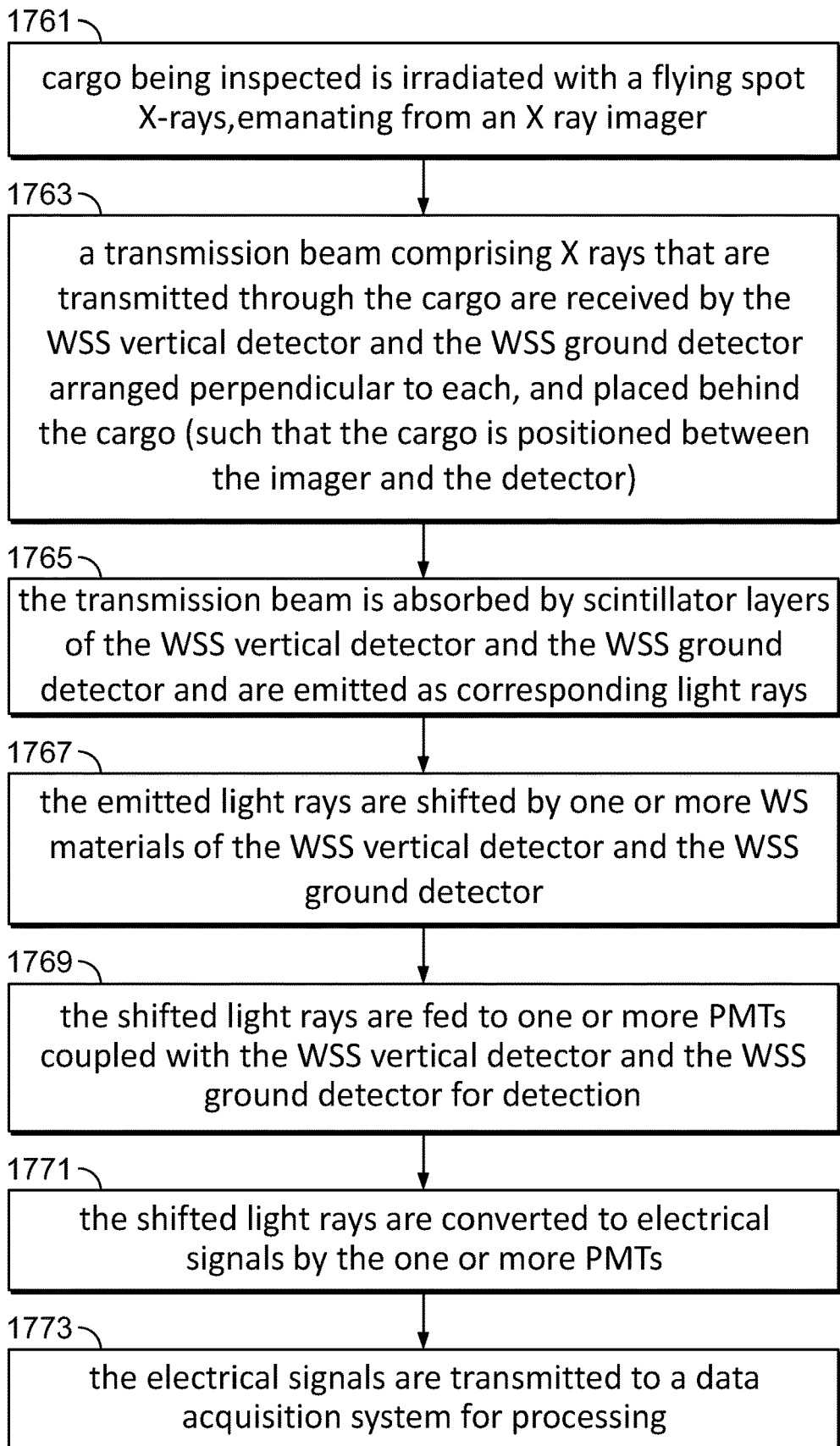
FIG. 17H is a flow diagram representing the steps of using the vertical WSS detector and a ground-level WSS detector shown in FIG. 17G in a transmission mode with a flying spot X-ray imager for scanning a cargo, in accordance with an embodiment of the present specification.

FIG. 17H is a flow diagram representing the steps of using the vertical WSS detector and a ground-level WSS detector shown in FIG. 17G in a transmission mode with a flying spot X-ray imager for scanning a cargo, in accordance with an embodiment of the present specification. At step 1761 the cargo being inspected is irradiated with a flying spot X-rays, emanating from an X-ray imager. At step 1763 a transmission beam comprising X rays that are transmitted through the cargo are received by the WSS vertical detector and the WSS ground detector arranged perpendicular to each, and placed behind the cargo (such that the cargo is positioned between the imager and the detector). At step 1765, the transmission beam is absorbed by scintillator layers of the WSS vertical detector and the WSS ground detector and are emitted as corresponding light rays. At step 1767, the emitted light rays are shifted by one or more WS materials of the WSS vertical detector and the WSS ground detector. At step 1769, the shifted light rays are transmitted to one or more PMTs coupled with the WSS vertical detector and the WSS ground detector for detection. At step 1771, the shifted light rays are converted to electrical signals by the one or more PMTs. At 1773, the electrical signals are transmitted to a data acquisition system for processing.

In embodiments, the detector of the present specification may be used in an integrated mode or an accessory mode with respect to an imaging system. The embodiments described above are representative of implementation in an integrated mode. In embodiments, in accessory mode, the WSS detector of the present specification further includes an enclosure and housing is built around the detection system that is separate from an imaging system where the imaging system includes a radiation source. The detection system enclosure comprises at least a handle and is powered by a power source built within the enclosure or is powered by an external power source. In an embodiment, the WSS detection system being used in an accessory mode is self-powered and wireless. In an embodiment, the detected radiation converted to electrical signals by a PMT of the WSS detection system is conveyed to the imaging system for processing via a shielded cable in an analog form. In another embodiment, the analog electrical signals are converted to digital signals and conveyed to the imaging system wirelessly. In an embodiment, the detected radiation may also be conveyed to the imaging system as light signals, wherein the PMT electronics for processing the light signals is provided in the imaging system, thereby reducing the size of the WSS detector system significantly by removing all PMT electronic components from the detection system. An advantage of using the WSS detector as a small portable accessory to the imaging system is that the position of the detector with respect to an object being scanned can be varied easily, thereby optimizing scan coverage of the object.

In some embodiments, the scanning system being used in conjunction with the WSS detector of the present specification comprises a plurality of channels for coupling with one or more detectors. The channels may be configured via a user interface to enable simultaneous coupling with more than one WSS detectors. In embodiments, the detector-type is user configurable. For example, a system may have a built-in backscatter detector configuration and two additional detector channels that may be user configured. The images captured by each of said detectors may either be processed separately or may be summed.

During the use of the WSS detector in a transmission mode, there is a wide range around the detector's WSS panel, where the imaging is apparent through forward scatter interaction of X-rays irradiating the object being scanned. Hence, by using the WSS detector in an accessory mode, users may position the detector in desirable orientations with respect to the object.

Figure 17K:
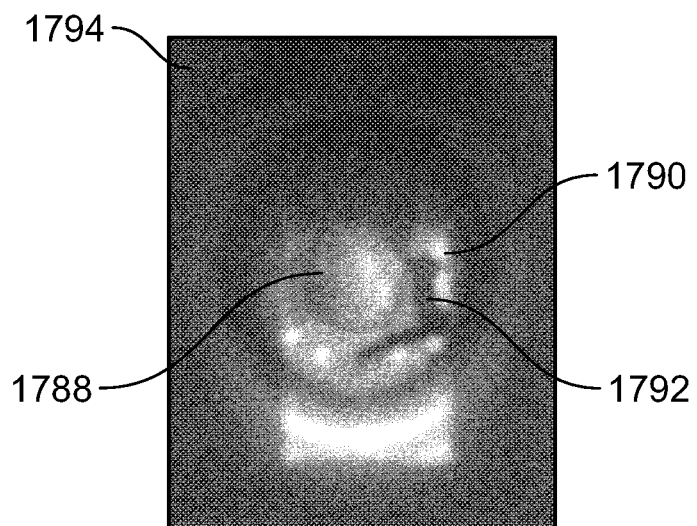
FIG. 17K illustrates a transmission image obtained by the WSS detector panel placed under the car as shown in FIG. 17I, in accordance with an embodiment of the present specification.

FIG. 17I illustrates a detector panel placed under a car to collect transmission radiations emitted by a small portable scanner being used to scan a boot of the car, in accordance with an embodiment of the present specification. As shown, detector panel 1782 is placed under a boot 1784 of the car to collect the transmission radiation emitted by the portable scanner 1786 which is being used to scan the boot 1784. FIG. 17J illustrates explosives hidden approximately two feet under the boot 1784 of the car shown in FIG. 17I. The explosives include explosive stimulants i.e. 5 lbs of sugar 1788 and 500 ml liquid 1790 and a gun 1792. FIG. 28C illustrates a transmission image 1794 obtained by the detector panel placed under the car as shown in FIG. 17I, in accordance with an embodiment of the present specification. As can be seen in FIG. 17K, the transmission image 1794 clearly shows the metal gun 1792 while the organic explosives 1788, 1790 become nearly transparent in the image. Hence even though, when used as a transmission detector, the active size of the detector panel 1782 may become limiting, the forward scatter generated by the scanner 1786 in the vicinity of the detector 1782 is also detected, thereby making the effective field of view larger than the detector area.

Figure 17L:
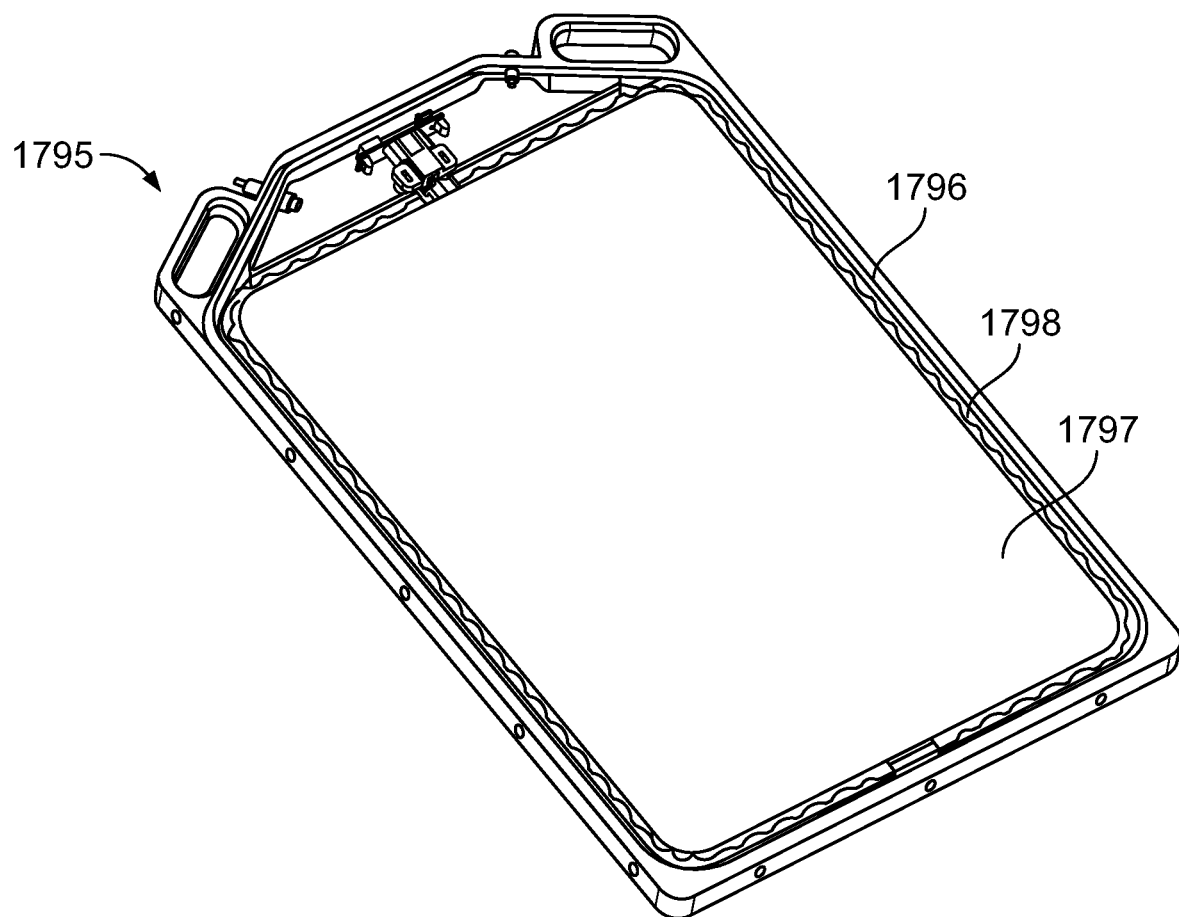
FIG. 17L illustrates a perspective view of the transmission detector panel shown in FIG. 17I, in accordance with an embodiment of the present specification.
Figure 17M:
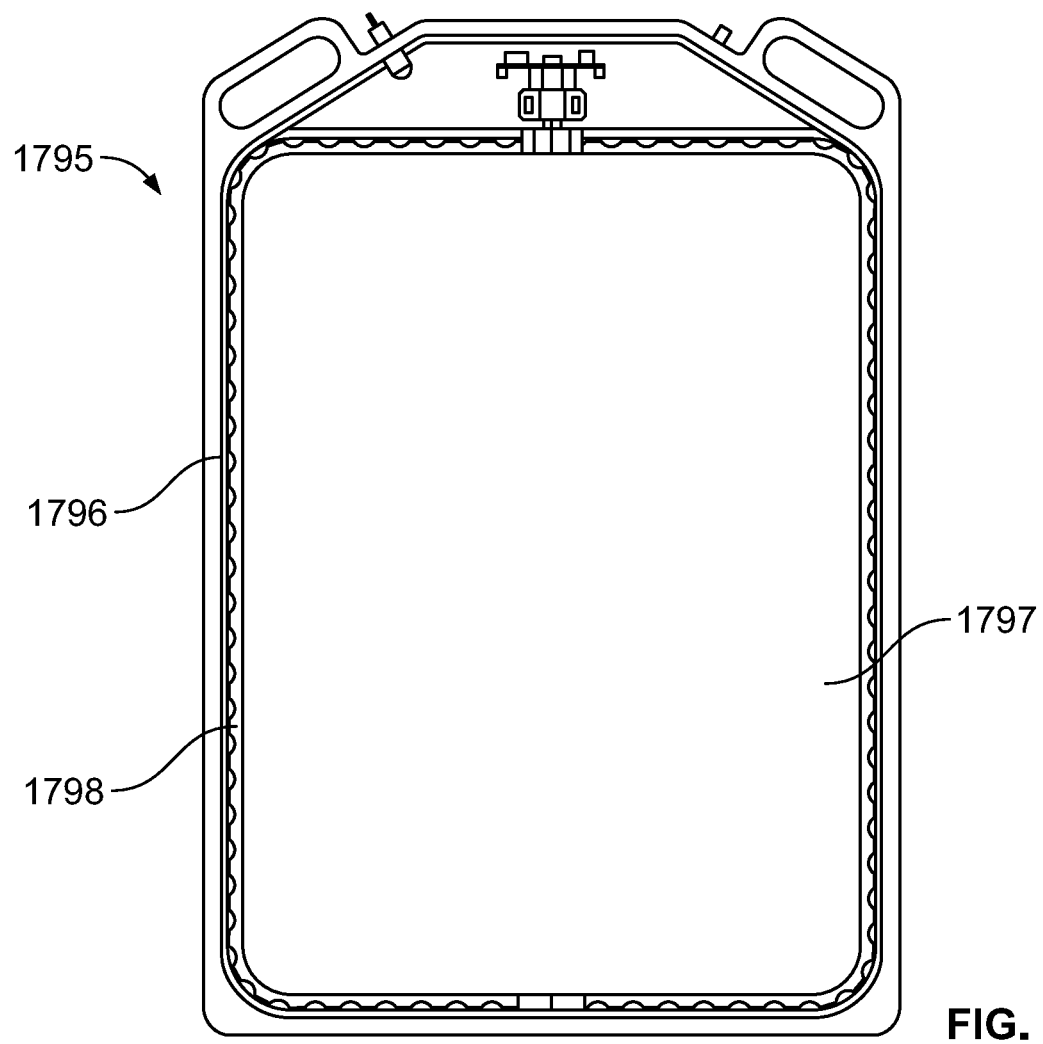
FIG. 17M illustrates a top view of the transmission detector panel shown in FIG. 17I, in accordance with an embodiment of the present specification.
Figure 17N:
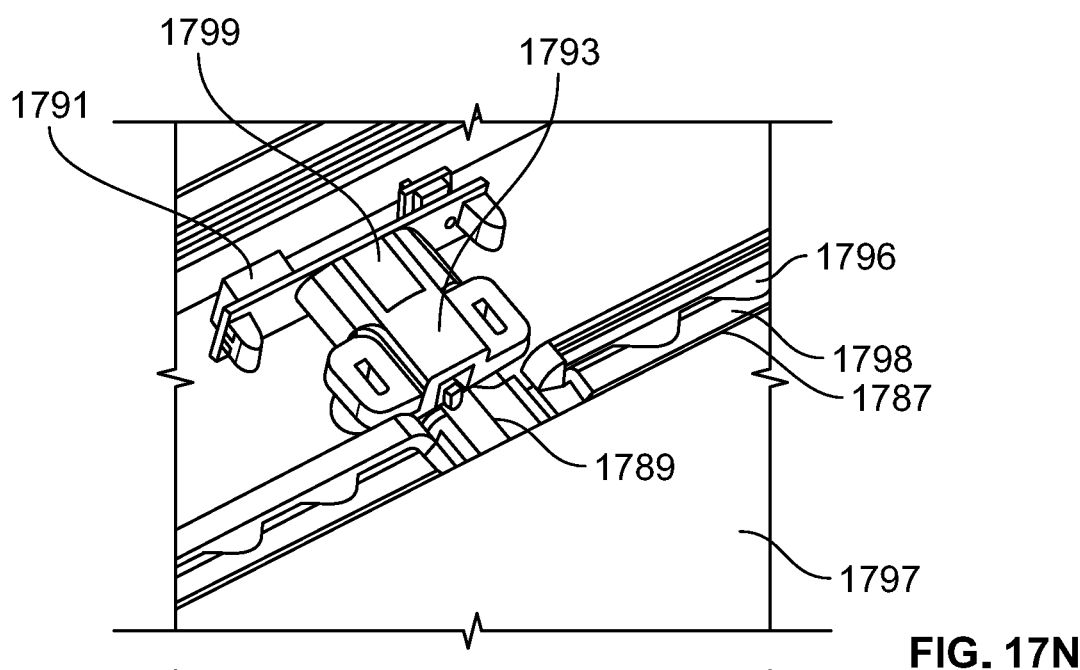
FIG. 17N illustrates an exploded view of a plurality of components of the transmission detector panel shown in FIG. 17L, in accordance with an embodiment of the present specification.

FIG. 17L illustrates a top perspective view of a prototype of the transmission detector panel shown in FIG. 17I, in accordance with an embodiment of the present specification. FIG. 17M illustrates a top view of a prototype of the transmission detector panel shown in FIG. 17I, in accordance with an embodiment of the present specification. FIG. 17N illustrates a close up view of the components of the transmission detector panel shown in FIG. 17L, in accordance with an embodiment of the present specification. Referring to FIGS. 17L, 17M and 17N transmission detector panel 1795 comprises WS sheet 1796 coated with a top layer of a scintillator material 1797, and is bounded by WS fiber cables 1798. During a detection operation, the scintillator material 1797 absorbs the transmission X rays falling on the detector panel 1795 and converts said rays to light rays, which in turn are shifted by the WSS 1796 and WS fiber 1798 and fed to a PMT 1799 powered by a power supply 1791. The WS fiber cables 1798 are placed in cable retainers 1787 and are coupled with the PMT 1799 via fiber cable guide 1789 and fiber collet 1793.

Figure 17O:
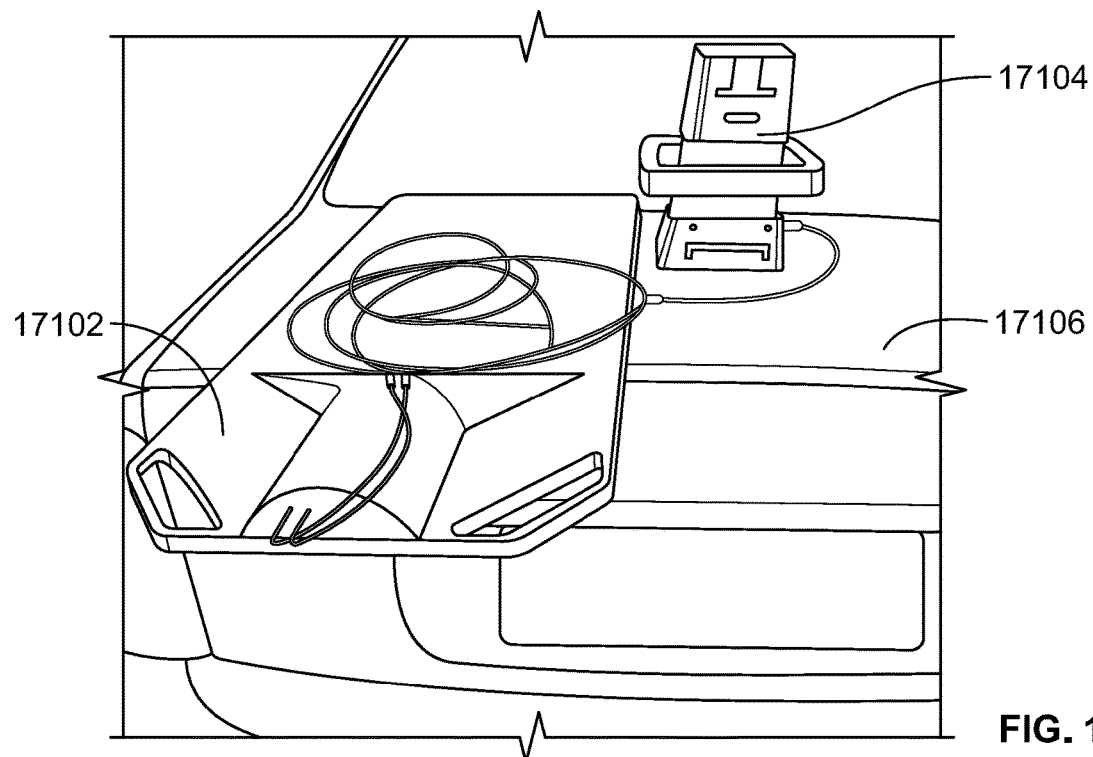
FIG. 17O illustrates a WSS detector panel placed to collect backscatter radiations emitted by a small portable scanner being used to scan a car, in accordance with an embodiment of the present specification.
Figure 17P:
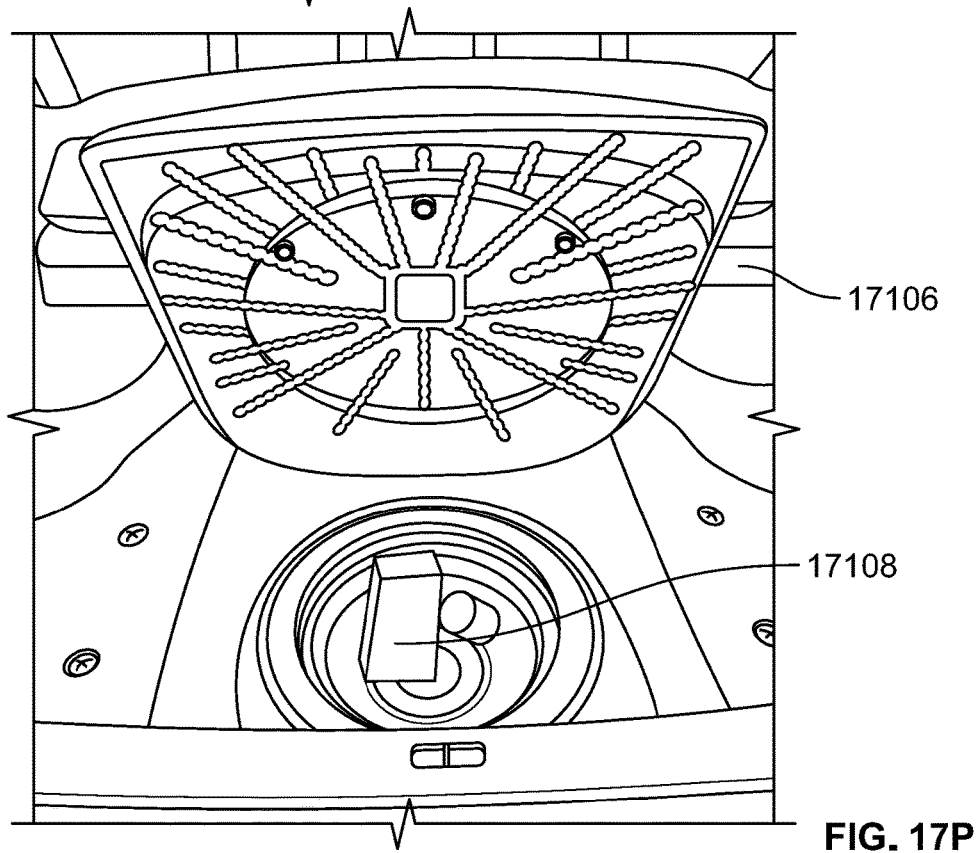
FIG. 17P illustrates explosives hidden approximately two feet under the boot of the car shown in FIG. 17O.
Figure 17Q:
FIG. 17Q illustrates a backscatter image obtained by a built-in detector of the scanner of FIG. 17O, in accordance with an embodiment of the present specification.
Figure 17R:
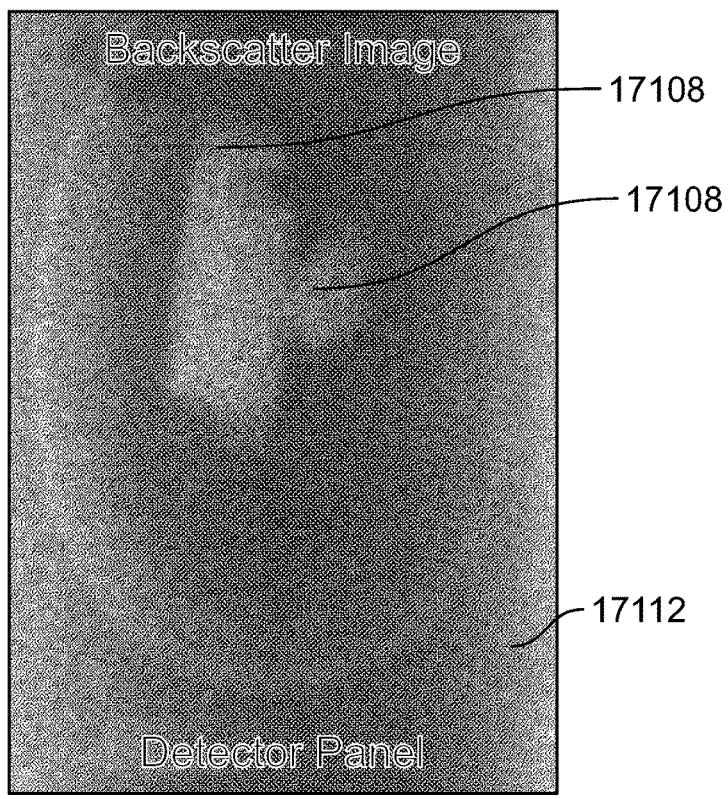
FIG. 17R illustrates a backscatter image obtained by the scanner and the detector panel of FIG. 17O, in accordance with an embodiment of the present specification.

FIG. 17O illustrates a WSS detector panel placed to collect backscatter radiation emitted by a small portable scanner being used to scan a car, in accordance with an embodiment of the present specification. As shown, detector panel 17102 is placed to collect the backscatter radiation emitted by the portable scanner 17104 which is being used to scan the boot 17106 of a car. FIG. 17P illustrates explosives 17108 hidden approximately two feet under the boot 17106. FIG. 17Q illustrates a backscatter image 17110 obtained by a built-in detector of the scanner of FIG. 17O, in accordance with an embodiment of the present specification. The backscatter image 17110 obtained by the scanner 17104, which is obtained using the in-built detectors (not shown in the FIG.) of said scanner 17104 does not show the hidden explosive 17108 (shown in FIG. 17P). FIG. 17R illustrates a backscatter image 17112 obtained by the scanner and the detector panel of FIG. 17O, in accordance with an embodiment of the present specification. As can be seen in FIG. 17R, the backscatter image 17112 clearly shows the explosive stimulant 17108 hidden within the boot 17106. The spatial resolution of the backscatter image 17112 is governed by the scanning beam spot size, however, the beam penetration and SNR is greatly enhanced as compared to the backscatter image 17110.

FIG. 18A illustrates a portable detector for handheld imaging, as used in a transmission mode, in accordance with an embodiment of the present specification. FIG. 18B illustrates a portable detector for handheld imaging, being used in a forward scatter mode, in accordance with an embodiment of the present specification. FIG. 18C illustrates a portable detector for handheld imaging, as used in backscatter mode, in accordance with an embodiment of the present specification. Referring to FIGS. 18A, 18B and 18C, in various embodiments, in order to operate portable WSS detector 1806 for handheld imaging in transmission, forward scatter or backscatter mode, an operator 1802 is required to position the detector 1806 with respect to the target being scanned 1808, energize a hand-held imaging system 1804, translate the imaging system 1804 across the region of the target 1802 and collect the scattered and transmission data for review. Referring to FIG. 18A, transmitted photons are detected by the detector 1806. Referring to FIG. 18B, the detector panel 1806 is placed on a side opposite a side of the hand held imaging system 1804 with respect to the target 1808, or, in some embodiments, at right angles to the target 1808, such that when the target 1802 is irradiated with X rays from the imaging system 1804 the forward scatter from the target 1802 is detected by the WSS detector panel 1806. Referring to FIG. 18C backscattered photons are detected by the hand-held imaging system 1804.

Figures 18D, 19:
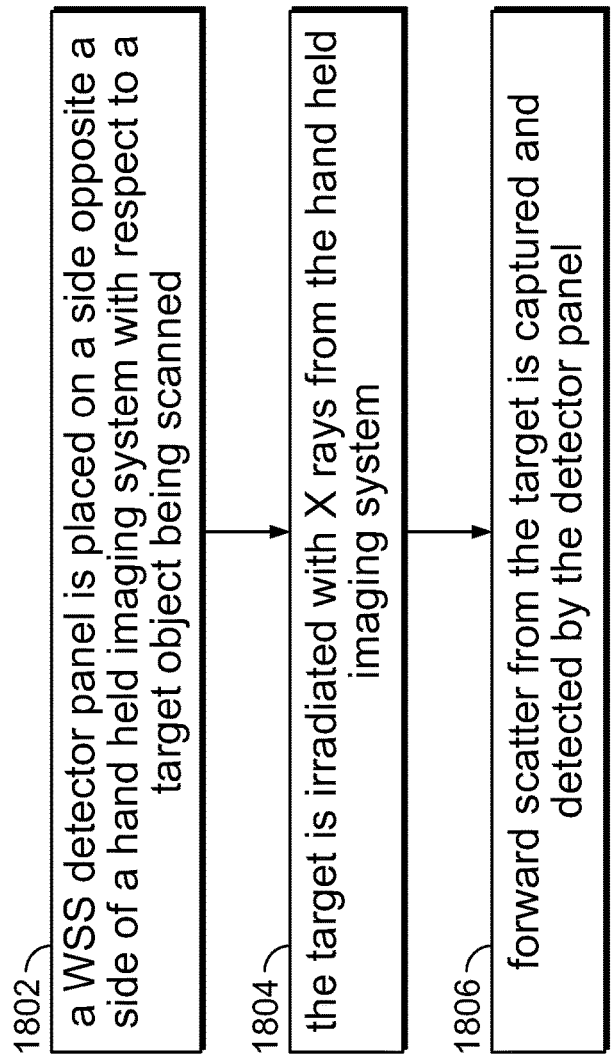
FIG. 18D is a flowchart illustrating the steps of imaging a target in a forward scatter mode by using a WSS detector panel and a handheld imaging system, in accordance with an embodiment of the present specification.
FIG. 19 is a table conveying exemplary dimensions and perimeter fractions of a plurality of WSS detectors in various modes of operation, in embodiments of the present specification.

FIG. 18D is a flowchart illustrating the steps of imaging a target in a forward scatter mode by using a WSS detector panel and a handheld imaging system, in accordance with an embodiment of the present specification. At step 1810 a WSS detector panel is placed on a side opposite a side of a hand held imaging system with respect to the target object being scanned. In various embodiments, the detector panel is placed in close proximity to the target as shown in FIG. 18B. At step 1812, the target is irradiated with X rays from the hand held imaging system. At step 1814, forward scatter from the target is captured and detected by the detector panel. In various embodiments, the detected forward scatter is processed by an image processing system coupled with the detector panel to produce a scanned image of the target object.

FIG. 19 is a table conveying the dimensions and perimeter fractions of a plurality of WSS detectors, in an embodiment of the resent specification. The perimeter fraction is the amount of the edge where the WSF cable is in contact with the WSS. Row 1902 illustrates the dimension and perimeter fraction of a handheld transmission WSS detector, wherein the length ranges from 8 to 16 inches, width ranges from 8 to 24 inches, and perimeter fraction ranges from 50% to 100%. Row 1904 illustrates the dimension and perimeter fraction of a handheld backscatter WSS detector, wherein the length and width ranges from 6 to 12 inches, and perimeter fraction ranges from 25% to 50%. Row 1906 illustrates the dimension and perimeter fraction of a cargo backscatter WSS detector, wherein the length ranges from 40 to 80 inches, width ranges from 15 to 40 inches, and perimeter fraction ranges from 50% to 100%. Row 1908 illustrates the dimension and perimeter fraction of a cargo transmission WSS detector, wherein the length ranges from 80 to 150 inches, width ranges from 6 to 12 inches, and perimeter fraction ranges from 50% to 100%.

Hence, the present specification provides a WSS detector for use in a flying spot transmission imaging system with improved spatial uniformity. The cost for materials and manufacturing the WSS is less as compared to prior art detectors as: off-the-shelf scintillating screens may be used in place of specialized molded parts; there is no requirement for fiber handling, bundling or polishing; and adhesives are not required in any of the active optical paths, greatly reducing the chances for yield failure due to bubbles or voids.

Since, backscatter systems have imaging limitations in certain applications where Transmission imaging is advantageous, the WSS detector of the present specification is implemented as a Transmission Scan Panel that can be used with any commercially available handheld scanning system such as, but not limited to, the MINI Z scanning system, to provide a simultaneous secondary image. As described above, the detector of the present specification provides a transmission image when placed directly behind an item being scanned, or an additional backscatter image when placed on the near side of the object being scanned. The secondary image is displayed next to the standard Backscatter image on a display screen coupled with the MINI Z scanning system. In various embodiments, the Transmission Scan Panel is portable, light-weight, and connects to handheld scanning system with a simple, single cable connection.

In an embodiment, some exemplary physical attributes of the WSS detector panel of the present specification are:
Active Imaging Area: 16 in ×22 in (41 cm×56 cm)
Weight: 10 pounds (4.5 kg)
Cable length: Up to 30 feet (9 m) total, using 3 individual 10 foot (3 m) cables connected in series.

In an embodiment, some exemplary performance specification of the WSS detector panel of the present specification are:
Nominal Penetration: up to 20 mm steel
Nominal Resolution: 0.5 mm at 0 cm standoff; 3 mm at 10 cm standoff; and 4 mm at 25 cm standoff In an embodiment, the WSS detector panel of the present specification includes a manual gain adjust reduce/eliminate image noise.

Figure 20:
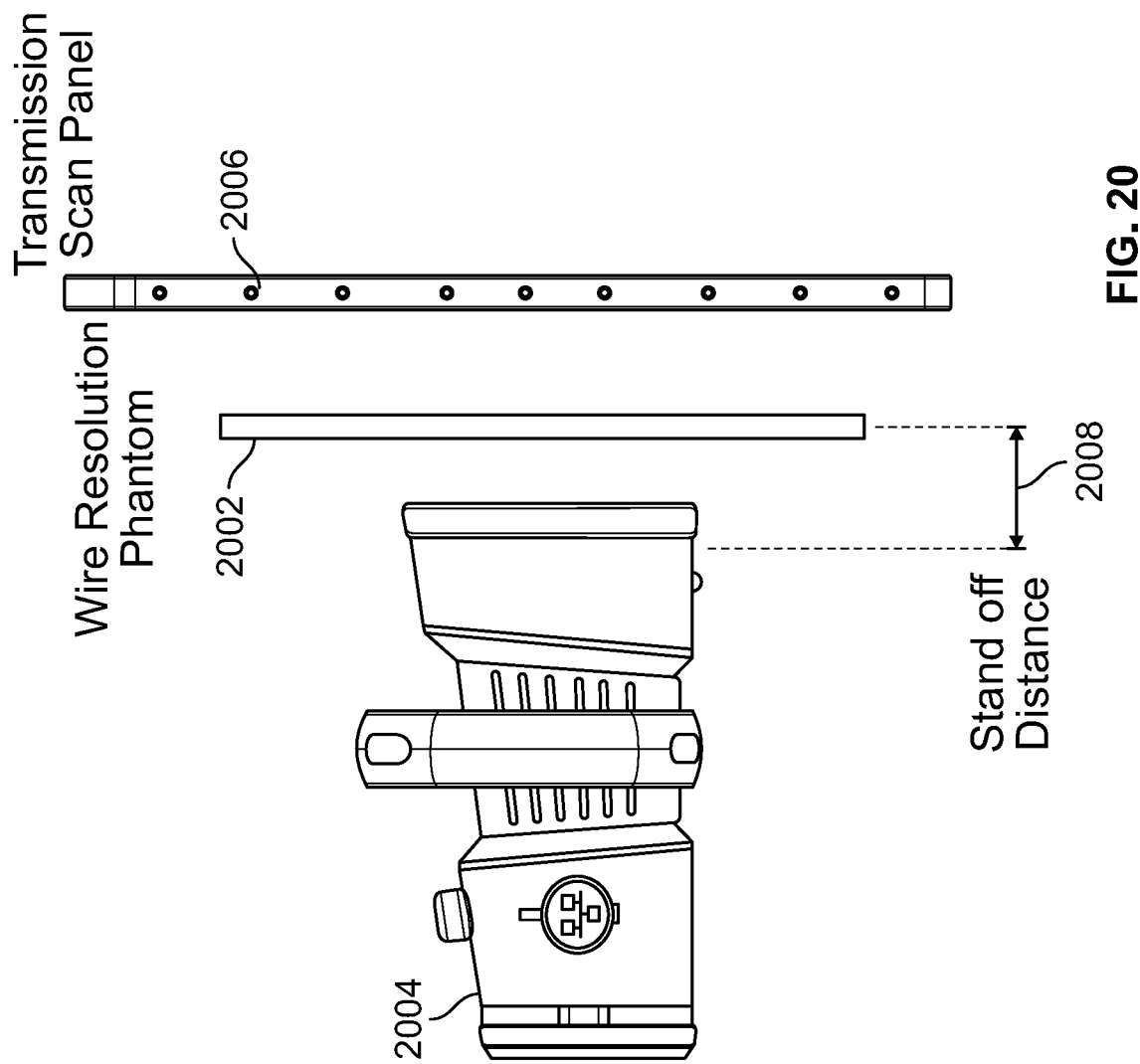
FIG. 20 illustrates a diagrammatical representation of an object being scanned by a portable scanner and a WSS detector panel, in accordance with an embodiment of the present specification.

FIG. 20 illustrates a diagrammatical representation of an object 2002 being scanned by a portable scanner 2004 and a WSS detector panel 2006, in accordance with an embodiment of the present specification. In an embodiment, where the object 2002 is a wire-resolution phantom object, a standoff distance 2008 between the object 2002 and the imaging system 2004 is 0 cm to obtain a 1.5 mm wire resolution; 3 mm to obtain a 10 cm wire resolution; and 5 mm to obtain a 25 cm wire resolution.

Figure 21A:
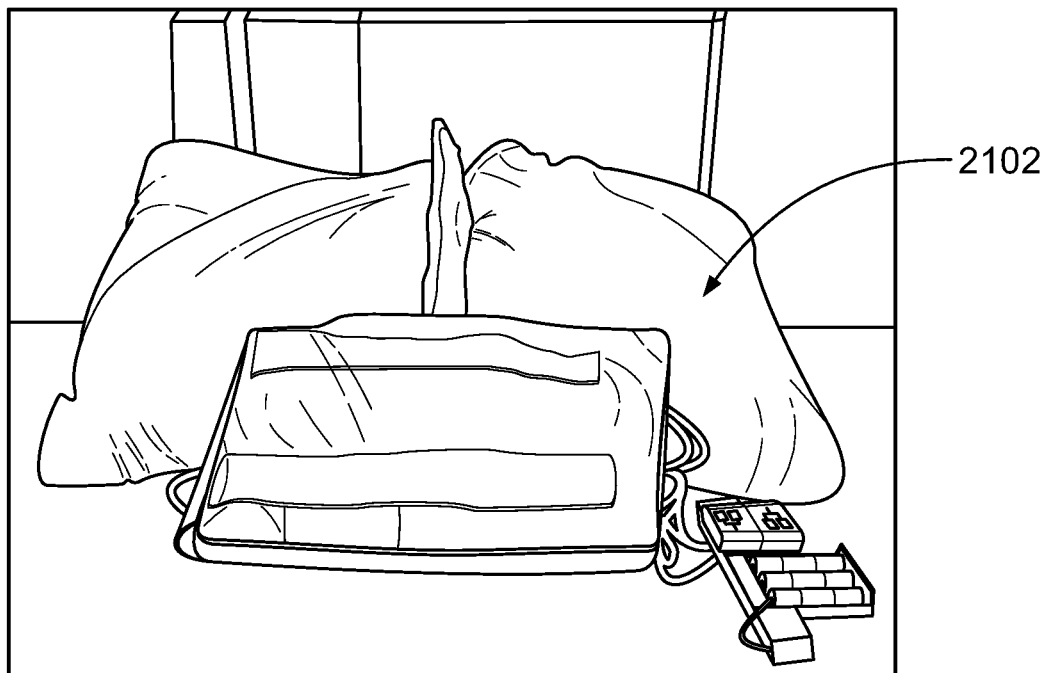
FIG. 21A illustrates a standard shipping box comprising an explosive object not visible with the naked eye.
Figure 21B:
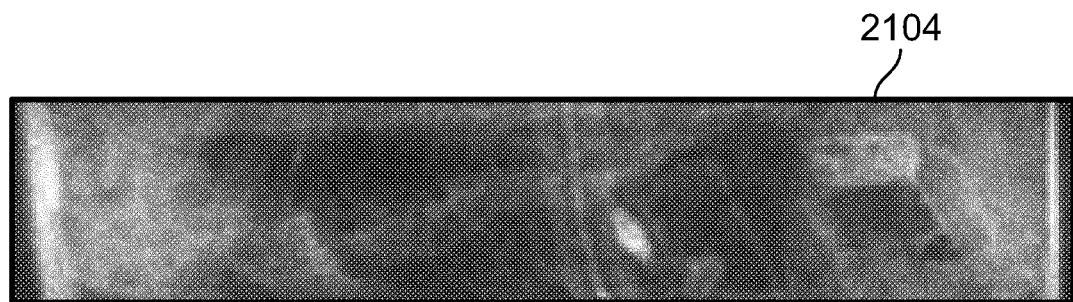
FIG. 21B illustrates an image of the shipping box obtained by using a portable scanning system and a WSS detector panel of the present specification operating in a backscatter mode, in accordance with an embodiment of the present specification.
Figure 21C:
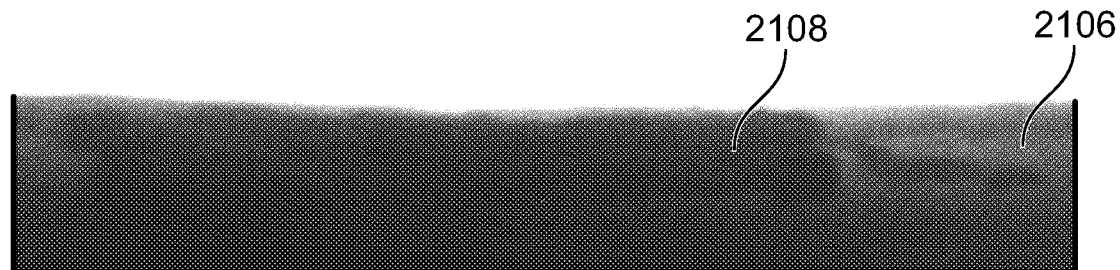
FIG. 21C illustrates an image of the shipping box obtained by using a portable scanning system and a WSS detector panel of the present specification operating in a transmission mode, in accordance with an embodiment of the present specification.

FIG. 21A illustrates a standard shipping box 2102 comprising an explosive object not visible to naked eye. FIG. 21B illustrates an image 2104 of the shipping box obtained by using a portable scanning system and a WSS detector panel of the present specification operating in a backscatter mode, in accordance with an embodiment of the present specification. As shown in FIG. 21B the explosive object which is a pipe bomb is not visible in the scanning image 2104 obtained by operating the WSS detector panel in a backscatter mode. FIG. 21C illustrates an image 2106 of the shipping box obtained by using a portable scanning system and a WSS detector panel of the present specification operating in a transmission mode, in accordance with an embodiment of the present specification. As shown in FIG. 21C the pipe bomb 2108 is clearly visible in the scanning image 2106 obtained by operating the WSS detector panel in a transmission mode.

Figure 22A:
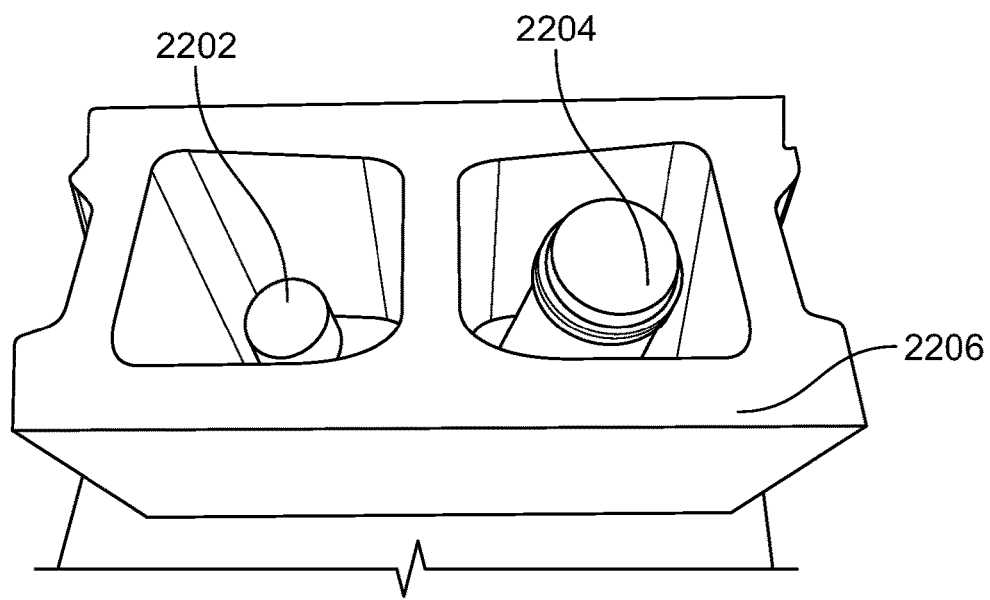
FIG. 22A illustrates explosives hidden in a concrete block.
Figure 22B:
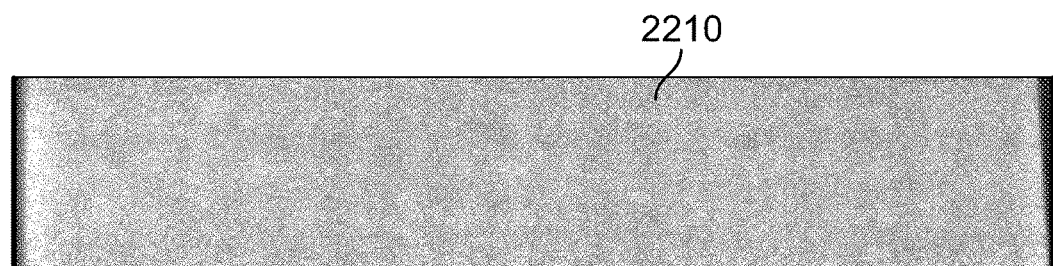
FIG. 22B illustrates an image of the concrete block shown in FIG. 22A, obtained by using a portable scanning system and a WSS detector panel of the present specification operating in a backscatter mode, in accordance with an embodiment of the present specification.
Figure 22C:
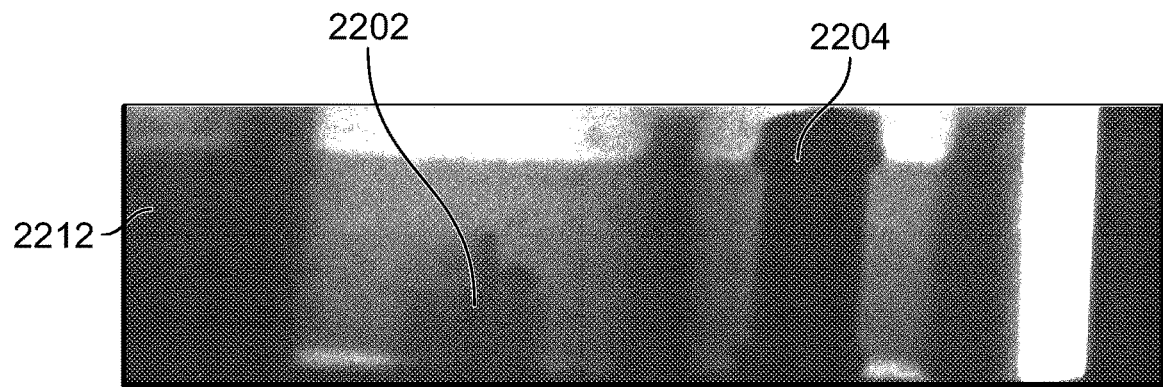
FIG. 22C illustrates an image of the concrete block shown in FIG. 22A, obtained by using a portable scanning system and a WSS detector panel of the present specification operating in a transmission mode, in accordance with an embodiment of the present specification.

FIG. 22A illustrates explosives hidden in a concrete block. As can be seen in the figure, a soda can IED 2202 and a steel pipe bomb 2204 are hidden in a concrete block 2206, with approximately 1.5 inches thick walls. FIG. 22B illustrates an image 2210 of the concrete block shown in FIG. 22A, obtained by using a portable scanning system and a WSS detector panel of the present specification operating in a backscatter mode, in accordance with an embodiment of the present specification. As shown in FIG. 22B the explosive objects are not visible in the scanning image 2210 obtained by operating the WSS detector panel in a backscatter mode. FIG. 22C illustrates an image 2212 of the concrete block shown in FIG. 22A, obtained by using a portable scanning system and a WSS detector panel of the present specification operating in a transmission mode, in accordance with an embodiment of the present specification. As shown in FIG. 22C the soda can IED 2202 and a steel pipe bomb 2204 are clearly visible in the scanning image 2212 obtained by operating the WSS detector panel in a transmission mode.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. An X-ray detector comprising:
   at least one scintillator screen configured to absorb incident X rays and emit corresponding light rays;
   a wavelength shifting sheet (WSS) optically coupled with the at least one scintillator screen and configured to collect and spectrum shift the light rays, wherein the WSS has at least one edge;
   at least one wavelength shifting fiber (WSF) optically coupled with the at least one edge of the WSS and configured to collect the spectrum shifted light rays and spectrum shift the collected spectrum shifted light rays to generate twice-spectrum-shifted light rays; and
   a photodetector optically coupled to the WSF and configured to receive and detect the twice-spectrum-shifted light rays.

2. The X-ray detector of claim 1 wherein the WSS comprises a first and a second surface and wherein the at least one scintillator screen at least partially covers the first surface and a second scintillator screen at least partially covers the second surface.

3. The X-ray detector of claim 2 wherein the first surface is coplanar to the second surface.

4. The X-ray detector of claim 1 wherein the at least one WSF is physically coupled with at least a portion of the edge of the WSS.

5. The X-ray detector of claim 1 wherein the photodetector is a photomultiplier tube (PMT).

6. The X-ray detector of claim 1 further comprising a reflector material covering the WSF to improve the collection of the spectrum shifted light rays.

7. The X-ray detector of claim 6 wherein the reflector material comprises at least one of a diffuse reflector or a specular reflector material.

8. The X-ray detector of claim 1 wherein the at least one scintillator screen comprises a material having an optical absorption length and wherein a thickness of the at least one scintillator screen is less than the optical absorption length.

9. The X-ray detector of claim 1 wherein the at least one scintillator screen comprises BaFCl:Eu.

10. The X-ray detector of claim 1 further comprising a spatially varying attenuating material inserted between the at least one scintillator screen and the WSS, wherein the spatially varying attenuating material is configured to correct a non-uniformity in detection by the photodetector.

11. The X-ray detector of claim 10 wherein the spatially varying attenuating material comprises a plastic substrate printed sheet with absorbing ink on a surface of the plastic substrate printed sheet.

12. The X-ray detector of claim 1 wherein the at least one scintillator screen is coupled with the WSS by placing the at least one scintillator screen over a surface of the WSS and wherein the at least one scintillator screen at least partially covers the surface.

13. An X-ray detector configured to detect X-rays, the detector comprising:
   at least one scintillator screen configured to absorb incident X rays and emit light rays based on the absorbed incident X-rays;
   a first wavelength shifting sheet (WSS1) coupled with the at least one scintillator screen configured to shift spectra of the light rays, wherein the WSS1 comprises at least one edge;
   a second wavelength shifting sheet (WSS2) coupled with the at least one edge of said WSS1 and configured to collect the spectra shifted light rays to generate twice-spectrum-shifted light rays; and
   a photodetector in optical communication with the WSS2 and configured to detect the twice-spectrum-shifted light rays.

14. The X-ray detector of claim 13 wherein the WSS1 comprises a first and a second surface; and wherein the at least one scintillator screen partially covers the first surface and a second scintillator screen partially covers the second surface.

15. The X-ray detector of claim 14 wherein the first surface is coplanar to the second surface.

16. The X-ray detector of claim 13 wherein the photodetector is a photomultiplier tube (PMT).

17. The X-ray detector of claim 13 further comprising a reflector material covering the WSS2 to improve the collection of the spectra shifted light rays.

18. The X-ray detector of claim 17 wherein the reflector material comprises at least one of a diffuse reflector or a specular reflector material.

19. The X-ray detector of claim 13 wherein the at least one scintillator screen comprises a material having an optical absorption length and wherein a thickness of the scintillator screen is less than the optical absorption length.

20. The X-ray detector of claim 13 wherein the at least one scintillator screen is made of BaFCl:Eu.

21. The X-ray detector of claim 13 further comprising a spatially varying attenuating material inserted between the scintillator screen and the WSS1, wherein the spatially varying attenuating material is configured to correct non-uniformity in detection by the photodetector.

22. The X-ray detector of claim 21 wherein the spatially varying attenuating material comprises a plastic substrate printed sheet with absorbing ink on a surface of the plastic substrate printed sheet.

* * * * *